(12) United States Patent
Kunzig et al.

(10) Patent No.: US 8,381,982 B2
(45) Date of Patent: Feb. 26, 2013

(54) METHOD AND APPARATUS FOR MANAGING AND CONTROLLING MANNED AND AUTOMATED UTILITY VEHICLES

(75) Inventors: Robert S. Kunzig, Aston, PA (US);
Robert M. Taylor, Newark, DE (US);
David C. Emanuel, Newark, DE (US);
Leonard J. Maxwell, North East, MD (US)

(73) Assignee: Sky-Trax, Inc., New Castle, DE (US)

( * ) Notice: Subject to any disclaimer, the term of this patent is extended or adjusted under 35 U.S.C. 154(b) by 97 days.

(21) Appl. No.: 12/807,325

(22) Filed: Sep. 2, 2010

(65) Prior Publication Data

US 2011/0010023 A1    Jan. 13, 2011

Related U.S. Application Data

(60) Provisional application No. 61/397,927, filed on Jun. 18, 2010.

(51) Int. Cl.
*G06K 7/10* (2006.01)
(52) U.S. Cl. .............. 235/462.08; 235/472.03
(58) Field of Classification Search ............ 235/462.01–462.45, 472.01–472.03
See application file for complete search history.

(56) References Cited

U.S. PATENT DOCUMENTS

| | | | |
|---|---|---|---|
| 4,647,784 A | 3/1987 | Stephens | |
| 4,684,247 A | 8/1987 | Hammill, III | |
| 4,802,096 A | 1/1989 | Hainsworth et al. | |
| 4,918,607 A | 4/1990 | Wible | |
| 4,947,094 A | 8/1990 | Dyer et al. | |
| 5,051,906 A | 9/1991 | Evans, Jr. et al. | |
| 5,111,401 A | 5/1992 | Everett, Jr. et al. | |
| 5,477,461 A | 12/1995 | Waffler et al. | |
| 5,525,883 A | 6/1996 | Avitzour | |
| 5,604,715 A | 2/1997 | Aman et al. | |
| 5,617,335 A | 4/1997 | Hashima et al. | |
| 5,793,934 A | 8/1998 | Bauer | |
| 5,832,139 A | 11/1998 | Batterman et al. | |
| 5,893,043 A | 4/1999 | Moehlenbrink et al. | |
| 5,999,866 A | 12/1999 | Kelly et al. | |
| 6,150,921 A | 11/2000 | Werb et al. | |
| 6,208,916 B1 | 3/2001 | Hori | |
| 6,249,743 B1 | 6/2001 | Ohshimo | |

(Continued)

FOREIGN PATENT DOCUMENTS

EP    0367526    5/1990
EP    1437636    7/2004

OTHER PUBLICATIONS

International Search Report dated Oct. 14, 2011.

(Continued)

*Primary Examiner* — Thien M Le
(74) *Attorney, Agent, or Firm* — Pepper Hamilton LLP

(57) ABSTRACT

A method and apparatus for managing manned and automated utility vehicles, and for picking up and delivering objects by automated vehicles. A machine vision image acquisition apparatus determines the position and the rotational orientation of vehicles in a predefined coordinate space by acquiring an image of one or more position markers and processing the acquired image to calculate the vehicle's position and rotational orientation based on processed image data. The position of the vehicle is determined in two dimensions. Rotational orientation (heading) is determined in the plane of motion. An improved method of position and rotational orientation is presented. Based upon the determined position and rotational orientation of the vehicles stored in a map of the coordinate space, a vehicle controller, implemented as part of a computer, controls the automated vehicles through motion and steering commands, and communicates with the manned vehicle operators by transmitting control messages to each operator.

41 Claims, 36 Drawing Sheets

U.S. PATENT DOCUMENTS

| | | |
|---|---|---|
| 6,290,188 B1 | 9/2001 | Bassett |
| 6,308,118 B1 | 10/2001 | Holmquist |
| 6,393,362 B1 | 5/2002 | Burns |
| 6,411,210 B1 | 6/2002 | Sower et al. |
| 6,556,722 B1 | 4/2003 | Russell et al. |
| 6,661,449 B1 | 12/2003 | Sogawa |
| 6,697,761 B2 * | 2/2004 | Akatsuka et al. ............. 702/151 |
| 6,728,582 B1 | 4/2004 | Wallack |
| 6,732,045 B1 | 5/2004 | Irmer |
| 6,801,245 B2 | 10/2004 | Shniberg et al. |
| 6,859,729 B2 | 2/2005 | Breakfield et al. |
| 6,902,113 B2 | 6/2005 | Sali et al. |
| 6,922,208 B2 | 7/2005 | Shniberg et al. |
| 6,952,488 B2 | 10/2005 | Kelly et al. |
| 7,031,837 B1 | 4/2006 | Foust |
| 7,194,330 B2 | 3/2007 | Carson |
| 7,370,803 B2 | 5/2008 | Mueller et al. |
| 7,372,451 B2 | 5/2008 | Dempski |
| 7,402,018 B2 | 7/2008 | Mountz et al. |
| 7,667,646 B2 | 2/2010 | Kalliola et al. |
| 7,681,796 B2 * | 3/2010 | Cato et al. ............... 235/462.08 |
| 7,845,560 B2 | 12/2010 | Emanuel et al. |
| 7,949,295 B2 * | 5/2011 | Kumar et al. ............ 434/307 R |
| 2003/0034396 A1 | 2/2003 | Tsikos et al. |
| 2003/0094495 A1 | 5/2003 | Knowles et al. |
| 2003/0208297 A1 | 11/2003 | Stawikowski et al. |
| 2004/0016077 A1 | 1/2004 | Song et al. |
| 2004/0139806 A1 | 7/2004 | Christmas |
| 2004/0158355 A1 | 8/2004 | Holmqvist et al. |
| 2004/0183751 A1 | 9/2004 | Dempski |
| 2005/0046584 A1 | 3/2005 | Breed |
| 2005/0256608 A1 | 11/2005 | King et al. |
| 2005/0269412 A1 | 12/2005 | Chiu et al. |
| 2006/0022872 A1 | 2/2006 | Zimmerman |
| 2006/0184013 A1 | 8/2006 | Emanuel et al. |
| 2006/0210115 A1 | 9/2006 | Nemet |
| 2007/0027585 A1 | 2/2007 | Wulff |
| 2007/0081695 A1 * | 4/2007 | Foxlin et al. .................. 382/103 |
| 2007/0219720 A1 | 9/2007 | Trepagnier et al. |
| 2007/0282482 A1 | 12/2007 | Beucher et al. |

OTHER PUBLICATIONS

Non-Final Office Action dated Jul. 21, 2011 of related U.S. Appl. No. 12/321,836.

International Search Report dated Nov. 6, 2006.

\* cited by examiner

| Marker ID | Actual X (feet) | Actual Y (feet) | Actual Z (feet) | Actual θ (degrees) | Actual Size (inches) |
|---|---|---|---|---|---|
| AA01 | 1.0 | 1.0 | 22.0 | 0.0 | 8.0 |
| AA02 | 1.0 | 4.0 | 22.1 | +0.8 | 8.0 |
| AA03 | 1.1 | 7.0 | 21.9 | +1.2 | 8.0 |
| AB01 | 4.0 | 1.0 | 22.0 | -1.0 | 8.0 |
| AB02 | 4.1 | 4.0 | 22.0 | -0.4 | 8.4 |
| AB03 | 4.2 | 7.1 | 22.1 | 0.0 | 8.1 |
| AC01 | 7.1 | 1.1 | 22.2 | 0.0 | 8.0 |
| AC02 | 7.2 | 4.1 | 22.1 | -0.5 | 8.0 |
| AC03 | 7.0 | 7.2 | 21.9 | +2.2 | 7.8 |

FIG. 7

| Marker ID | Actual X (feet) | Actual Y (feet) | Actual Z (feet) | Actual θ (degrees) | Actual Size (inches) |
|---|---|---|---|---|---|
| AD01 | 20.0 | 1.0 | 22.0 | 0.0 | 8.0 |
| AD02 | 20.1 | 4.0 | 22.1 | +0.6 | 8.0 |
| AD03 | 19.9 | 7.0 | 21.9 | +1.2 | 8.3 |
| AE01 | 23.2 | 1.0 | 22.0 | -1.0 | 8.3 |
| AE02 | 23.0 | 4.0 | 22.0 | -0.2 | 8.3 |
| AE03 | 23.1 | 7.1 | 22.1 | 0.0 | 8.0 |

FIG. 16

METHOD AND APPARATUS FOR MANAGING AND CONTROLLING MANNED AND AUTOMATED UTILITY VEHICLES

PRIORITY CLAIM

This application claims the benefit of U.S. Provisional Application 61/397,927, filed 18 Jun. 2010.

RELATED APPLICATIONS

U.S. application Ser. No. 11/292,463, filed Dec. 3, 2005, entitled "METHOD AND APPARATUS FOR DETERMINING POSITION AND ROTATIONAL ORIENTATION OF AN OBJECT"; U.S. application Ser. No. 12/319,825 filed Jan. 13, 2009, entitled "OPTICAL POSITION MARKER APPARATUS", U.S. application Ser. No. 12/459,728 filed Jul. 7, 2009, entitled "METHOD AND APPARATUS FOR COLLISION AVOIDANCE" and U.S. application Ser. No. 12/321,836, filed Jan. 26, 2009, entitled "APPARATUS AND METHOD FOR ASSET TRACKING" are co-owned by Applicant and are directed to subject matter related to this application.

SCOPE OF THE INVENTION

The invention presents a method and apparatus for managing manned and automated utility vehicles in a coordinate space utilizing a method and apparatus that optically determines the position and the rotational orientation of vehicles in a three-dimensional space and transmits that information to a vehicle controller. The vehicle controller controls the automated vehicles by transmitting motion and directional control commands, and communicates with the manned vehicle operators by transmitting control messages to the operator.

FIELD OF THE INVENTION

A method, apparatus, and system for managing manned and automated utility vehicles in a control space by determining the position and rotational orientation of each vehicle and issuing control signals to the vehicle motion control system or to the vehicle operator. A machine vision image acquisition apparatus on each vehicle determines the position and the rotational orientation of that vehicle in the predefined space by acquiring an image of a position marker and processing the acquired image to calculate the vehicle's position and the rotational orientation. The position of the vehicle is determined in two dimensions. Rotational orientation (vehicle heading) is determined in the degree of freedom parallel to the plane of motion. Based upon the determined position and the rotational orientation of the vehicles, a vehicle controller, implemented as part of a computer, issues motion and steering commands to the automated vehicles causing them to follow predetermined paths within the predefined space, and transmits control messages to operators of manned vehicles.

Vehicle Navigation

The method and apparatus of the present invention uses the position and the rotational orientation determination method and apparatus of U.S. application Ser. No. 11/292,463 as described herein. Alternatively, an improved method of position and the rotational orientation determination may be implemented, as described herein, to provide improved accuracy in determining the position and the rotational orientation of vehicles. A vehicle controller then uses that more accurate information to navigate automated vehicles in the predefined space. The method of U.S. application Ser. No. 11/292,463, and the improved method of determining position and orientation can also be used to track and manage manned vehicles in the predefined space.

Human-operated (i.e., manned) utility vehicles, encompassing motorized pallet jacks, forklift trucks, buggies, and carts, are typically used in factories, warehouses, and distribution centers to move goods and people. "Automated vehicles", as used herein, are commonly referred to in the industry by the term "automated guided vehicle" (AGV). The acronym AGV is a widely accepted term that encompasses a broad variety of industrial utility vehicles that transport goods and people without a driver. AGV's are used where automation can deliver key benefits of low labor cost, operation in hazardous environments, or special transport needs.

BACKGROUND OF THE INVENTION

Human-operated (i.e., manned) utility vehicles, encompassing motorized pallet jacks, forklift trucks, buggies, and carts, are typically used in factories, warehouses, and distribution centers to move goods and people. "Automated vehicles", as used herein, are commonly referred to in the industry by the term "automated guided vehicle" (AGV). The acronym AGV is a widely accepted term that encompasses a broad variety of industrial utility vehicles that transport goods and people without a driver. AGVs are used where automation can deliver key benefits of low labor cost, operation in hazardous environments, or special transport needs.

Modern advancements in flexible manufacturing have created a greater need for the use of AGV's. Flexible manufacturing systems integrate multiple automation steps to meet manufacturing demands, but also must link with material transport systems; therefore, an interface must exist between automated manufacturing cells and goods transport. Many AGV applications are technically feasible, but the initial cost and integration with existing systems is economically prohibitive.

Two general types of facilities have evolved since the 1950's: those employing manned utility vehicles for goods transport, and those using automated vehicles. In facilities where it is desired or necessary to operate both types of manned and automated vehicles, strict geographic separation has been necessary between the two types. This is done for worker safety as well as to prevent automated vehicle damage from potential collisions with manned vehicles. By separating work areas, designating certain areas off-limits to personnel, and rigidly defining automated vehicle travel paths, both modes of transport have been successfully utilized within a single facility.

A facility accommodating both manned and automated vehicles operating together in a shared space is believed desirable. This is rarely done for the reasons given above, but also because automated vehicles typically operate over fixed routes, while manned vehicles have free roaming ability. The basic problem has been, that at any given moment, an AGV does not "know" where manned vehicles are located, and the operators of manned vehicles have very limited knowledge of where AGV's are located; hence the long-standing separation.

The present invention solves this problem by a vehicle controller constantly monitoring the location and rotational orientation of both types of vehicles and sending control commands to the automated vehicles and control messages to the operators of manned vehicles. Further, the invention allows a new class of automated vehicle to be defined: one that navigates freely in the controlled space, directed by a machine control system that is aware of the instantaneous location of all vehicles. The operators of the free-roaming manned vehicles receive control messages warning them of the proximity of automated vehicles. The vehicle controller sends control signals to the automated vehicles causing them to stop, slow, or change direction if a collision with another vehicle is imminent. When the threat of a collision has abated the vehicle controller sends control signals to the automated vehicles causing them to resume travel on their selected paths.

It should be appreciated that tracking, guiding or navigating an automated vehicle in a three-dimensional space presents more stringent requirements than simply tracking a manned vehicle. The necessity of very accurately determining the position and the rotational orientation of the automated vehicle presents a significant difficulty. While sensing the position of an automated vehicle is important, sensing rotational orientation, i.e., directional heading, becomes even more important in automated vehicle guidance. To accurately control an automated vehicle, rotational resolution one or two orders of magnitude better than tracking systems is required. For example, while it may be sufficient to track a manned forklift truck within a coordinate space with a positional accuracy of one foot (thirty centimeters), and an orientation accuracy of ten degrees, an automated vehicle may require a position accuracy of a fraction of an inch (about five millimeters) and an orientation accuracy of a few tenths of a degree.

Rotational orientation sensing is also critical in materials handling applications, where goods may be stored in chosen orientations; for example, with carton labels aligned in a particular direction or pallet openings aligned to facilitate lift truck access from a known direction. A position determination and angular orientation determination method and apparatus that can be utilized as both a tracking system for manned vehicles, and as a guidance system for automated vehicles, using a single sensor on each vehicle, is therefore desired. Such an improved method and apparatus must reduce or remove the shortcomings of current methods, provide general applicability, and offer high accuracy.

The aforementioned parent U.S. application Ser. No. 11/292,463 describes a number of prior art technologies that have been applied to position determination' in one, two, and three dimensions. Some prior art technologies lack the ability to determine a vehicle's rotational orientation, which is critical for guidance. A few methods support a rotational orientation ability, but suffer other shortcomings in practical use. For example, laser guidance systems have the ability to determine rotational orientation, but are limited to scanning in a horizontal direction where obstructions can block the laser's field of view. Optical methods are known that view in the direction of walls where position markers also can be obscured. Other optical methods view toward the floor where position markers may be obscured by debris or be readily damaged.

The present invention of managing manned and automated utility vehicles in a coordinate space incorporates the methods the parent U.S. application Ser. No. 11/292,463 for position and rotational orientation determination of the vehicles. The present invention also utilizes the disclosure of U.S. application Ser. No. 12/319,825 filed Jan. 13, 2009, entitled "OPTICAL POSITION MARKER APPARATUS" and U.S. application Ser. No. 12/459,728 filed Jul. 7, 2009, entitled "METHOD AND APPARATUS FOR COLLISION AVOIDANCE", which are hereby incorporated by reference.

SUMMARY OF THE INVENTION

In a first aspect, the present invention presents an improved method and apparatus of simultaneously imaging two or more position markers for determining the position and the rotational orientation of the vehicles with better accuracy than the method and apparatus of parent application U.S. application Ser. No. 11/292,463.

In a second aspect, the present invention presents a method and apparatus for optically navigating automated vehicles within the predefined coordinate space using the position and the rotational orientation method and apparatus of parent application U.S. application Ser. No. 11/292,463.

In a third aspect, the present invention presents a method for an automated vehicle to pick up an object from a first, origin, location and rotational orientation, transporting the object and delivering that object to a second, destination, location and rotational orientation.

In a fourth aspect, the present invention presents a method and apparatus for managing manned and/or automated utility vehicles in a predefined coordinate space using either the position and the rotational orientation method and apparatus of parent application U.S. application Ser. No. 11/292,463 or the improved position and the rotational orientation method and apparatus.

In the first aspect:

The improved method of determining a coordinate position and rotational orientation of an object within a predefined coordinate space comprises the steps of:

1. A plurality of unique position markers having identifying indicia and positional reference indicia thereupon is provided. The markers are arranged at predetermined known positional locations within the coordinate space and the known positional locations and known angular orientations are stored in a map. The markers are spaced so that a plurality of position markers M1, M2, . . . , Mx are always within view of the object.

2. Using an image acquisition system mounted on the vehicle, an image of the plurality of position markers M1, M2, . . . , Mx within a field of view (FOV) of the image acquisition system is acquired.

3. A center point N1, N2, . . . , Nx of each respective marker M1, M2, . . . , Mx is established and line segments N1-N2, N1-N3, . . . , N1-Nx, . . . N(x−1)-Nx connecting the respective pairs of center points are determined.

4. A center point O of the field of view of the image acquisition system is determined.

5. Line segments O-N1, O-N2, . . . , O-Nx, respectively connecting point O with the centers N1, N2, . . . , Nx of the respective position markers M1, M2, . . . , Mx, are determined.

6. The lengths and directions of line segments O-N1, O-N2, . . . , O-Nx are used to calculate the position of the vehicle relative to each of the known positions of the markers M1, M2, . . . , Mx.

7. A mean value of the position of the vehicle within the coordinate space is calculated, thereby determining the location of the vehicle within the coordinate space.

8. The directions of line segments N1-N2, N1-N3, . . . , N1-Nx, . . . N(x−1)-Nx within the field of view are used to calculate the rotational orientation of the vehicle relative to the respective pairs M1, M2; M1, M3; . . . ; M1, Mx; . . . ; M(x−1), Mx of position markers M1, M2, . . . , Mx.

9. A mean value of the rotational orientation of the vehicle relative to the respective pairs of position markers M1, M2, . . . , Mx is calculated, thereby determining the rotational orientation of the vehicle within the coordinate space.

In the second aspect:

The method for optically navigating an automated vehicle within a predefined coordinate space comprises the steps of:

1. A map of the coordinate space is created that determines allowable travel routes based on the locations of obstacles within the coordinate space, and the map is stored within a memory in a vehicle controller.

2. A destination is established for each automated vehicle within the coordinate space and the identity and destination of each vehicle is stored within the memory in the vehicle controller.

3. A coordinate position and a rotational orientation of each vehicle within the predefined coordinate space is determined by:

a) a plurality of unique position markers having identifying indicia, positional reference and angular reference indicia thereupon is provided, the markers being arranged at predetermined known positional locations and known angular orientations within the coordinate space so that at least one position marker is within view of the vehicle.

b) an image acquisition system mounted on each vehicle is used to:

1) acquire an image of the at least one position marker within view;
   2) process the image to determine the identity, the position relative to the vehicle, and the rotational orientation relative to the vehicle of each position marker within view; and
   3) calculate the position of the vehicle and the rotational orientation of the vehicle in the coordinate space and store the position and rotational orientation information in a memory in the image acquisition system.

4. The vehicle identity and the stored coordinate position and rotational orientation of that vehicle is transmitted from the image acquisition system on each vehicle to the vehicle controller and the vehicle identity and coordinate position and rotational orientation is stored in the memory within the controller.

5. Using the coordinate position of the vehicle and the rotational orientation of the vehicle, the predetermined map of the coordinate space and the destination stored within the memory in the vehicle controller, the vehicle controller determines a desired path for each automated vehicle.

6. The vehicle controller then transmits motion and steering instructions to each automated vehicle.

7. Steps 3 through 6 are then repeated until each automated vehicle reaches the established destination for that vehicle.

In the third aspect:

The method for picking up an object from a first, origin, location and rotational orientation, transporting the object and delivering that object to a second, destination, location and rotational orientation within a predefined coordinate space by an optically navigated automated vehicle, comprises the steps of:

1. A map of the coordinate space is created that determines allowable travel routes based on the locations of obstacles within the coordinate space, and the map is stored within a memory in a vehicle controller.

2. The object to be transported is identified, the present location and rotational orientation of that object and a destination location and rotational orientation of that object within the coordinate space is identified and the identity, the present location and rotational orientation and the destination location and rotational orientation of the object is stored within the memory in the vehicle controller.

3. An automated vehicle is designated as the delivery vehicle for the transport and delivery.

4. A coordinate position and a rotational orientation of the delivery vehicle and all other vehicles within the predefined coordinate space is determined by:

a) A plurality of unique position markers having identifying indicia, positional reference and angular reference indicia thereupon is provided, the markers being arranged at predetermined known positional locations and known angular orientations within the coordinate space so that at least one position marker is within view of the vehicle.

b) An image acquisition system mounted on the delivery vehicle is used to:

1) acquire an image of the at least one position marker within view;
   2) process the image to determine the identity, the position relative to the delivery vehicle, and the rotational orientation relative to the delivery vehicle of each position marker within view; and
   3) calculate the position of the delivery vehicle and the rotational orientation of the delivery vehicle in the coordinate space and store the position and rotational orientation information in a memory in the image acquisition system.

5. The delivery vehicle identity and the stored coordinate position and rotational orientation of that vehicle is transmitted from the image acquisition system on the delivery vehicle to the vehicle controller and the delivery vehicle identity and coordinate position and rotational orientation is stored in the memory within the controller.

6. Using the predetermined map of the coordinate space, the identity, position location and rotational orientation of the object and the present position location and rotational orientation of the designated delivery vehicle stored within the memory in the vehicle controller, the vehicle controller determines a desired path for the delivery vehicle to pick up the object.

7. The vehicle controller then transmits motion and steering instructions to the delivery vehicle.

8. Steps 4 through 7 are then repeated until the delivery vehicle reaches the location of the object at the rotational orientation of the object.

9. The vehicle controller then transmits motion, steering and fork control instructions to the delivery vehicle, causing the vehicle to pick up the object.

10. Using the predetermined map of the coordinate space, the present position location and rotational orientation of the designated delivery vehicle and the destination location and rotational orientation for that object stored within the memory in the vehicle controller, the vehicle controller determines a desired path for the delivery vehicle to deliver the object;

11. The vehicle controller then transmits motion and steering instructions to the delivery vehicle causing it to follow the desired path.

12. Steps 4, 10, and 11 are then repeated until the delivery vehicle reaches the destination location and rotational orientation of the object.

13. The vehicle controller then transmits motion, steering and fork control instructions to the delivery vehicle, causing the vehicle to deposit the object at the destination location.

In the fourth aspect:

The method for managing manned and automated utility vehicles in a predefined coordinate space comprises the following steps:

1. A map of the coordinate space is created that determines allowable travel routes based on the locations of obstacles within the coordinate space, and the map is stored within a memory in a vehicle controller.

2. A destination is established for each manned vehicle and for each automated vehicle within the coordinate space and the identity and destination of each vehicle is stored within the memory in the vehicle controller.

3. A coordinate position and a rotational orientation of each vehicle within the predefined coordinate space is determined by:

a) a plurality of unique position markers having identifying indicia, positional reference and angular reference indicia thereupon is provided, the markers being arranged at predetermined known positional locations and known angular orientations within the coordinate space so that at least one position marker is within view of the vehicle;

b) an image acquisition system mounted on each vehicle is used to:
1) acquire an image of the at least one position marker within view;
2) process the image to determine the identity, the position relative to the vehicle, and the rotational orientation relative to the vehicle of each position marker within view; and
3) calculate the position of the vehicle and the rotational orientation of the vehicle in the coordinate space and store the position and rotational orientation information in a memory in the image acquisition system.

4. The vehicle identity and the stored coordinate position and rotational orientation of that vehicle is transmitted from the image acquisition system on each vehicle to the vehicle controller and the vehicle identity and coordinate position and rotational orientation is stored in the memory within the vehicle controller.

5. Using the coordinate position of the vehicle and the rotational orientation of the vehicle, the predetermined map of the coordinate space and the destination stored within the memory in the vehicle controller, the vehicle controller determines a desired path for each automated vehicle.

6. The vehicle controller then transmits motion and steering instructions to each automated vehicle.

7. A predicted trajectory and a safety zone for each manned vehicle and each automated vehicle is determined by calculating the velocity and direction of travel of each vehicle from coordinate positions at successive time intervals.

8. Any areas of intersection of the safety zone of each manned vehicle and each automated vehicle with the safety zones of other manned and of other automated vehicles are determined to predict a potential collision;

9. Control instructions to reduce speed, turn, or stop, are transmitted to any automated vehicle that has a safety zone intersecting any safety zone of any other vehicle to prevent the predicted collision;

10. A warning message is transmitted to any manned vehicle that has a safety zone intersecting any safety zone of any other vehicle to alert the operator of the manned vehicle of a predicted potential collision, so that the operator can take appropriate action to avoid the predicted collision.

11. Steps 3 through 10 are then repeated until each automated vehicle reaches the established destination for that vehicle.

BRIEF DESCRIPTION OF THE DRAWINGS

FIG. 7 shows a sample Look-Up-Table containing position marker data.

FIG. 16 shows a sample Look-Up-Table containing position marker data.

DETAILED DESCRIPTION

Figure 1A:
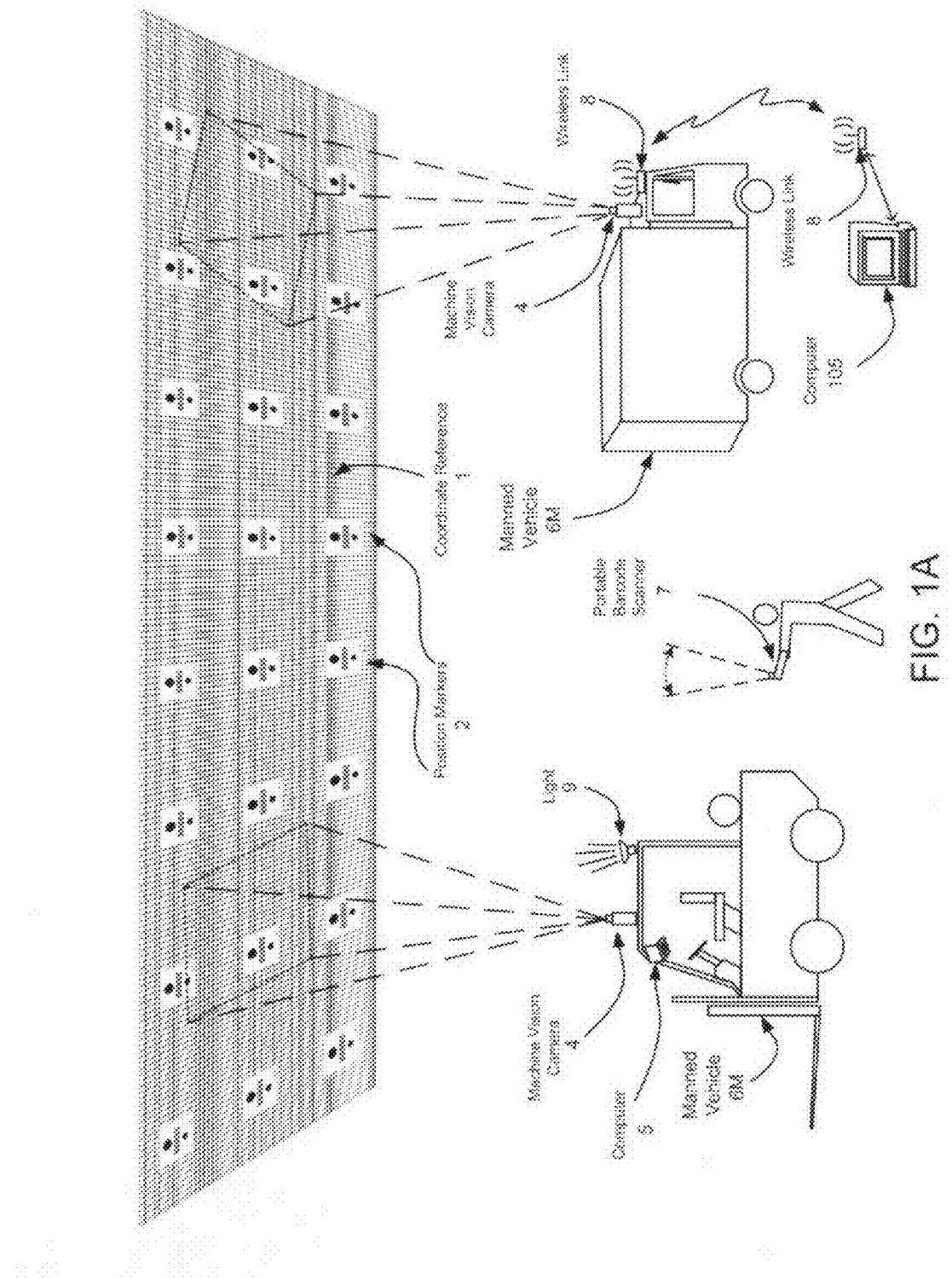
FIG. 1A shows the overall system in a first embodiment in accordance with the present invention and identifies key elements: coordinate reference 1, position markers 2, machine vision camera 4, data processing device 5, manned vehicles 6M, hand-held bar code scanner 7, wireless data communications links 8, illumination source 9 and a computer unit 105, which also serves as a vehicle controller.
Figure 1B:
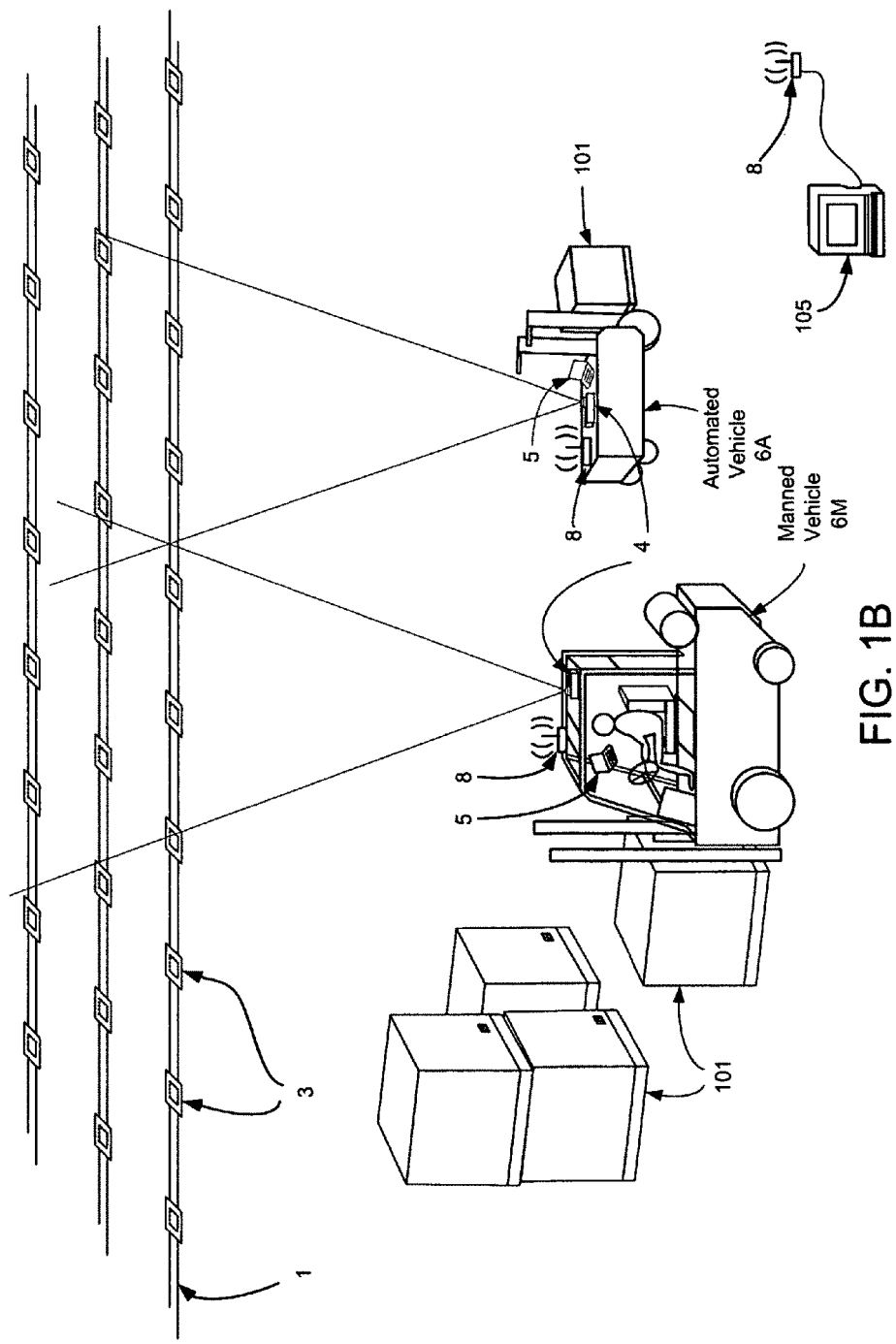
FIG. 1B shows the overall system in a second embodiment in accordance with the present invention and identifies an alternative coordinate reference 1, position markers 3, a machine vision camera 4, a data processing device 5, a manned vehicle 6M and an automated vehicle 6A, wireless data communications links 8, and a computer unit 105, which also serves as a vehicle controller.

As seen in FIGS. 1A and 1B, a plurality of unique position markers are placed within or near to the designated area or volume, i.e., the coordinate space. A sufficient number of position markers are provided so that at least one position marker is visible to the image acquisition system mounted on each vehicle from each and every location within the designated area or volume. In an improved accuracy embodiment, to be described, a greater number of position markers are provided so that two or more markers are always within the field of view of the image acquisition system on each vehicle.

Machine readable symbols, such as one-dimensional or two-dimensional barcodes, encode the identity of each position marker 2, 3 of the coordinate reference 1, allowing machine vision cameras 4 or bar code scanning devices 7 (FIGS. 1A and 1B) to read the identities of the symbols. Position data in human readable form (text) may also be imprinted, attached, or otherwise affixed to the position markers if desired. This printed text 10 (FIGS. 3 and 12) allows a person to determine an approximate location within the coordinate space by simply viewing and reading the text on the nearest position marker.

The machine recognizable symbols are arranged on the position markers 2,3 of the coordinate reference 1 at predetermined positions, allowing machine vision technology to determine position by analyzing the shapes and symbols on the position markers 2,3. After installation, the locations of the position markers are stored in a map of the coordinate space within a memory of a computer unit 105. Exact position coordinates and rotational orientation are determined through computer-programmed instructions that are based upon geometric analysis of image data, i.e., camera picture elements (pixels), acquired by the image acquisition system.

In one embodiment the position markers 2 utilize a linear barcode symbol 11, which encodes the marker location in any of several common bar code symbologies, and two geometric position symbols 9, which serve as position and angular orientation references for the machine vision system. In another embodiment, the position markers 3 utilize a two-dimensional non-symmetric, non-concentric barcode symbol 3 to serve the dual purpose of machine-readable position location codes and geometric position markers. Any of several common two-dimensional bar code symbologies 13 are used.

The plurality of position markers 2, 3 may be placed upon a coordinate reference 1. It should be understood that coordinate reference 1 is not required for the invention, but may provide physical support for position markers if no other structures such as ceilings, beams, walls, etc. are available for direct attachment of the markers. The coordinate reference may be constructed of any of several air-permeable or perforated materials (example: netting) or solid materials (example: plastic sheet), or cord. Netting examples include fish net, basketball net, fence net, screen (window screen, tent screen), and mesh (examples: garment lining, landscaping mesh). Solid materials include sheet or webs such as polyolefin film, non-woven synthetic material, and paper. Cords include wire, string, cable, rope, and banding material. In a preferred arrangement the plurality of position markers 2,3 is supported by pairs of cords in accordance with the teachings of U.S. application Ser. No. 12/319,825, incorporated herein by reference.

Perforated or permeable materials offer the advantage of allowing air to pass through, for example, to accommodate indoor ventilation. Perforated, transparent, and translucent materials offer the advantage of allowing light to pass through the coordinate reference, for example to allow room lighting to be transmitted. Solid materials, which may also be perforated (example: paper with punched holes), may be used and may be opaque, translucent, or transparent, depending on lighting and ventilation requirements for the application. Either solid or perforated materials can be readily used to implement the invention. The coordinate reference is sized to match the predefined space, volume, or area to be controlled. The purpose of the coordinate reference 1 is to simply provide a convenient surface on which a plurality of unique position markers 2, 3 can be imprinted, attached or affixed. Lacking a coordinate reference, position markers may be applied directly to a ceiling, roof, wall, beam, or other structure, or may be suspended, supported, or attached to nearby structure.

The coordinate reference may be supported by building structure, for example, by factory or warehouse ceiling beams if the coordinate reference is to be suspended overhead. Free standing fixtures or other fixed structure may be used for other orientations; for example, the coordinate reference may be attached to a wall parallel and opposite to a wall on which objects are desired to be tracked. In some cases, position markers may be attached directly to building structures without the necessity of affixing them first to a secondary surface.

The position markers 2 and 3 may be constructed from any material on which printing can be done directly or can be applied, as a label. Preferably, the position markers are constructed in accordance with the teachings of U.S. application Ser. No. 12/319,825. Mechanical sturdiness is an important factor for assuring marker longevity, and many materials offer adequate printability and sturdiness. Paper, sheet goods, plastic sheeting, cardboard, metal, and other common materials are suitable. The markings can be dark on a light or transparent background, light on a dark or opaque background, or of one or more colors. Retro reflective barcode labels are preferred to improve the contrast of the image and thus the signal-to-noise ratio and the quality of the signal output from the machine vision camera. A retro reflective material sold under the trade name Scotchlite™ from 3M Corporation of St. Paul, Minn. is preferred, although other label stocks available from many suppliers, such as Duratran® II thermal transfer label stock, Part No. E06175 available from Intermec Corporation of Seattle, Wash., are suitable. Barcode labels may be printed using a common barcode label printer such as Intermec model PX6i thermal transfer barcode label printer or a commercial inkjet printer such as Roland XC-540 model printer. Marker attachment to the coordinate reference may be by fasteners such as screws, clips, or wire ties, adhesives such as glue or pressure sensitive label adhesive. Alternatively, the position markers can be imprinted directly on the coordinate reference using silk-screen, lithographic, or offset printing methods. The coordinate reference may be substantially planar or non-planar. It is necessary only that each marker has a unique identity and that the position, orientation, and size of each marker relative to the designated area is known.

Position markers are arranged in a prescribed pattern; for example, in rows and columns corresponding to a desired coordinate plan for the designated area. Position marker 2 shown in FIG. 3 contains three components; text 10 to aid manual identification of each grid location (example: "AA01"=Row "AA", Column "01"), a one-dimensional (linear) barcode 11 which encodes the marker location "AA01" in any of several common bar code symbologies; and geometric position symbols 9 which serve as position and angular orientation references, or optical targets, for the machine vision system.

Figure 3:
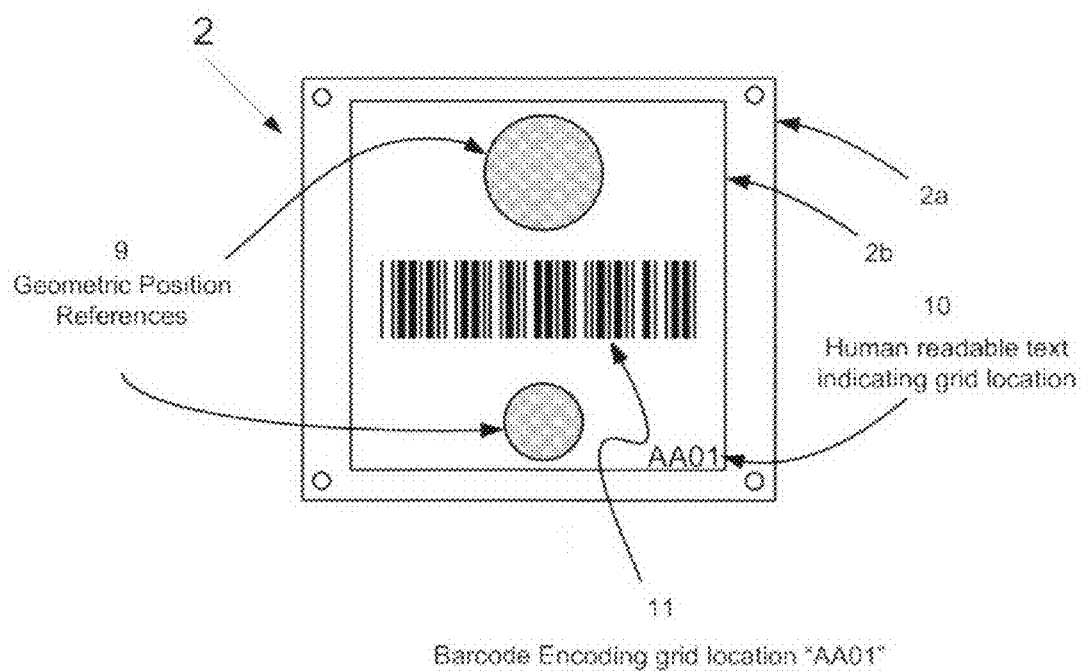
FIG. 3 illustrates details of a position marker 2, showing substrate 2a, label 2b, and imprinted upon the label geometric position references 9, a linear bar code symbol 11, and a human-readable marker identification 10.
Figure 12:
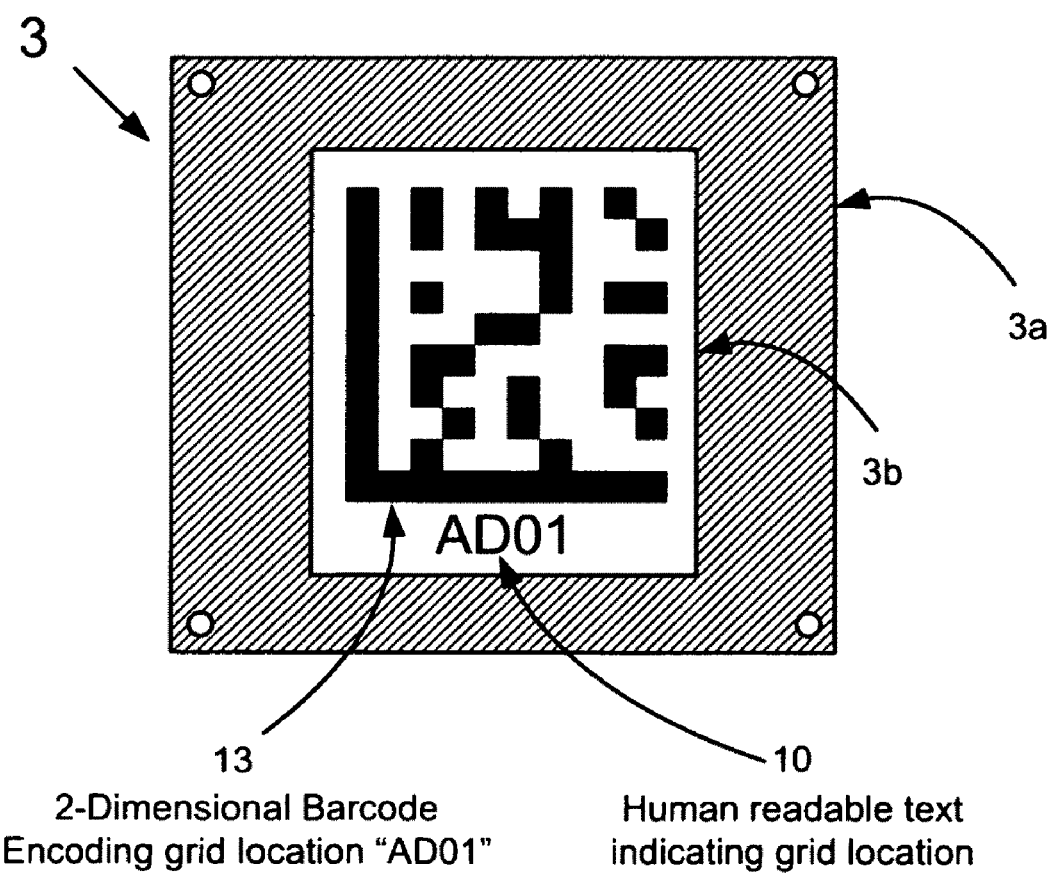
FIG. 12 shows a position marker 3 with a substrate 3a, a label 3b having a two-dimensional bar code symbol 13, and human-readable text 10.
Figure 13:
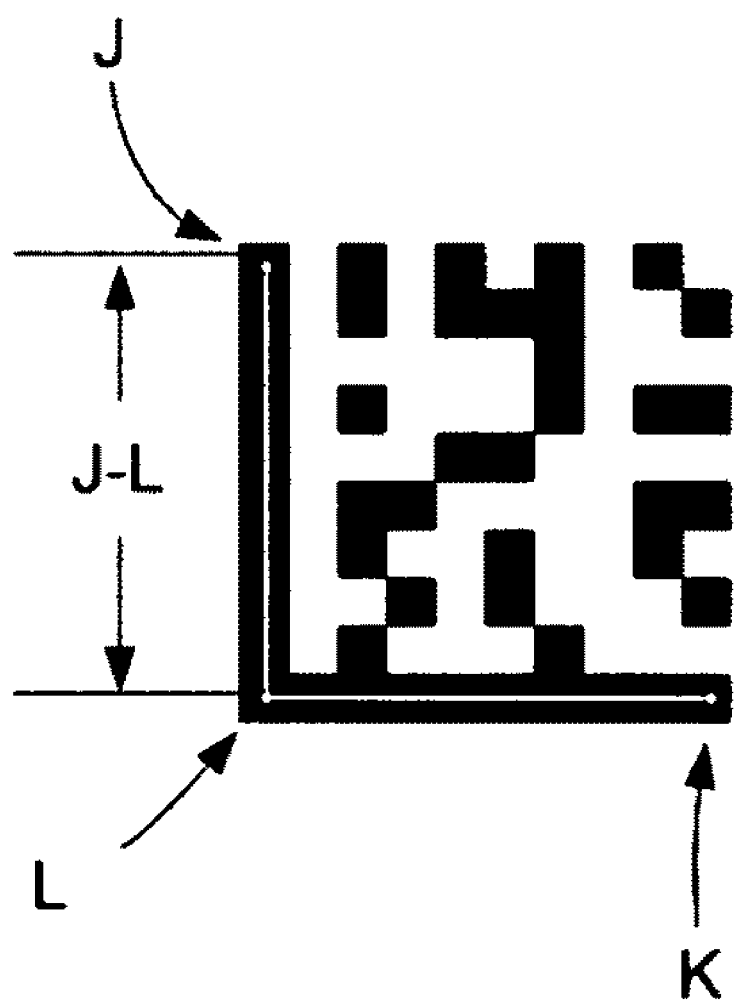
FIG. 13 defines key points J, K, and L of position marker 3.

Although position marker 2 shown in FIG. 3 may be used, the position marker 3 of FIG. 12 is preferred for the present invention. The position marker 3 of FIG. 12 provides information equivalent to that of position marker 2, but does so with a single graphic; in this case, a two-dimensional bar code symbol. The marker is comprised of text 10, and barcode 13, which serves the dual purpose of encoding the marker identity and, due to its non-symmetric form, serves as a position and angular orientation reference.

It may be desirable in certain instances for the position markers to be read by humans, or to be scanned by bar code scanners 7. The text 10 is provided for human reading. These alternative methods offer assurance that position information can be determined even though the automated method of the present invention is inoperative, for example, during a system power failure. Although hand-held bar code scanners 7 are available for reading both one and two-dimensional barcodes, linear bar code readers are most common so linear bar codes 11 of position marker 2 are typically selected for these implementations.

Contemporary machine vision technology is utilized to capture and process images of the position markers. Offering sophisticated image processing capabilities such as presence or absence detection, dimensional measurement, and object shape identification, machine vision systems are typically comprised of a video camera, a computing device, and a set of software routines. Machine vision equipment is commercially available and suitable for most environments. In order to develop a machine vision application, the user chooses certain subroutines, combines them into a sequence or procedure, and stores the procedure in the memory or storage device of the machine vision computing device. The present invention includes a set of software instructions that calls certain procedures to capture images, adjust images for readability, analyze images to detect features, and measure detected features to determine geometric data such as object size or location within the camera's field of view. Output data are produced at the conclusion of each procedure and may be stored or transferred to another device.

The present invention provides a second computing device 5 to (a) calculate the vehicle's position with high precision, (b) calculate the vehicle's rotational angle with high precision, (c) compensate for position marker installation inconsistencies, and (d) translate position and orientation values into convenient "actual" units.

FIGS. 1A and 1B illustrate typical embodiments in a warehouse, where materials are stored on the floor. Coordinate reference 1, is placed sufficiently high above the working area so as not to interfere with operations. Suspension is provided by mechanical supports such as cables, wire, or building structure (not shown), or the reference is attached directly to the ceiling, whereupon the coordinate reference and position markers assume a substantially planar form. The semi-open structure allows much light to pass from overhead light fixtures to the work area, and air to flow freely for heating and ventilation considerations.

The position and rotational orientation determination system is active at all times when the vehicle is within the designated area beneath the array of position markers 2, 3. Camera images may be captured continuously, or on command, such as when the vehicle stops, or at a time chosen by the operator. When the camera 4 captures an image of the overhead position marker array reference 1 the image data is transmitted to the machine vision system computational device 5 for analysis.

DESCRIPTION OF THE EMBODIMENTS

First Embodiment

Figure 8:
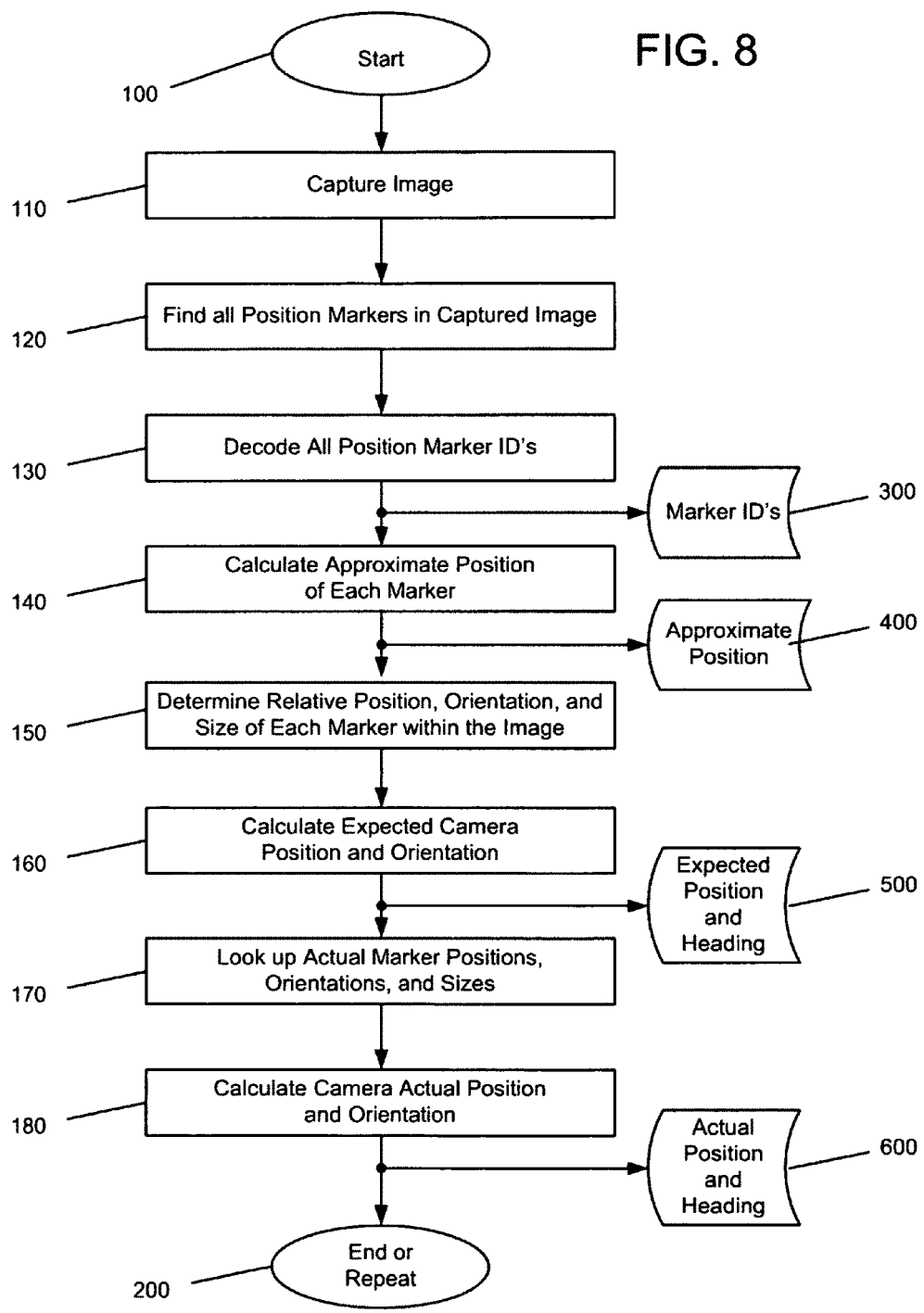
FIG. 8 presents a high-level software flow diagram for the general solution for position and rotational orientation determination.
Figure 9:
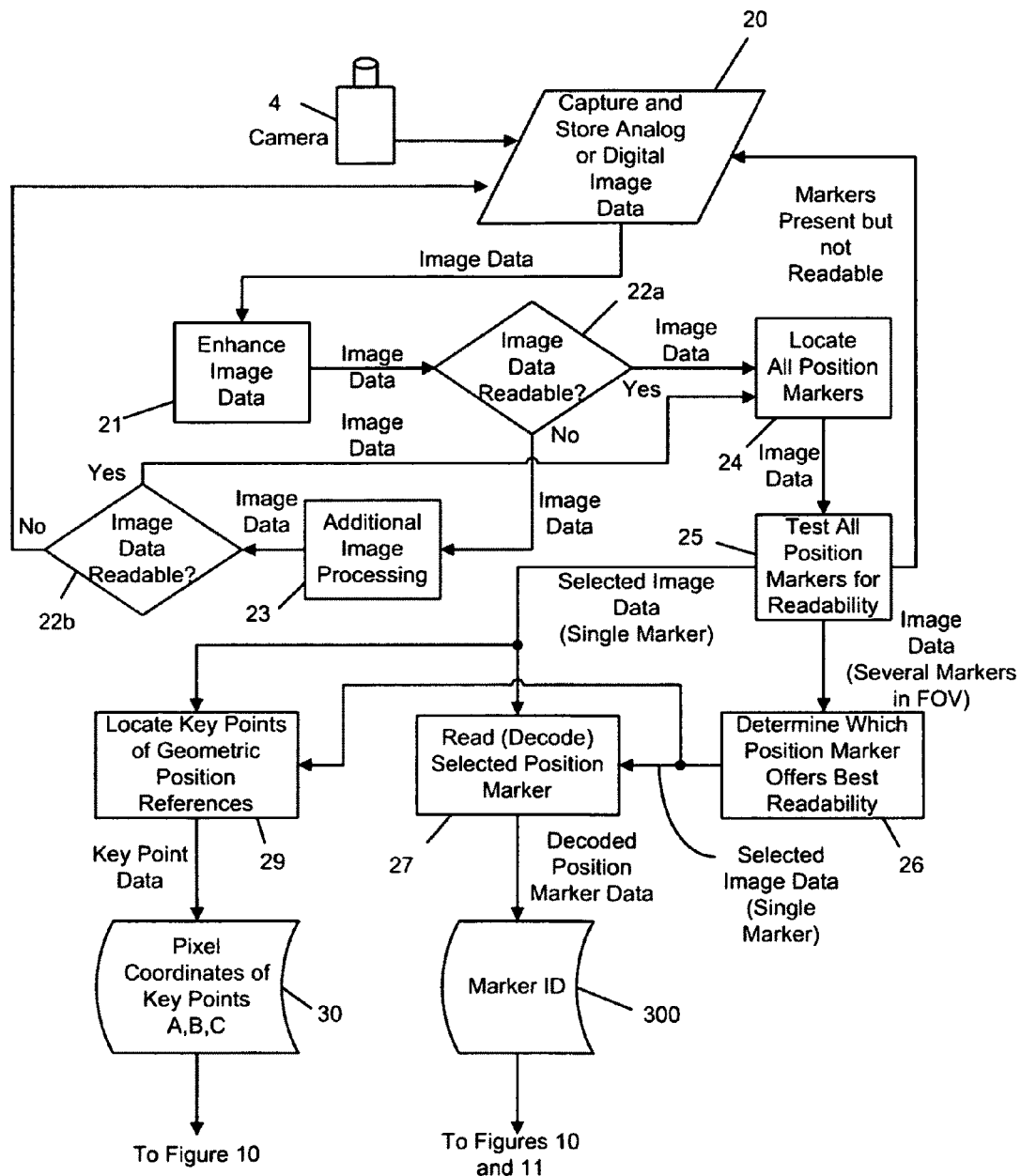
FIG. 9 presents a software flow diagram for image processing and feature extraction steps.
Figure 10:
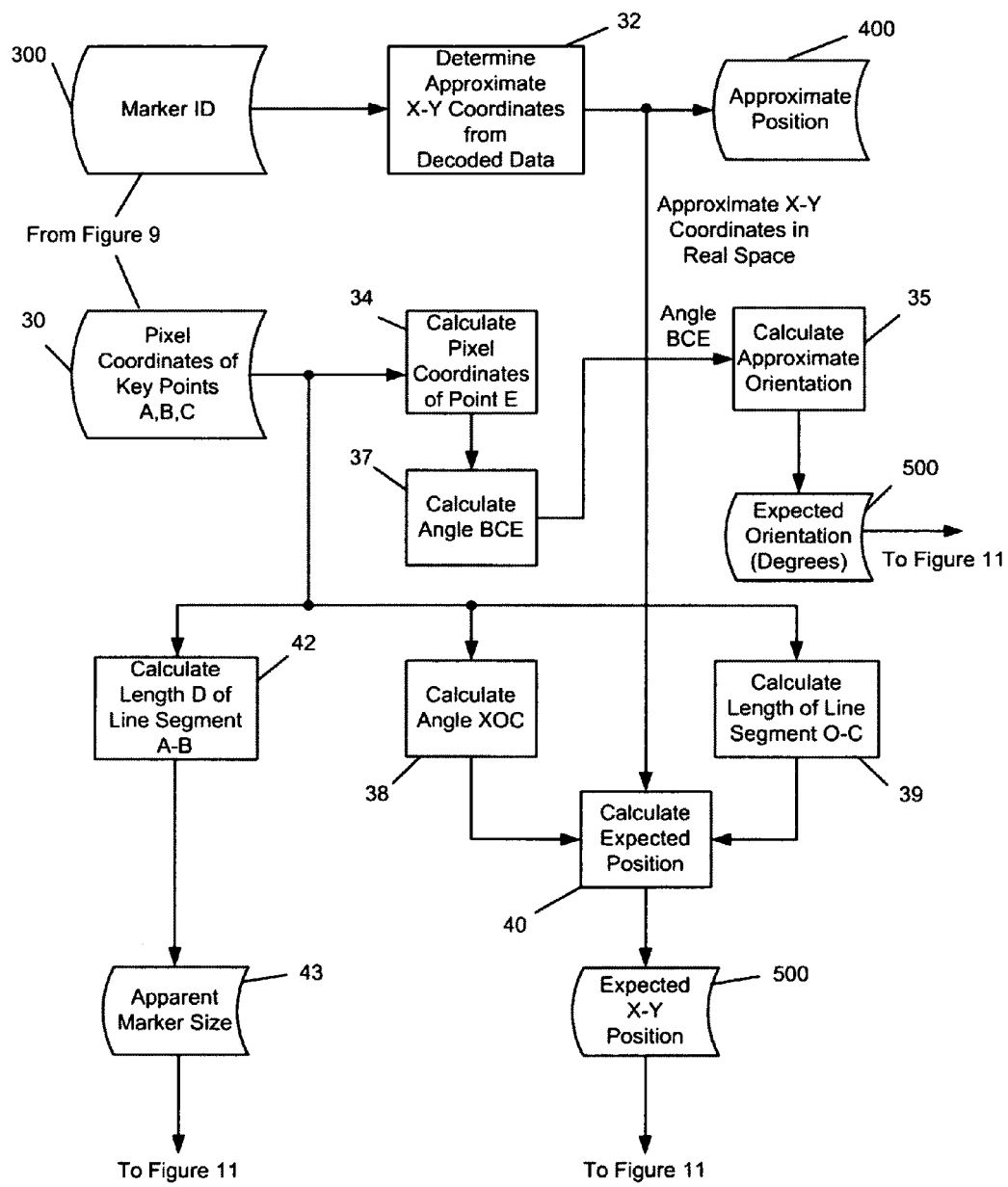
FIG. 10 shows a software flow diagram for expected position and rotational orientation determination.
Figure 11:
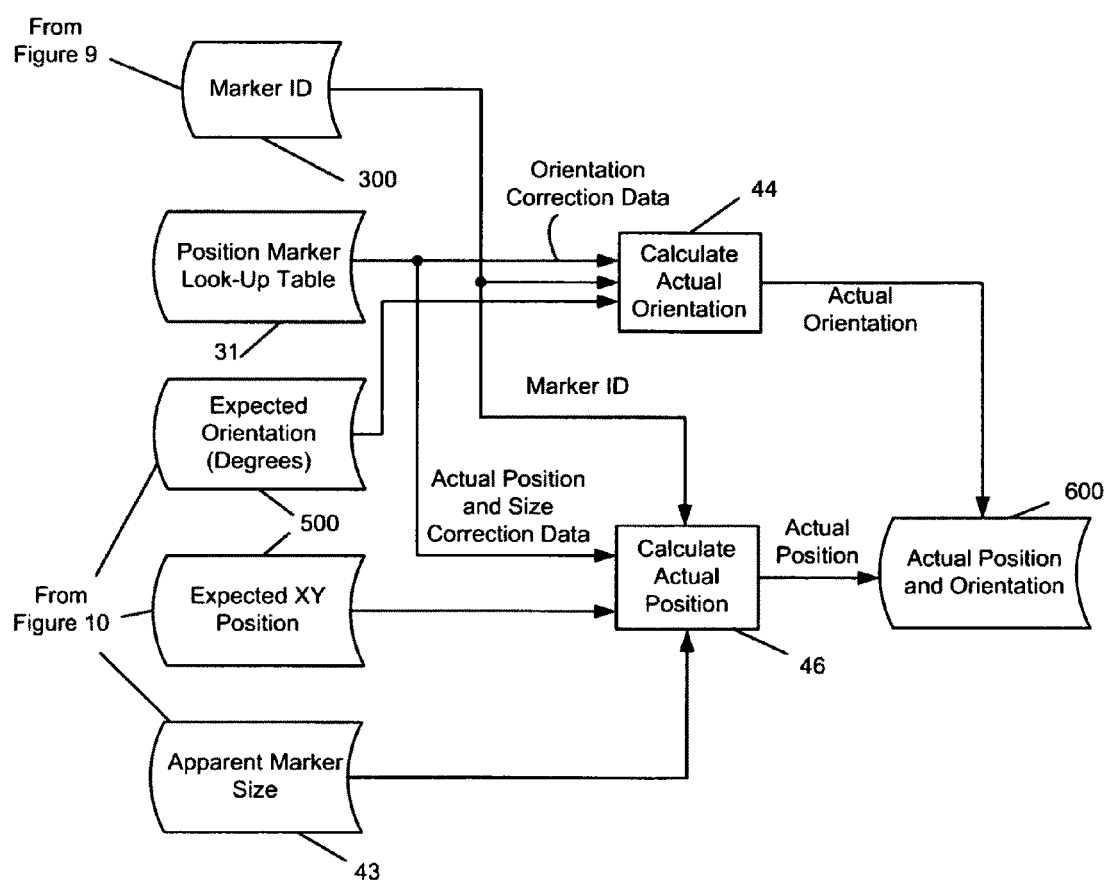
FIG. 11 shows a software flow diagram for the calculation of actual position and rotational orientation.

The apparatus of the first embodiment is illustrated in FIGS. 1A, and 3 through 6. A Position Marker Look-Up Table is shown in FIG. 7. FIG. 8 presents a high level software flow diagram for the general solution for position and rotational orientation determination. FIGS. 9 through 11 are software flow diagrams that show the method for image processing, feature processing, determination of expected position and rotational orientation and the calculation of actual position and rotational orientation.

In this example, the vehicles have freedom of motion in two dimensions within the operating area; therefore, the invention embraces two-dimensional analysis, plus single degree-of-freedom rotation (heading) determination.

Referring to FIG. 1A, a first embodiment of the invention will now be described in detail. The plurality of position markers 2 are preferably supported in rows on cords in accordance with the teachings of U.S. application Ser. No. 12/319,825. Alternatively, a coordinate reference, if used, is made from thermoplastic flat net such as CintoFlex "D", available from Tenax Corporation. Designed to prevent deer from entering highways, the material is lightweight, strong, and inexpensive. The net is cut to the dimensions sufficient to cover the area of interest; for example, it can be cut to the size of a storage area. Multiple nets can be adjoined side by side to cover large areas. Alternatively, the net can be cut into strips wide enough to support rows of position markers, whereby each strip spans across a particular area within a building, and the strips are suspended in parallel with one another.

From FIG. 3, position markers 2 are fabricated of two components: a backing plate 2a and a label 2b. Labels are printed using common bar code label printers such as the Intermec Model PX6i Thermal Transfer label printer. Label stock such as Duratran® II Thermal Transfer Label Stock, part No. E06175, also available from Intermec Corporation, is available from many suppliers. Bar code symbols, each containing a unique identification encoded in 1-D bar code symbology are printed on the label stock, along with human readable text. Bar codes of most standard formats are usable; for example, Code 39, Code 128, CODABAR, UCC/EAN128, and Interleaved Two-Of-Five (ITF) codes are common. The labels 2b are then adhesively affixed to a stiffer substrate, or backing plate, 2a, to add mechanical strength. Many materials can be used for backing plates, but for its low cost and ease of use, white 0.030 inch thick PVC (polyvinyl chloride) is a good choice. The backing plate is sized larger than the label to provide an optical quiet zone around each bar code symbol. Attachment of the backing plate to the coordinate reference cords can be done in many ways, using staples, glue, weldments, etc., but is preferably done with plastic wire ties. Attachment is done by inserting the tie into holes that have been punched or drilled in the backing plates, and threading the ties through the net.

The manned vehicles 6M and automated vehicles 6A have affixed to them machine vision cameras 4. An illumination source 9 may be required for dark operations such as in dimly illuminated warehouses. The light source may be a spotlight, floodlight, strobe, light emitting diodes (LED's), or another conventional source. The preferred embodiment utilizes a circular array of high intensity (LED's) surrounding the camera 4. A computer 5 typically resides on-board as shown on the fork lift truck (vehicle 6M) of FIG. 1A. Standard commercial wireless data communication network equipment 8 provides data transmission between vehicles 6M and 6A and a computer 105 stationed remotely. In an automated vehicle navigation application (FIG. 1B) the computer 5 resides onboard the vehicle 6A and a second computer 105, that is located preferably in an adjacent office area, communicates with the first computer 5 over a wireless data communication network. The wireless data communication network is preferably implemented in accordance with the IEEE 802.11 wireless local area network standard.

Image Capture and Marker Identification (FIG. 8 100, 110, 120, 130, and 300)

The method of this embodiment utilizes callable vendor-supplied subroutines to analyze position markers and store data obtained from the analysis. Rotational orientation and position are calculated from these data and stored or transferred to other devices. This embodiment applies a commercial machine vision system such as the Insight® 5000 series from Cognex, Incorporated. "In-Sight Explorer®" software provided with this system offers a wide array of feature extraction, mathematical, geometric, object identification, and barcode symbol decoding subroutines.

Image Processing—Brief Description

FIG. 8 presents a high-level flow diagram. The overall process produces four separate sets of data: marker ID 300, approximate position 400, expected position and heading 500 and actual position and heading 600.

Upon internal or external command, an image is captured 110 by the machine vision camera and stored into its memory. Analysis begins by locating 120 a readable position marker image (image in which the bar code can be decoded) within the field of view. In normal circumstances and by design, at least one position marker will be present within the field of view. If greater accuracy is desired from the system, then by design the system can be installed such that more than one marker is consistently within the field of view. Once a marker has been located, the marker identification is decoded 130 and the data is stored in the machine vision system memory 4 and is available as an output 300. Marker positions are stored in a look-up table (FIG. 7) in computer 5, and the table can be accessed to return the approximate camera position 400. In other words, by knowing that the camera is viewing a particular marker the camera can be placed within the approximate region of that marker.

Markers may be directly encoded with position information, or they may be uniquely encoded with non-meaningful "license plate" numbers. Serial numbering is preferred for this method. Direct encoding allows the decoded ID to translate directly into real coordinates; for example, marker 100250 may be encoded to mean "100 feet south, 250 feet west"; or it may be encoded to mean "Aisle 10, Row 02, Elevation 5 (meters), Orientation zero degrees (0°) (north)"; or any other of a wide variety of encoding schemes. Approximate position 400 is calculated in this manner, based on decoded marker ID and a transformation scalar to convert pixels into feet. Unique encoding may be chosen whereby the ID has no inherent meaning and a look-up table contains references to the actual position.

The image is next analyzed 150 to determine the relative position, orientation, and size of the marker within the field of view. The marker's angular orientation and its azimuth from the center of the field of view are calculated and stored in degrees. Expected position and orientation can then be calculated 160 using plane geometry for markers that directly encode position. For uniquely encoded markers this step is performed by accessing the look-up table of FIG. 7. Expected position and heading 500 is based upon the marker's encoded position and orientation being correct. Since actual values may differ if the marker is installed slightly offset from its encoded location or orientation, an actual position and orientation is calculated by referencing the position marker look-up table of FIG. 7 to generate actual position and heading 600.

In the case where multiple position markers are within the field of view, the expected position is determined by using plane geometry to calculate the distance and angle from the center of the field of view (Point O FIG. 24) to the centers N1 and N2 of position markers within the field of view. This is described more fully in the description of the second embodiment. The object orientation is determined relative to a line segment N1-N2 (or segments if more than two markers are within view) drawn between the centers of each position marker within the field of view. Using this method the object position and the orientation can be determined using only the position information of the markers. The orientation of the markers within the reference coordinate system is then not material to the calculation.

Marker ID, relative position within the field of view, angular orientation, and marker dimensions are passed to a computer unit 5. The decoded ID serves as a key to access actual marker position data 170, which is obtained from a look-up table in computer unit 5. The camera's actual position is then calculated 180 from the marker's position within the field of view; that is, how far from the center of the field of view, and at what azimuth, as in step 160, but using actual positional and orientation values. The results are transformed from pixels into real dimensions such as feet or meters. The results 600 can be saved and/or conveyed to other devices for storage, presentation, or other purpose. The cycle repeats 200 once a full determination has been made. In the case of multiple viewable position markers, the marker size is not relative to the calculation of object position or orientation. In this case, the actual distance between viewed markers from the Look-Up Table is used to perform scaling functions from pixels to actual dimensions.

A complete description of image processing steps follows.

Image Capture and Marker Identification (100, 110, 120, 130, and 300)

Referring to FIGS. 8, 9, 10, and 11, the following steps take place within the machine vision software.

Figure 4:
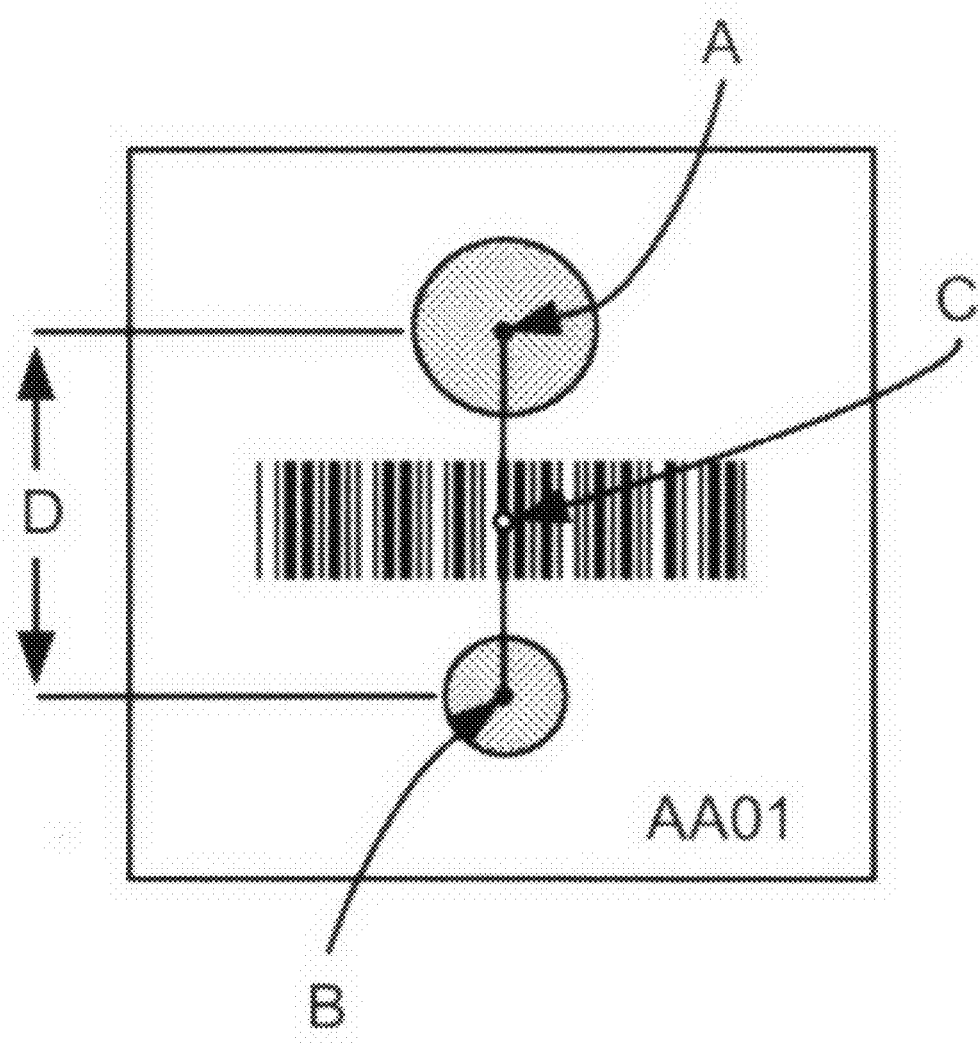
FIG. 4 defines key points A and B, point C (the midpoint of line segment A-B which defines the center of the symbol), and dimension D (the length of line segment A-B) of position marker 2.

The machine vision camera 4 continuously, or on command, captures analog and/or digital images of the position markers 2, 3 of the coordinate reference 1. One or more position markers 2, 3 are partially or fully visible within the camera's field of view at any given time. Once an image is captured, the software analyzes it as follows:

Image data 20 (FIG. 9) is manipulated by preprocessing routines 21 to enhance image features such as sharpness, contrast, and brightness. The resulting processed image is tested 22a for data readability. The image is returned for additional processing 23 if not adequate for interpretation and again tested 22b for readability. Once the image has passed preprocessing, it is analyzed 24 to locate all position markers. This stage determines whether single or multiple position markers appear within the field of view, and superfluous image data such as position marker printed text and background objects and the coordinate reference are ignored. Position markers found fully visible within the field of view are analyzed for readability 25 to determine if the bar code associated with the marker can be decoded. If a single marker is found, selected image data are passed to a decoder 27; if multiple markers are present, image data are passed to a readability test 26, which determines which markers are readable and passes the image data for all readable markers to the decoder 27. Alternatively, the readability test may select the marker closest to the center of the image and pass that image data to the decoder 27. Alternatively all position markers found within the field of view may be passed to the Decoder. Decoder 27 "reads" the encoded unique identification code of the position marker and returns alphanumeric data that are stored as decoded position marker identification data 300. An example of an encoded one-dimensional bar coded position marker is shown in FIG. 4. Selected image data for a single marker are also passed to position marker key point locator 29 which analyzes image data to locate key points A, B, and C of the position marker symbol (FIG. 7). Key points are then stored 30 as pixel coordinates.

In the case of position marker 2 of FIG. 4, having a one-dimensional barcode, the locating mechanism 24 first finds bar codes within the field of view; then steps 25 through 27 proceed to decode the barcode. "Blobs" (contiguous dark areas on light backgrounds) nearest to the chosen bar code are located, and the centers of the blobs are determined. Since one blob is always larger than the other for any given marker, the areas of the two are calculated and compared. Position marker key points A and B are defined to be the centers of the circular geometric position references 9. Key point C is calculated by adding the X pixel values of A and B and dividing by 2, and adding the Y pixel values of A and B and dividing by 2 to find the midpoint C of line segment A-B.

Approximate Position Determination (140, 400)

Referring to FIG. 10, the following steps begin after completion of image processing and feature extraction steps. Marker identification can be translated directly into real X and Y position data for markers that are directly encoded. As earlier illustrated, marker ID 100250 might translate directly as "100 feet south and 250 feet west". Having this marker within the field of view implies that the camera (vehicle) is somewhere near this point, but not necessarily exactly at this point. With markers spaced ten feet apart, the camera and vehicle would probably lie within half-marker spacing, or five feet. Object orientation is not determined. Approximate position 400 is determined 32 and is stored in memory.

Expected Position and Orientation Determination (160, 500)

Figure 5:
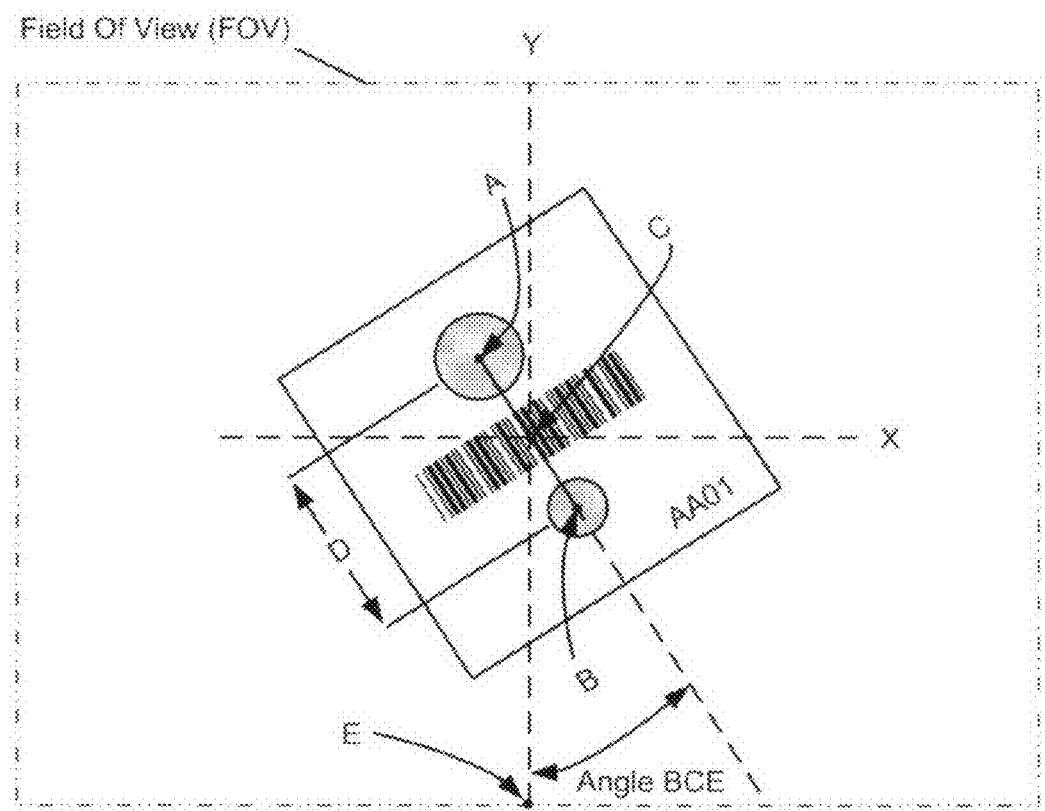
FIG. 5 shows the position marker 2 rotated counterclockwise with respect to Cartesian coordinate axes X and Y and defines point E and angle BCE as the angle of rotation.
Figure 6:
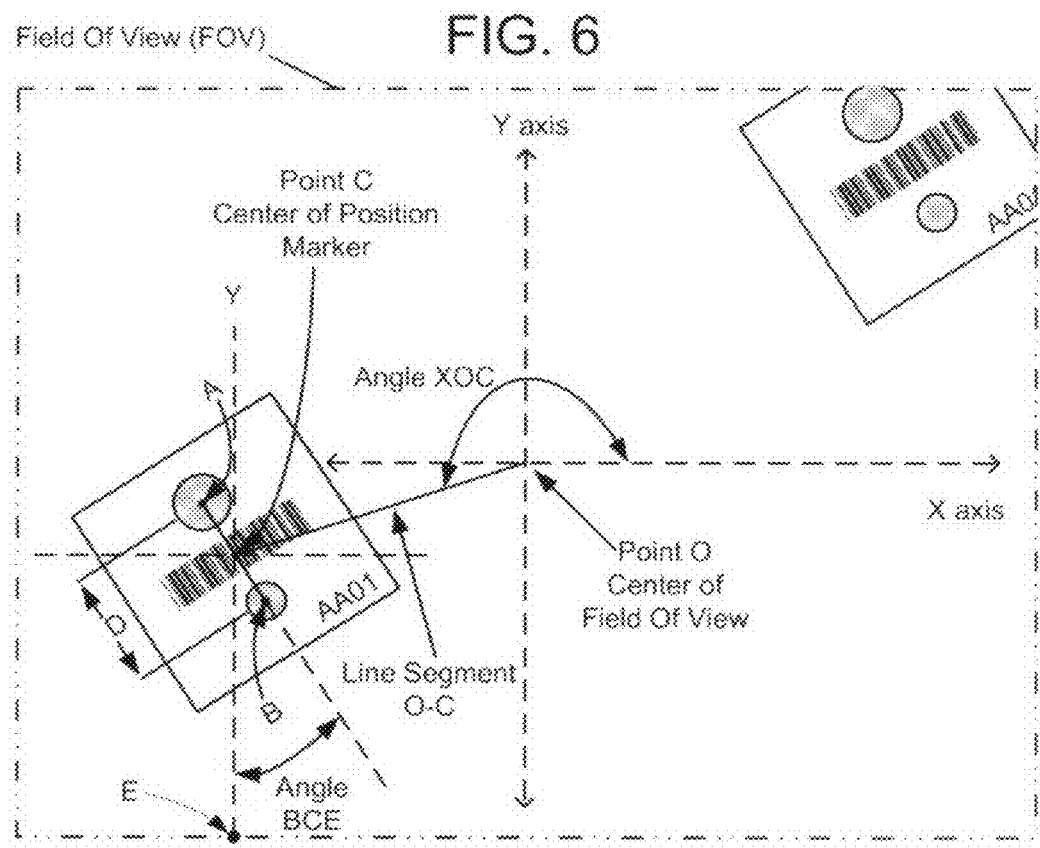
FIG. 6 shows a camera's field of view with one entire position marker and one partial position marker in view. The distance between the center of the field of view (point O) and the center of the position marker (point C) is defined as line segment O-C. Angle XOC is defined as the radial angle from the X-axis to the position marker.
Figure 24:
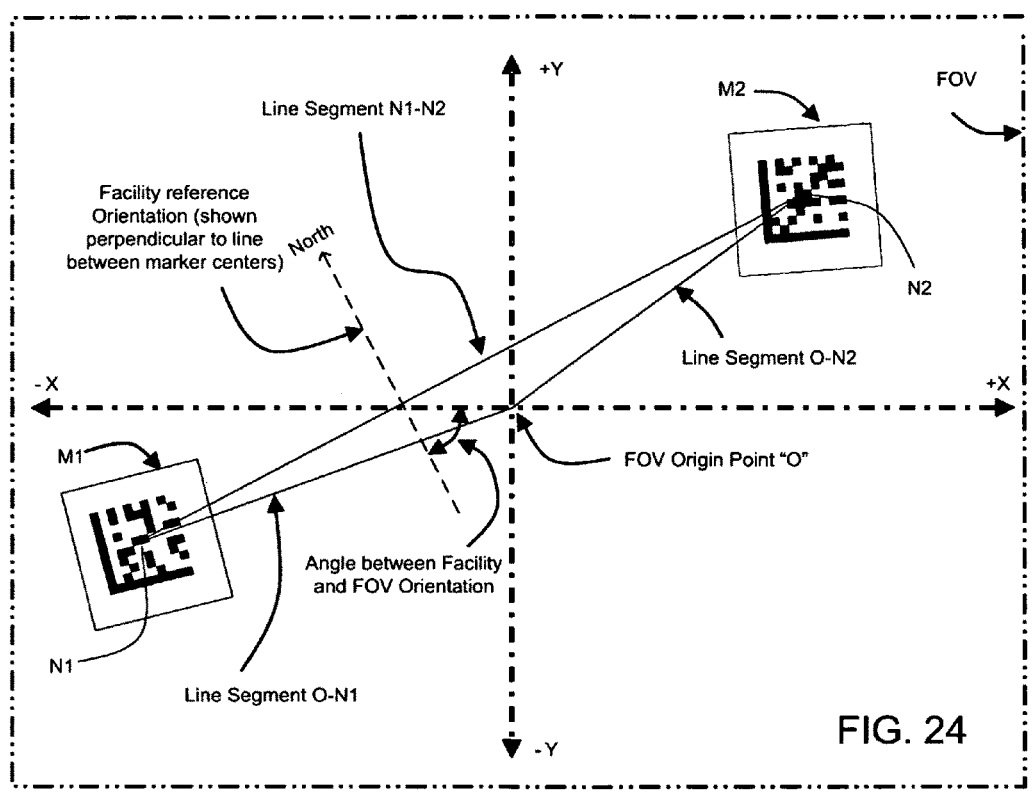
FIG. 24 shows a camera's field of view with two entire position markers within view; the line segments between position marker centers and the center of field of view are indicated; the facility reference orientation is also shown with the angle between the facility reference orientation and the camera field of view (FOV) orientation.

Referring to FIGS. 5, 6, and 10, and applying only to directly encoded markers, a geometric analysis of the markers' positions and rotation relative to the field of view can more accurately determine the camera's position and rotational orientation. Point E coordinates are established 34 as the X coordinate value of point C and the maximum pixel value of the Y axis (at the edge of the camera's field of view (FOV)). Pixel coordinates of Key Points B and C, 30, are used to calculate angle BCE, 37, the rotation angle of the position marker relative to the field of view. Angle BCE is then used 35 to calculate the vehicle's expected orientation 500. The length D of line segment A-B is calculated 42 to determine the apparent marker size 43. In the case of multiple position markers within the field of view, the rotation angle is found relative to a line or lines drawn between the markers (FIG. 24).

Angle BCE is illustrated in FIG. 5 and shown in the camera's field of view in FIG. 6. Point C coordinates are used to calculate: (a) angle XOC (FIG. 10 box 38) the radial angle between the center of the image and the center of the position marker; and (b) the length of line segment O-C 39, which is equal to the radial distance from the center of the image (center of the camera), Point O, to the center of the position marker, Point C. Once these two values have been established, it is possible to calculate 40 a more accurate expected X, Y camera position using plane geometry. The "expected X-Y position" 500 is therefore an accurate calculation based on the expected (encoded) position and orientation of the marker.

Actual Position and Orientation Determination (170, 180, 600)

The Position Marker Look-Up Table 31 (FIG. 7) is a database containing actual X, Y, and Z coordinates and rotational orientations that have been measured and recorded for all position markers at the time of the coordinate reference installation. Coordinate values are recorded in conventional units, such as feet, meters and degrees. In this embodiment, and referring to FIG. 2, the coordinate reference (left side of drawing) includes markers AA01, AA02, etc. X values correspond in the example to the north/south coordinate; Y values to east/west coordinate; Z values to marker height above the floor, a values correspond to the difference between the marker's actual rotational angle and its nominal angle, and the size value records the marker's dimensions referenced to the length of line segment A-B.

A confidence factor may optionally be stored in the Look-Up Table 31 for each position marker. The confidence factor is a figure of merit that the Look-Up Table accurately provides a position marker's actual position and actual orientation. For example, a position marker attached directly to immovable building structure may have a high confidence factor, whereas a marker attached to coordinate reference 1 may have a lower confidence factor if the coordinate reference is known to move slightly during a wind gust.

In the case where multiple markers are within the field of view the image pixel values for line segments O-N1 and O-N2 (FIG. 24) are related by the Position Marker Look-Up Table to actual coordinates. The location of the vehicle (Point O) can then be determined in actual coordinates.

Actual orientation is calculated 44 (FIG. 11) as the sum of the expected orientation and the look-up table value of θ. Actual position is recalculated 46 exactly as in steps 150 and 160, but using look-up table data instead of expected (assumed) X and Y data. In the case where multiple markers are within the field of view, the angle between the camera and a line between viewed position markers is known. Since the line between markers can be ascertained in actual coordinates from the Position Marker Look-Up Table, the orientation angle of the camera can also be determined in actual coordinates.

Apparent marker size 43 is applied as an adjustment factor in calculation 46 for markers whose dimensions differ from nominal.

Decoded marker ID 300 is used in FIG. 11 to search Look-Up Table 31. The results of this calculation are stored. The Z coordinate position of the camera may optionally be determined. To determine the Z coordinate position, Key Points A and B are used to calculate the length D of Line Segment A-B of the image. Since the distance between Points A and B on the position marker 2 is known and the focal length of the lens of the camera 4 is known, the distance from the camera 4 to the position marker can be determined from the ratio of the length D of Line Segment A-B in the image to the distance A-B on the position marker 2. Since the Z coordinate of the position marker 2 is known, the Z coordinate of the camera may be readily calculated. The Z coordinate is then stored.

The final step is the calculation 46 and combination of actual rotational orientation and actual X and Y coordinates into a single unit of data 600 that can be stored in local memory or transmitted to other devices, such as a vehicle controller (implemented by computer 105). Rotational orientation and position data derived from the image processing steps may be optionally transformed into alternate units to indicate specific regions such as aisles, storage zones, sectors, or areas.

Position Marker Support Arrangement

U.S. application Ser. No. 12/319,825 filed Jan. 13, 2009, Entitled "OPTICAL POSITION MARKER APPARATUS" teaches an apparatus for marking predetermined known overhead positional locations within a coordinate space, for viewing by an image acquisition system, is disclosed. As may be seen in FIG. 1B, the apparatus comprises a plurality of position markers, the position markers being grouped in one or more rows, each row having an axis, the position markers in a row being supported by a row support. Each position marker (FIG. 12) comprises an optically opaque, dark colored corrugated substrate 3*a*, substantially rectangular in shape. An adhesive-backed label 3*b* having a unique machine-readable barcode symbology printed thereon is positioned centrally on the substrate so that a dark colored border of the substrate surrounds the label.

Figure 1C:
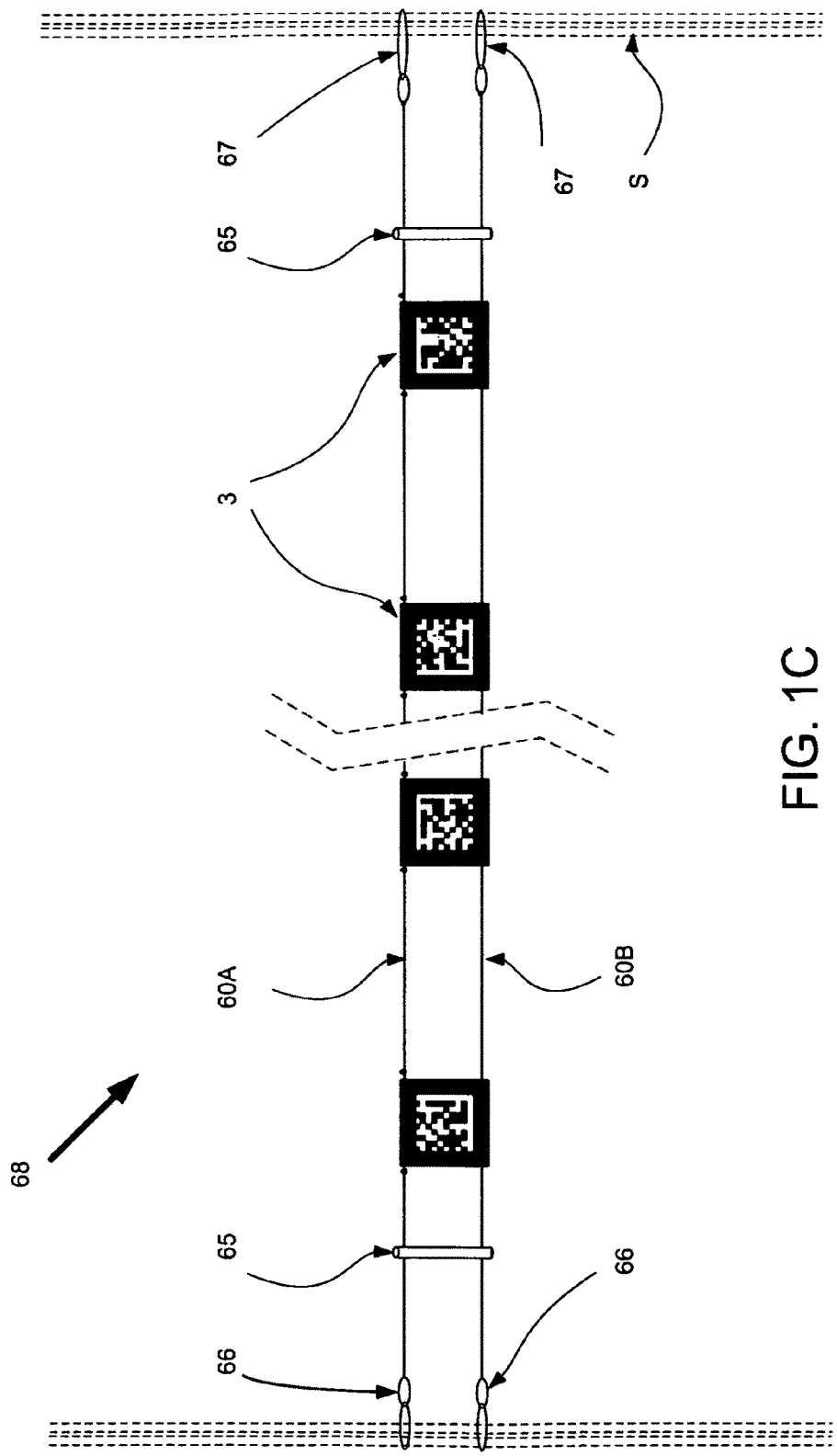
FIG. 1C shows a row group of position markers supported by a pair of support cords.
Figure 1D:
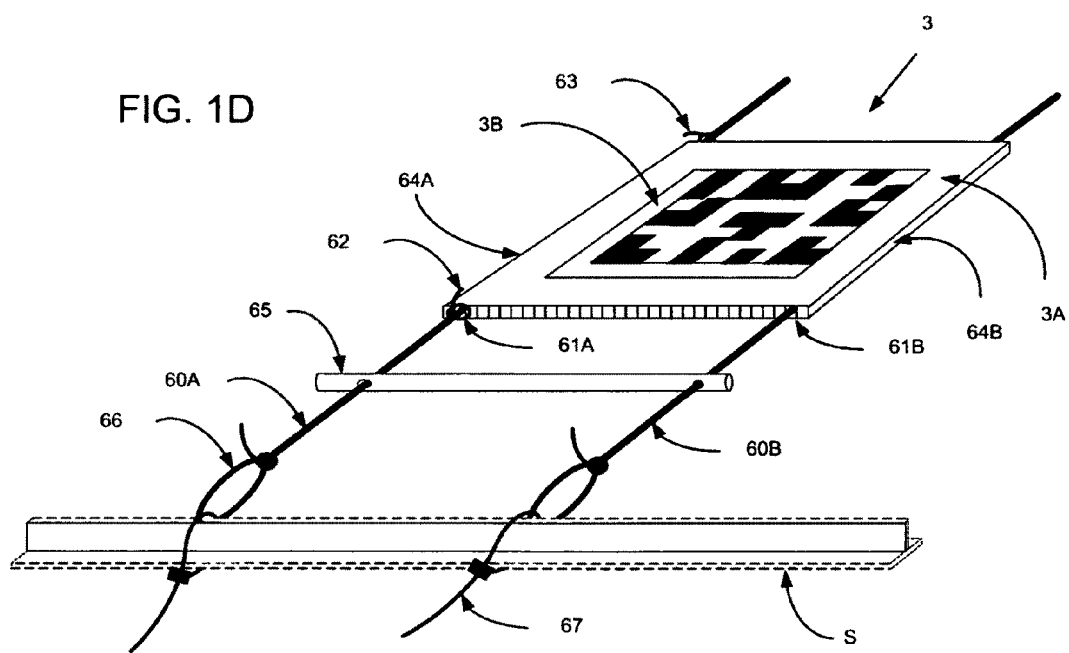
FIG. 1D is a perspective view showing a preferred arrangement for mounting the position markers to two support cords attached to building support structure S, also illustrating the support cords being fed through holes in a spreader bar.

Each row support comprises a first support cord and a second support cord (FIGS. 1C and 1D). The first support cord supports a first lateral edge of the position markers in a row group in a fixed, spaced-apart positional arrangement (FIG. 1C). The second support cord supports the second lateral edge of the position markers in the row in a slidable support arrangement. The first support cord is attached to an overhead support structure at each end with a tensioning device and the first support cord is drawn to a predetermined tension, thus establishing a substantially straight first lateral row edge. The tensioning devices on the first support cord permit precise positioning of the position marker group along the row axis. The second support cord is also attached to the support structure at each end with a tensioning device and the second support cord is drawn to substantially the same tension of the first cord, so that the position markers are supported in a substantially horizontal plane. The slidable support of the second edge allows the position markers of a row group to align along the first lateral edge and eliminates any skewing of the position markers due to unequal tensions in the support cords. A spreader bar 65 is provided at each end of the support cords to establish a fixed spacing of the support cords corresponding to the spacing of the first and second lateral edges of the position markers, thus preventing the application of lateral forces to the substrates.

FIG. 1D is a perspective view, corresponding to FIG. 1B, showing a preferred arrangement for mounting the position markers to two support cords attached to building support structure S, also illustrating the support cords being fed through holes in a spreader bar.

In this preferred embodiment a corrugated substrate 3*a* of FIG. 12 is used and each support cord 60A, 60B is threaded through a corresponding corrugation channel 61A, 61B adjacent to each lateral edge 64A, 64B of the substrate 3*a*. The first support cord 60A is threaded through a corrugation channel 61A adjacent to the first lateral edge 64A of the substrate 3*a*. Two fasteners 62, 63 such as a nylon cable ties, also known as a zip ties, available from NELCO Products Incorporated of Pembroke, Mass., are cinched down tightly on the first support cord 60A, one at each side of the position marker 3 to hold the position marker in place on the cord 60A, thus establishing a fixed, spaced-apart positional arrangement (best seen in FIGS. 1B and 1C) for the position markers 3 in a row group 68. The second support cord 60B is threaded through a corrugation channel 61B adjacent to the second lateral edge 64B of the substrate 3*a* to support the edge in a slidable manner.

As may be seen in FIG. 1C the position markers 3 are attached to the first and second support cords 60A, 60B of a supporting cord or cable assembly, known as a row support, in a fixed, spaced-apart positional arrangement to create row groups 68 of position markers. The support cords 60A, 60B of the support cord assembly should have substantially no stretch. A cord material, such as one eighth inch diameter antenna cable, having a diamond braided polyester outer jacket with a Kevlar® core used for radio antenna support, available from Erin Rope Corporation of Blue Island, Ill., has been found suitable.

As seen in FIGS. 1C and 1D a stiff bar, termed a spreader bar 65, is used at each of row group 68 of position markers to maintain the support cords 60A, 60B at the proper separation, thus preventing the application of lateral forces to the substrates 3*a*. The spreader bar 65 can be made of any suitable material such as wood, fiberglass composite, metal or plastic. Holes formed adjacent to each end of the spreader bar 65 receive the corresponding support cords 60A, 60B to establish the support cord spacing.

A loop 66 is created at each end of each support cord 60A, 60B, such as by tying a bowline knot, so that the loop will not slip or close up when tension is applied. Tensioning fasteners 67, such as heavy-duty cable ties, are then inserted through each loop 66 at the end of each support cord 60A, 60B to serve as tensioning devices. A forty centimeter (fifteen inch) long heavy duty nylon cable tie available from NELCO Products Incorporated is the preferred tensioning device to attach the support cords to an overhead support structure S. It may be appreciated that by adjusting each fastener 67, the positions of the markers of a row group 68 may be precisely established.

Second Embodiment

Figure 17:
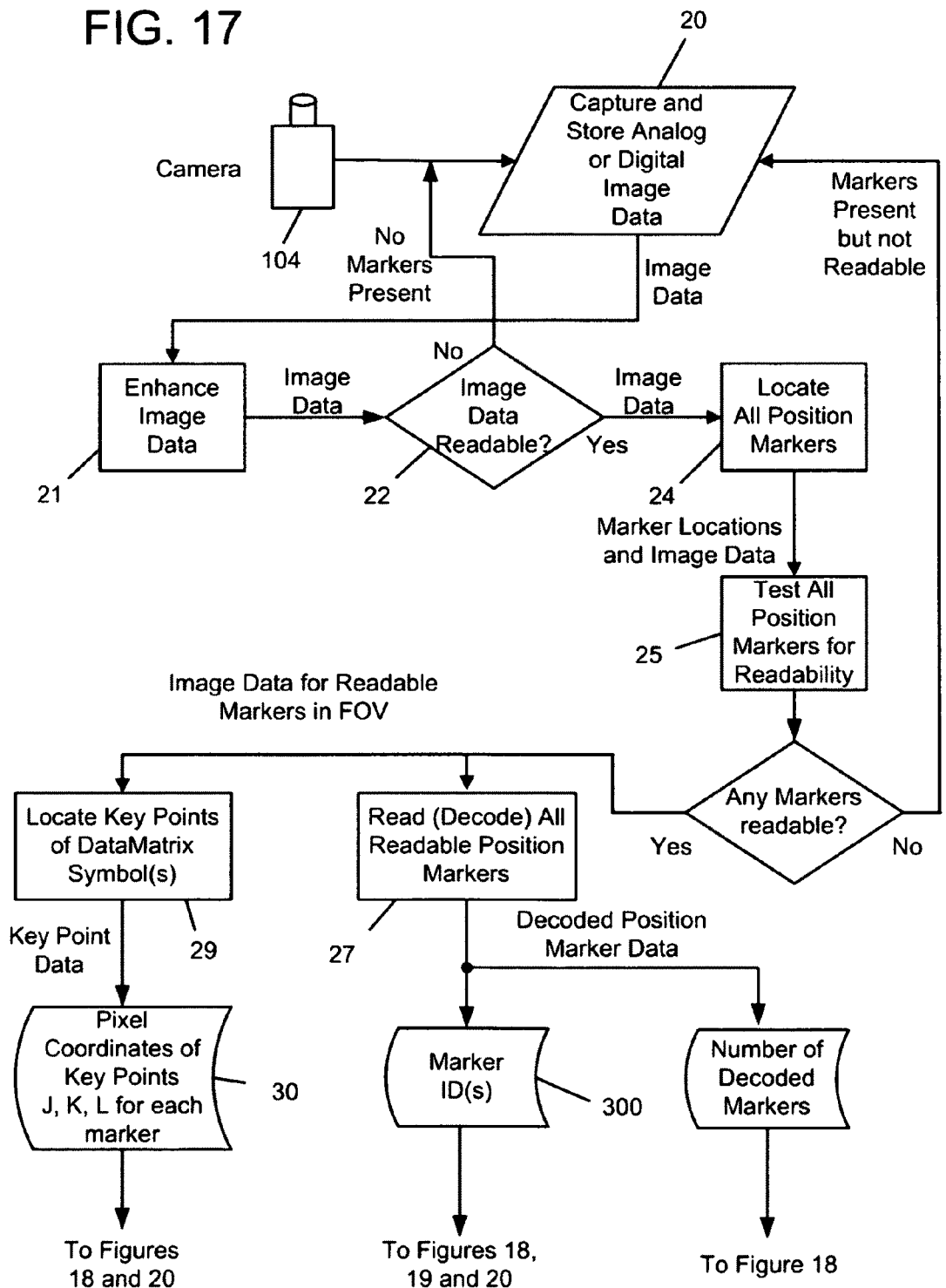
FIG. 17 presents a software flow diagram for image processing and feature extraction steps for marker type 3.
Figure 18:
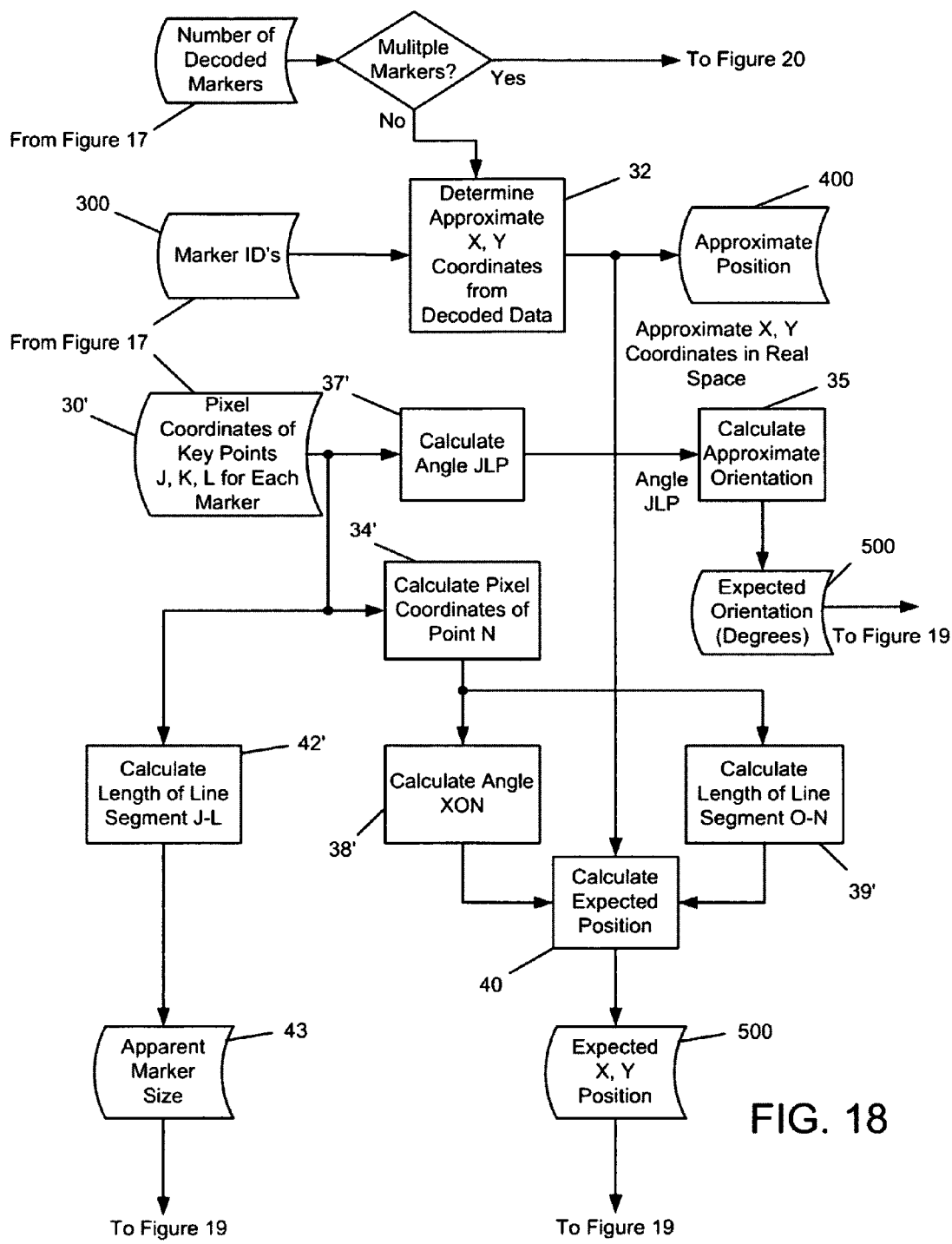
FIG. 18 shows a software flow diagram for expected position and rotational orientation determination.
Figure 19:
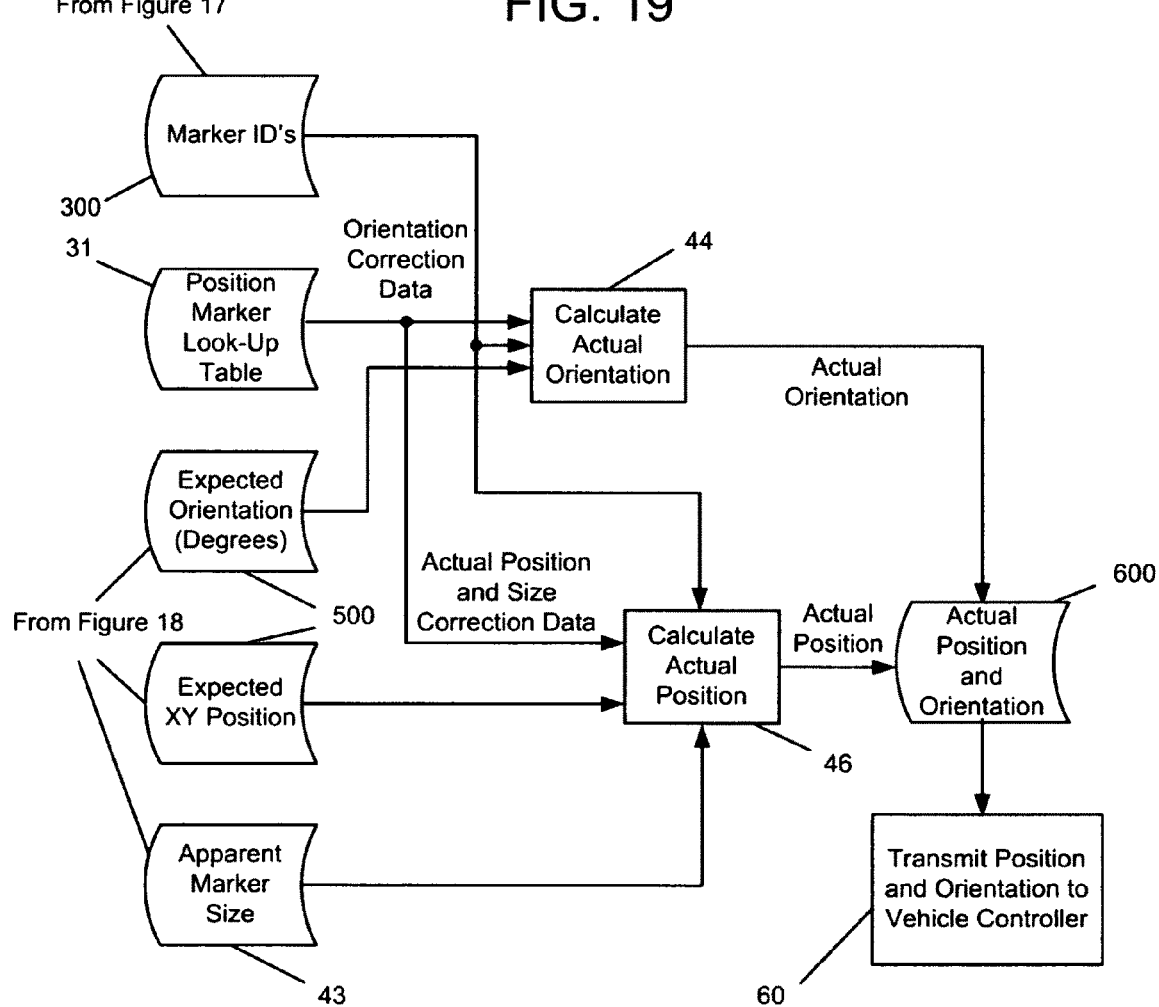
FIG. 19 shows a software flow diagram for the calculation of actual position and rotational orientation using a single position marker.

The apparatus of the second embodiment is illustrated in FIGS. 1B, 2, 8 and 12 through 15. A Position Marker Look-Up Table is shown in FIG. 16. FIG. 8 presents a high level software flow diagram for the general solution for position and rotational orientation determination. FIGS. 17 through 19 are software flow diagrams that show the method for image processing, feature processing, and determination of expected position and rotational orientation and the calculation of actual position and rotational orientation.

Figure 2:
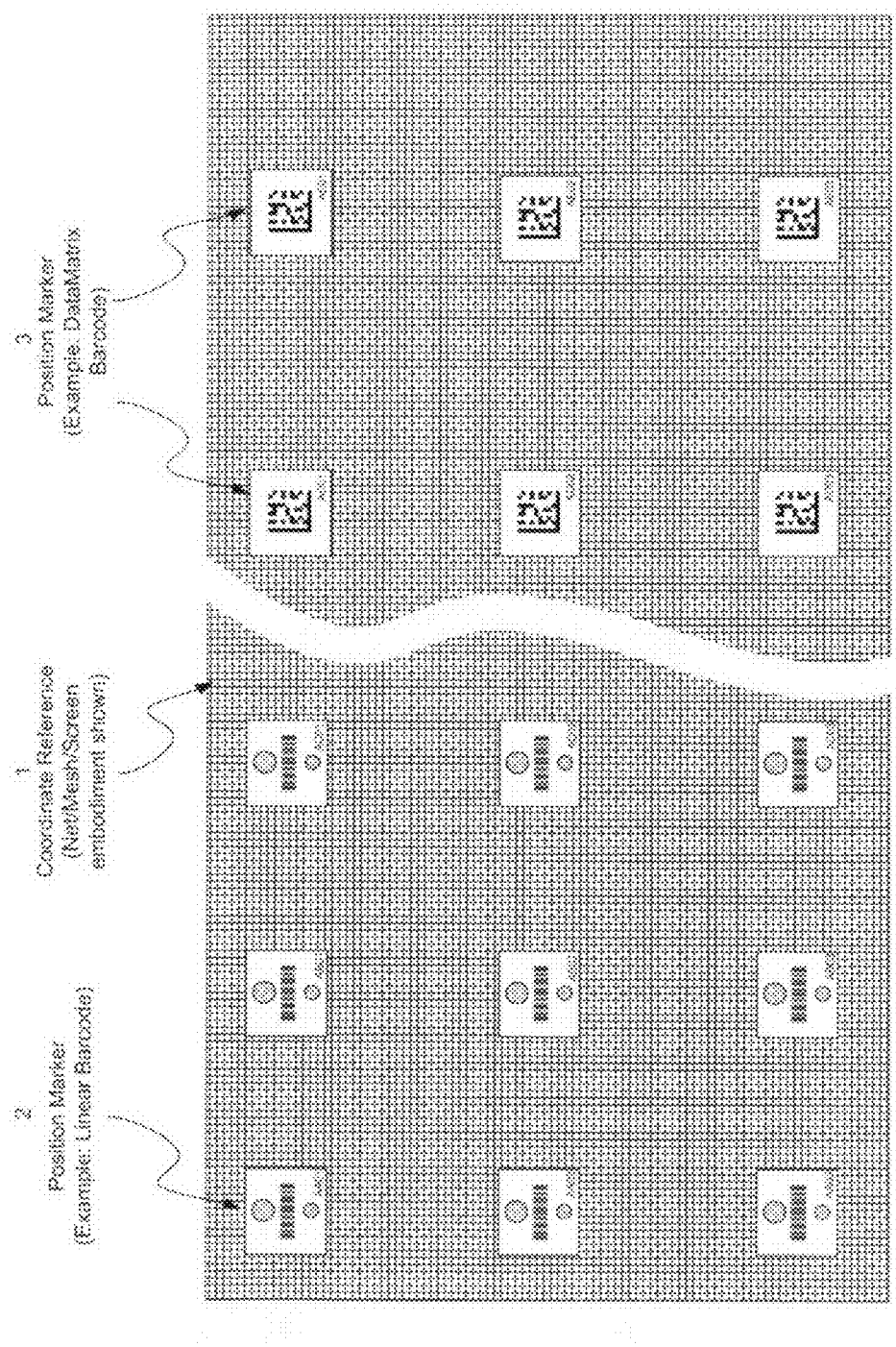
FIG. 2 illustrates two implementations of coordinate reference 1, showing arrays of two types of position markers: type 2 (employing linear bar code symbols) on the left drawing half, and position markers type 3 (employing two-dimensional bar code symbols) on the right drawing half.

Referring to FIGS. 1B and 2, a second embodiment will now be described. This embodiment utilizes two-dimensional bar codes. Coordinate reference 1 consists of position markers 3 (FIG. 12), which are fabricated of labels 3b and substrates 3a. Bar code symbols, each containing a unique identification encoded in two-dimensional bar code symbology are printed on the label stock, along with human readable text. Bar codes of standard formats can be used including Datamatrix, Code One, PDF417, Array Tag, and QR Code. Datamatrix symbols are chosen in this embodiment for their ubiquitous usage, error correction robustness, and a well-developed suite of image processing software available in commercial machine vision systems.

Description of the Flow Charts

Referring to FIGS. 1, 8, 17, 18, and 19, the following steps take place. The machine vision camera 4 continuously, or on command, captures analog and/or digital images 20 of position markers 3. At least one position marker 3 is fully visible within the camera's field of view at any given time. Once an image is captured, the software analyzes it in steps 21, 22, 24, and 25 (FIG. 17). The chosen marker is analyzed to locate key points J, K, and L, which are defined in FIG. 13. Key point coordinates are stored 30 for each point, and the marker ID is decoded and available as an output 300.

Approximate Position Determination (140, 400)

Position markers 3, whether supported on a coordinate reference as in FIG. 1A or by rows of cords as in FIG. 1B, identify coordinate locations. After being installed in the coordinate space, such as a warehouse facility, the markers remain stationary. Each marker therefore corresponds to a particular coordinate location, i.e., a location on the warehouse floor, and a database of these locations (i.e., a map) is created and stored in a memory in a computer unit 5.

The map database may be generated in advance of coordinate reference installation, and populated with expected values. It may be modified after installation if a physical survey determines that discrepancies exist between expected values and actual values for marker locations, rotation angles, or dimensions. Position markers commonly share uniform dimensions, but some applications may require markers of different sizes. Image analysis routines are presented to correct for position marker size variations or variations of the distance from the camera to the markers.

Referring to FIG. 18, marker identification can be translated directly into real X and Y position data for markers that are directly encoded. In this instance, object orientation is not determined.

Expected Position and Orientation Determination (160, 500)

Figure 14:
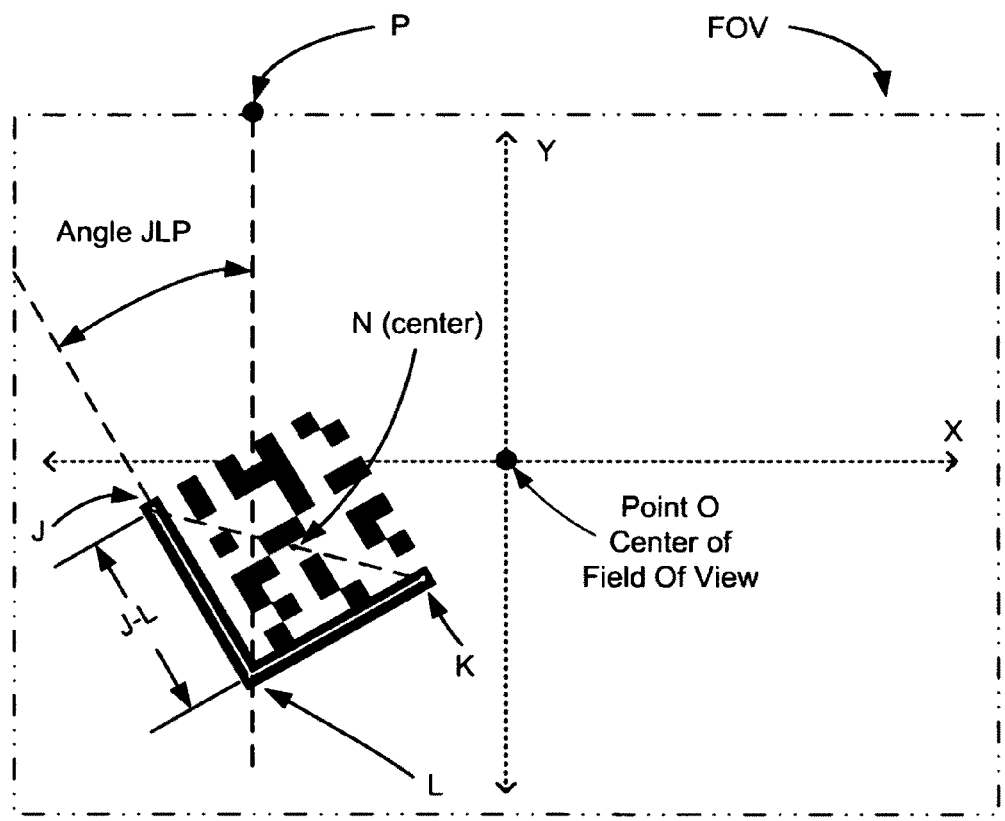
FIG. 14 defines point N, the midpoint of line J-K, which defines the center of the bar code symbol, and dimension J-L of position marker 3; and defines point P and angle JLP that indicates the rotational angle of the bar code symbol with respect to Cartesian coordinate axes X and Y.
Figure 15:
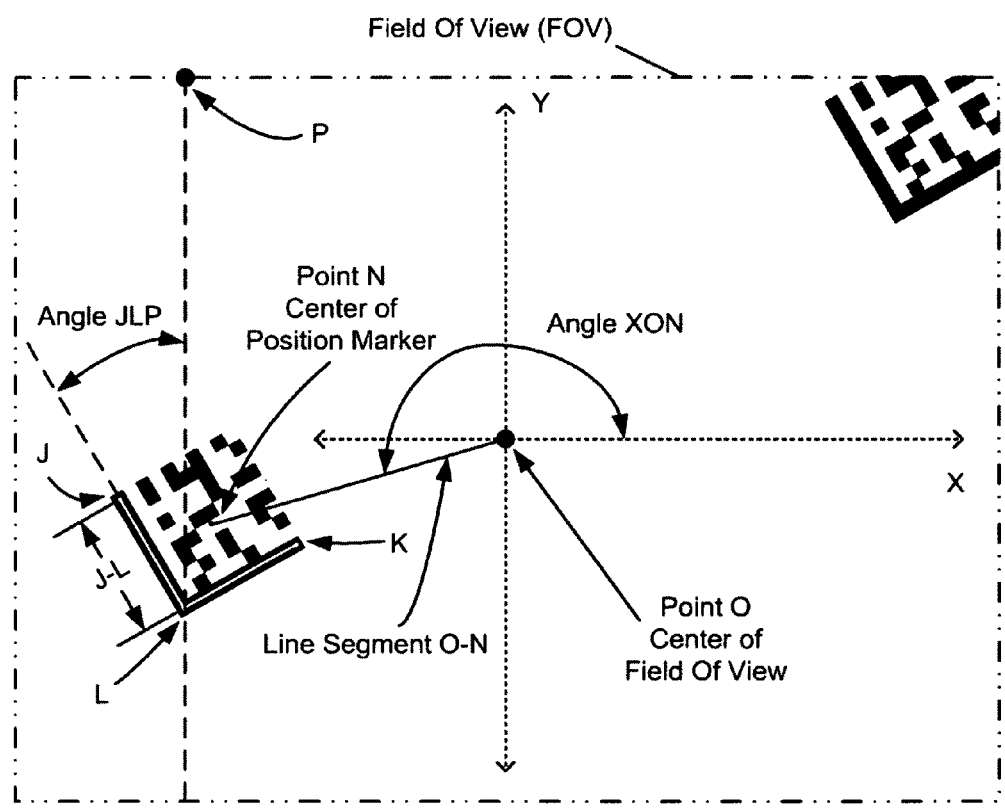
FIG. 15 shows a camera's field of view with one entire position marker and one partial position marker in view; the distance between the center of the field of view (point O) and the center of the position marker (point N) is defined as line segment O-N; angle XON is defined as the radial angle from the X-axis to the position marker.

Geometric analysis of the marker's position and rotation relative to the field of view can more accurately determine the camera's position and orientation. Pixel coordinates of Key Points J and L, (FIG. 17, Box 30), are used to calculate angle JLP, 37', the rotation angle of the position marker relative to the field of view. Angle JLP is illustrated in FIG. 14 and shown in the camera's field of view in FIG. 15. The X and Y values of pixel coordinates J and K 30 are summed and divided by two to establish 34' Point N (seen in FIG. 14), the midpoint of a line betweens points J and K, and the center of the position marker. The length J-L of line segment J-L is calculated 42' to determine the apparent marker size 43. Point N coordinates are used to calculate: (a) angle XON, FIG. 15, the radial angle between the center of the image and the center of the position marker; and (b) the length of line segment O-N, which is equal to the radial distance from the center of the image (center of the camera), Point O, to the center of the position marker, Point N. Once these two values have been established, plane geometry is used to calculate 40 a more accurate X, Y camera position. The "expected position" is therefore an accurate calculation based on the expected position and orientation of the marker.

The following functional steps analyze the image within the field of view, identify position markers, decode the position markers' encoded position information, calculate X-Y coordinates in pixel space, and convert the results to actual position and heading.

Actual Position and Orientation Determination (170, 180, 600)

The Position Marker Look-Up Table 31 (FIG. 16) is a database containing actual X, Y, and Z coordinates and rotational orientations that have been measured and recorded for all position markers at the time of the coordinate reference installation. Coordinate values are recorded in conventional units, such as feet, meters and degrees. In this embodiment, and referring to FIG. 2, the coordinate reference (right side of drawing) includes markers AD01, AD02, etc. The actual X values correspond in the example to the north/south coordinate; the actual Y values to east/west coordinate; the actual Z values to marker height above the floor, 8 values correspond to the difference between the marker's actual rotational angle and its nominal angle, and the size value records the marker's dimensions referenced to the length of line segment J-L. In the case where multiple markers are within the field of view the image pixel values for line segments O-N1 and O-N2 (FIG. 24) are related by the Position Marker Look-Up Table to actual coordinates. The location of the object (Point O) can then be determined in actual coordinates.

Actual orientation is calculated 44 (FIG. 19) as the sum of the expected orientation and the look-up table value of 8. Actual position is recalculated 46 exactly as in steps 150 and 160, but using look-up table data instead of expected (assumed) X and Y data. In the case where multiple markers are within the field of view, the angle between the object and a line between viewed position markers is known. Since the line between markers can be ascertained in actual coordinates from the Position Marker Look-UP Table—the orientation angle of the object can also be determined in actual coordinates.

Decoded marker ID 300 is used in FIG. 19 to search Look-Up Table 31. The results of this calculation are stored. The Z coordinate position of the camera may optionally be determined. To determine the Z coordinate position, Key Points J and L (FIG. 13) are used to calculate the length of Line Segment J-L of the image, thus establishing the apparent marker size 43. Since the distance J-L on the position marker 3 is known and the focal length of the lens of the camera 4 is known, the distance from the camera 4 to the position marker can be determined from the ratio of the length of Line Segment J-L in the image to the distance J-L on the position marker 3. With the Z coordinate of the position marker 3 also known, the Z coordinate of the object may be readily calculated. The Z coordinate is stored.

Apparent marker size 43 is applied as an adjustment factor in calculation 46 (FIG. 19) for markers whose dimensions differ from nominal.

The final step is the combination 600 (FIG. 19) of the actual rotational orientation 44 and actual X and Y position coordinates 46 into a single unit of data which can be stored in local memory or transmitted 60 to other devices, such as the vehicle controller. Rotational orientation and position data derived from the image processing steps may be optionally transformed into alternate units to indicate specific regions such as storage areas, zones, or sectors.

Improved Accuracy Method of Position Determination and Rotational Orientation Using Multiple Position Markers If more than two markers, i.e., a plurality of position markers M1, M2, . . . , Mx, are within the field of view, an image of the plurality of position markers M1, M2, . . . , Mx is acquired. A center point N1, N2, . . . , Nx is established for each respective marker M1, M2, . . . , Mx and line segments N1-N2, N1-N3, . . . , N1-Nx, . . . , N(x−1)-Nx connecting the respective pairs of center points are determined. A center point O of the field of view of the image acquisition system is determined. The line segments O-N1, O-N2, . . . , O-Nx respectively connecting point O with the centers N1, N2, . . . , Nx of the respective position markers M1, M2, . . . , Mx are then determined. The lengths and directions of line segments O-N1, O-N2, . . . , O-Nx are used to calculate the position of the vehicle relative to each of the known positions of the markers M1, M2, . . . , Mx. A mean value of the position of the vehicle within the coordinate space is then calculated, thereby determining the location of the vehicle within the coordinate space. The directions of line segments N1-N2, N1-N3, . . . , N1-Nx, . . . , N(x−1)-Nx within the field of view are used to calculate the rotational orientation of the vehicle relative to the respective pairs M1, M2; M1, M3; . . . ; M1, Mx; . . . ; M(x−1), Mx of position markers M1, M2, . . . , Mx. A mean value of the rotational orientation of the vehicle relative to the respective pairs of position markers M1, M2, . . . , Mx is then calculated, thereby determining the rotational orientation of the vehicle within the coordinate space.

By calculating a mean value of the position of the vehicle relative to a plurality of position markers, a more accurate vehicle position may be determined. Similarly, by calculating a mean value of the rotational orientation of the vehicle relative to pairs of a plurality of position markers, a more accurate vehicle rotational orientation may be determined.

If desired the mean value of the position of the vehicle within the coordinate space calculated is a weighted mean value. For example, each calculated position of the vehicle relative to the known positions of the markers M1, M2, . . . , Mx may be weighted according to the proximity of each position marker to the center point O of the field of view. This proximity is determined by the length of line O-Nx. The calculated positions relative to markers nearest to the center of the field of view may be accorded the highest weight, thereby minimizing any effect of optical distortion in the imaging system on the determination of the position of the vehicle.

Similarly, the mean value of the rotational orientation of the vehicle relative to the respective pairs of position markers calculated may be a weighted mean value. For example, each calculated rotational orientation of the vehicle relative to the directions of line segments N1-N2, N1-N3, . . . , N1-Nx, . . . , N(x−1)-Nx between respective pairs of position markers M1, M2, . . . , Mx may be weighted according to the proximity of each line segment to the center of the field of view. The calculated positions relative to the line segment nearest to the center of the field of view may be accorded the highest weight, thereby minimizing any effect of optical distortion in the imaging system on the determination of the rotational orientation of the vehicle.

Figure 20:
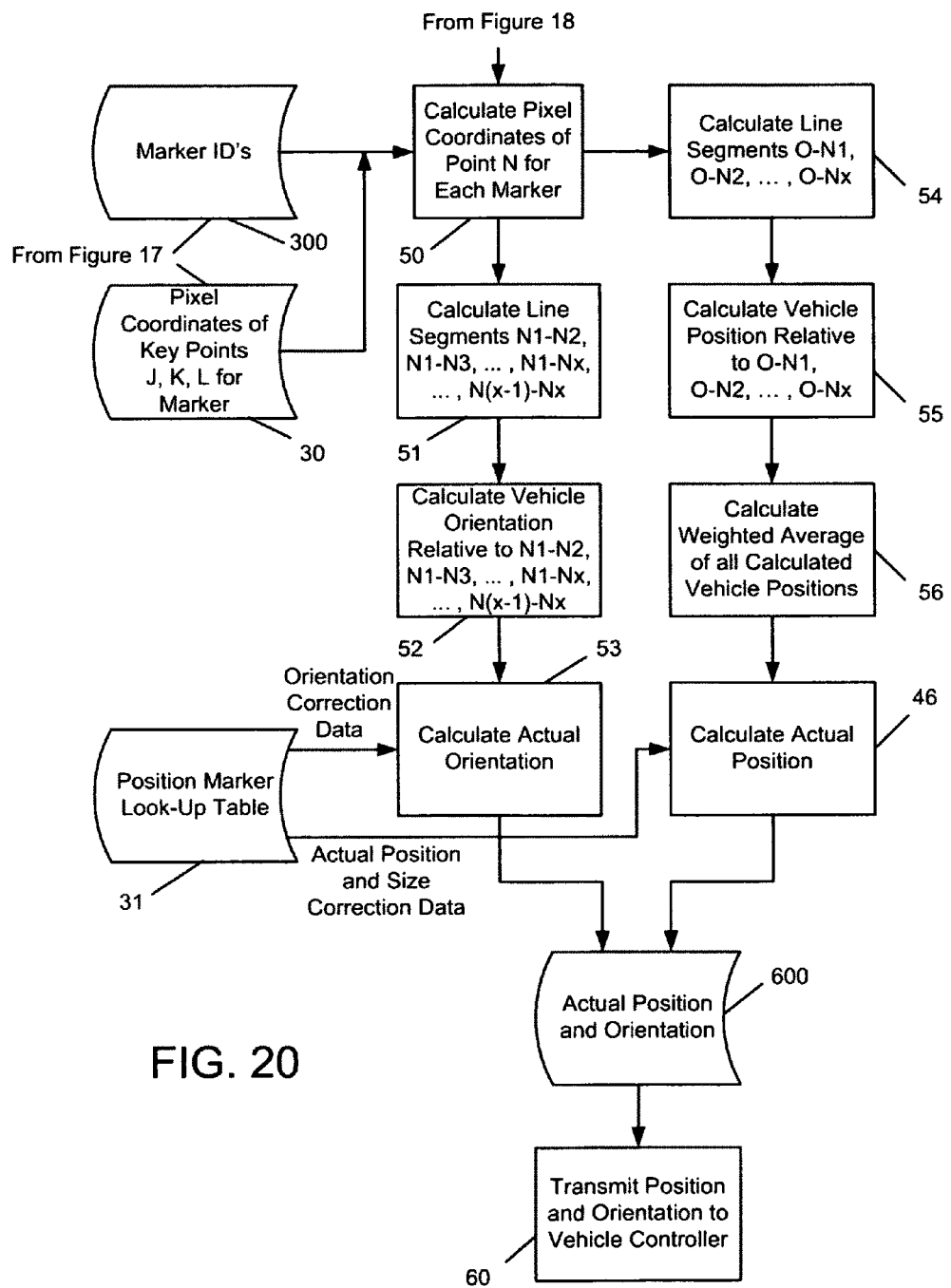
FIG. 20 shows a software flow diagram for the calculation of actual position and rotational orientation using multiple position markers.
Figure 21:
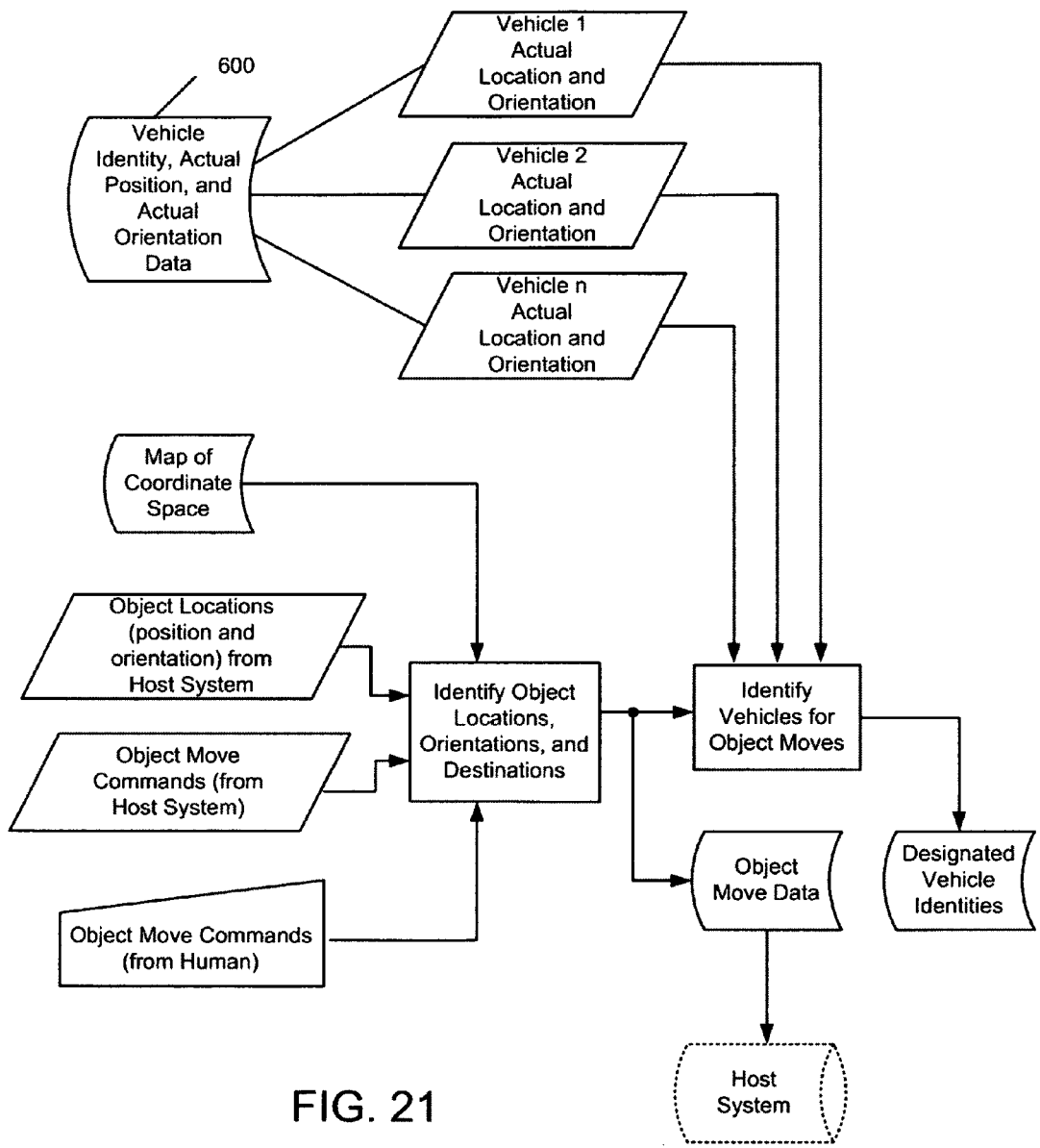
FIG. 21 shows a software flow diagram for the navigation of an automated vehicle in accordance with the present invention.
Figure 25:
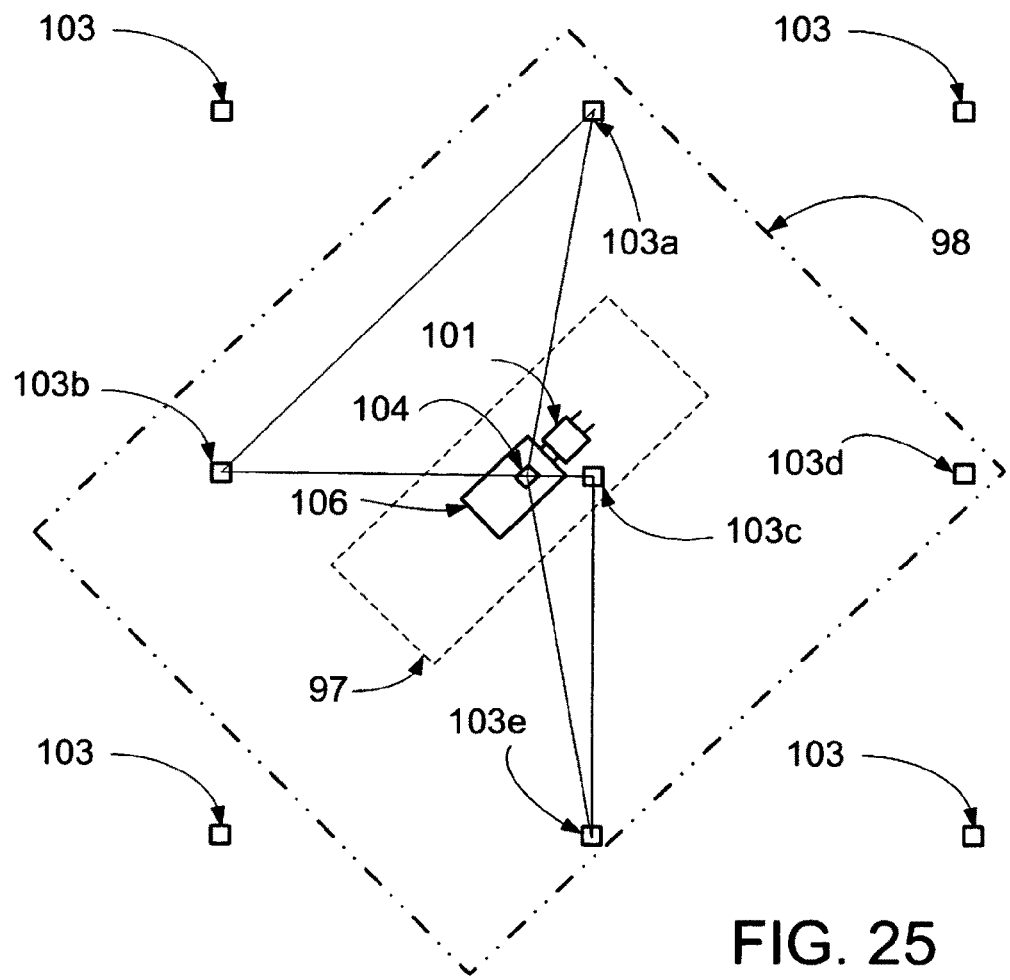
FIG. 25 shows a plan view of an automated vehicle, a safety zone surrounding the vehicle and the field of view of the image acquisition system mounted on the vehicle wherein five position markers lie within the camera's field of view.

When automated vehicles are moving in a predefined coordinate space under the control of a vehicle controller, it is essential that the position and direction of travel of the vehicle be accurately determined. In some situations having sufficient maneuvering room, such as Example 1 shown in FIG. 26, the vehicle position determination accuracy and rotational orientation accuracy obtained from a single position marker, as described above, is adequate. In other situations where vehicle maneuvering room is more restricted, such as Example 2 shown in FIG. 27, improved position accuracy and rotational orientation accuracy are essential for better control of the direction of travel of a vehicle 106 and thus prevent the vehicle from colliding with a barrier B (seen in FIGS. 26 and 27). If such improved rotational orientation accuracy is desired from the system, then by design the system can be installed such that more than one position marker 103 (corresponding to position marker 3 of FIGS. 2 and 12) is consistently within the field of view of the camera. Such an improved method of position and rotational orientation determination is illustrated in FIGS. 20, 24 and 25. In some instances using systems of manned vehicles, it is desirable to use this improved accuracy method as well. Note that a combined automated vehicle/manned vehicle system can also be configured where the improved accuracy method is used when more than one marker is in the field of view but the single marker method is used when only one marker is in the field of view.

FIG. 20 illustrates an improved method of location and rotational orientation determination where the position markers are arranged so that two or more position markers are within view of the image acquisition system on each vehicle. As seen in FIG. 25, multiple markers lie within the field of view. The pixel coordinates for the center point N of each marker are calculated (FIG. 20, box 50). Line Segments N1-N2, N1-N3, . . . , N1-Nx, . . . , N(x−1)-Nx are calculated 51. The vehicle orientation relative to N1-N2, N1-N3, . . . , N1-Nx, . . . , N(x−1)-Nx are the calculated 52. Using information from the Position Marker Look-Up Table 31 the actual orientation of the object is calculated 53. Using the pixel coordinates of point N for each marker line segments O-N1, O-N2, . . . , O-Nx are calculated 54. The vehicle position relative to O-N1, O-N2, . . . , O-Nx are the calculated 55. Using information from the Position Marker Look-Up Table 31 the actual position of the object is calculated 46. The actual position and the actual orientation of the object are combined 600 and stored in memory in computer unit 5 and then transmitted 60 to the vehicle controller 105.

FIG. 24 shows a camera's field of view with two position markers 103 (designated M1 and M2 respectively) within the field of view. Line segments are indicated between the respective centers of the position markers and the center of field of view of the camera. The facility reference orientation is also shown with the angle between facility reference orientation and the field of view orientation. It may be appreciated that the accuracy of rotational orientation of the vehicle thus obtained is improved over that obtained using only a single position marker.

As seen in FIG. 24, two position markers M1, M2 are seen, which lie on an east—west line. In this situation where at least two position markers are always within view of the image acquisition system on each vehicle, the coordinate position and the rotational orientation of each vehicle is determined by: a) acquiring an image of the at least two position markers M1, M2 within view; b) establishing a center point N1, N2 of each respective marker M1, M2 and determining a line segment N1-N2 connecting the respective center points; c) determining a center point O of the field of view of the image acquisition system; d) determining line segments O-N1, O-N2 respectively connecting point O with the centers N1, N2 of the respective position markers M1, M2; e) using the lengths and directions of line segments O-N1, O-N2 to calculate the position of the vehicle relative to the known positions of the markers M1, M2, thereby determining the location of the vehicle within the coordinate space; and f) using the angle of line segment N1-N2 within the field of view to calculate the rotational orientation of the vehicle within the coordinate space.

In the case where multiple position markers are within the field of view, the expected position is determined by using plane geometry to calculate the actual coordinate position of the center of the field of view (Point O of FIG. 24). This is done by determining the intersection of line segments between the Point O and the centers N1 and N2 of position markers within the field of view. The vehicle orientation is determined relative to a line segment N1-N2 (or segments if more than two markers are within view) drawn between the centers of all position markers within the field of view. Using this method, the vehicle position and the rotational orientation can be determined using only the position information of the markers. In FIG. 24 the facility reference orientation is also shown with the angle between the facility reference orientation (pointing north) and the field of view orientation.

In the case of multiple viewable position markers, the position marker size is not necessary to the calculation of vehicle- or object position or rotational orientation.

In this case the image pixel values for line segments O-N1 and O-N2 (FIG. 24) are related by the Position Marker Look-Up Table to actual coordinates. The location of the camera (Point O) can then be determined in actual coordinates. When multiple markers are within the field of view, the angle between the camera (vehicle) and a line between viewed position markers is known. Since the line between markers can be ascertained in actual coordinates from the Position Marker Look-Up Table 31—the orientation angle of the vehicle can also be determined as an azimuth angle to the actual coordinates.

Picking up, Transporting and Delivering an Object by an Automated Vehicle

Modern indoor logistics operations frequently utilize computer-based systems to manage the movement of goods. Such a "host" system is typically comprised of a complex software program installed on a computer. The program may serve as an inventory control system, warehouse management system, or custom legacy system, and each contains a large database. Commercial examples include software products sold by Manhattan, Red Prairie, 3M/High Jump, Oracle, and SAP.

Data are fed into the host system in the form of customer order requests, goods movement requests, shipping requests, etc. The system issues tasks and records the movement of goods as each request is fulfilled by the operations staff.

In the case where automated vehicles are present in the operation, the automated vehicle controller of the present invention must communicate with the host system to receive task requests, and report the completion of each task back to the host.

In a third aspect, the method for picking up an object from a first, origin, location and rotational orientation, transporting the object and delivering that object to a second, destination, location and rotational orientation within a predefined coordinate space by an optically navigated automated vehicle, comprises the steps of:

1. A map of the coordinate space is created that determines allowable travel routes based on the locations of obstacles within the coordinate space, and the map is stored within a memory in a vehicle controller.

2. The object to be transported is identified, the present location and rotational orientation of that object and a destination location and rotational orientation of that object within the coordinate space is identified and the identity, the present location and rotational orientation and the destination location and rotational orientation of the object is stored within the memory in the vehicle controller.

3. An automated vehicle is designated as the delivery vehicle for the transport and delivery.

4. A coordinate position and a rotational orientation of the delivery vehicle and all other vehicles within the predefined coordinate space is determined by:

a) A plurality of unique position markers having identifying indicia, positional reference and angular reference indicia thereupon is provided, the markers being arranged at predetermined known positional locations and known angular orientations within the coordinate space so that at least one position marker is within view of each vehicle.

b) An image acquisition system mounted on the delivery vehicle is used to:

1) acquire an image of the at least one position marker within view;

2) process the image to determine the identity, the position relative to the delivery vehicle, and the rotational orientation relative to the delivery vehicle of each position marker within view; and 3) calculate the position of the delivery vehicle and the rotational orientation of the delivery vehicle in the coordinate space and store the position and rotational orientation information in a memory in the image acquisition system.

5. The delivery vehicle identity and the stored coordinate position and rotational orientation of that vehicle is transmitted from the image acquisition system on the delivery vehicle to the vehicle controller and the delivery vehicle identity and coordinate position and rotational orientation is stored in the memory within the controller.

6. Using the predetermined map of the coordinate space, the identity, position location and rotational orientation of the object and the present position location and rotational orientation of the designated delivery vehicle stored within the memory in the vehicle controller, the vehicle controller determines a desired path for the delivery vehicle to pick up the object.

7. The vehicle controller then transmits motion and steering instructions to the delivery vehicle.

8. Steps 4 through 7 are then repeated until the delivery vehicle reaches the location of the object at the rotational orientation of the object.

9. The vehicle controller then transmits motion, steering and fork control instructions to the delivery vehicle, causing the vehicle to pick up the object.

10. Using the predetermined map of the coordinate space, the present position location and rotational orientation of the designated delivery vehicle and the destination location and rotational orientation for that object stored within the memory in the vehicle controller, the vehicle controller determines a desired path for the delivery vehicle to deliver the object.

11. The vehicle controller then transmits motion and steering instructions to the delivery vehicle to causing it to follow the desired path.

12. Steps 4, 10, and 11 are then repeated until the delivery vehicle reaches the destination location and rotational orientation of the object.

13. The vehicle controller then transmits motion, steering and fork control instructions to the delivery vehicle, causing the vehicle to deposit the object at the destination location.

Figure 23:
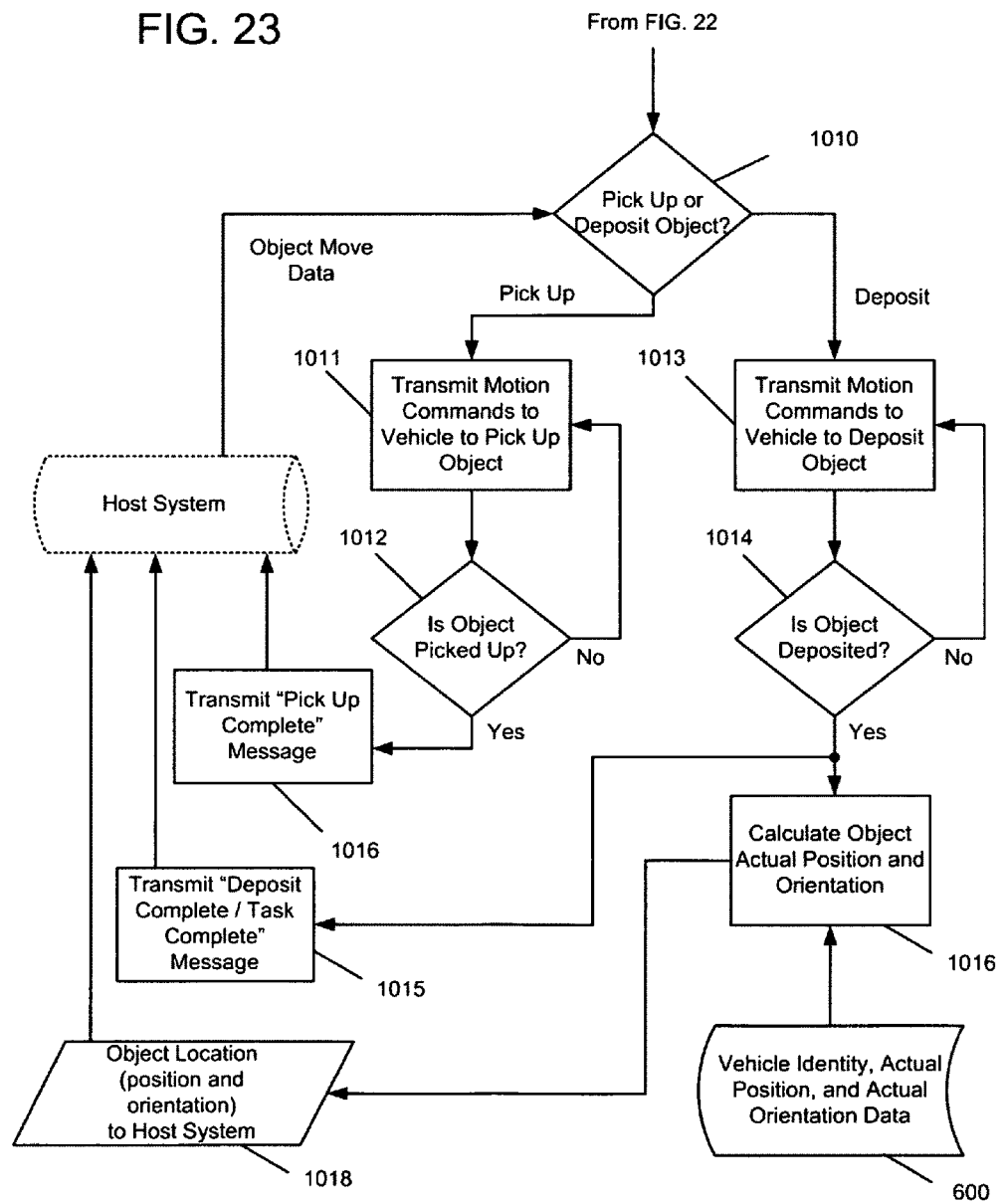
FIG. 23 shows a software flow chart for the acquisition and deposition of objects by an automated vehicle.

FIG. 23 shows a software flow chart for the picking up and depositing of objects by an automated vehicle. When the automated vehicle 6A has completed it travel route and reached the destination (see Examples 1 and 2 of FIGS. 26 and 27), using the object move data (from the host system) a decision is made as to whether the object 101 is to be picked up or deposited 1010. If the object is to be picked up (1010—Pick Up) the vehicle controller 105 transmits motion, steering and fork commands 1011 to the automated vehicle 106 (same as 6A in FIG. 1B). If the object has not yet been picked up (1012—No), additional motion, steering and fork commands 1011 are transmitted to the automated vehicle 106. When the object has been picked up (1012—Yes) the vehicle controller 105 transmits "Pick Up Complete" to the host system. Depending upon the automated vehicle mechanical design, "pick up" may mean acquiring, holding, grasping, loading, lifting, encompassing, clamping, or otherwise retaining the object so as to provide transport capability to that object by the automated vehicle.

If the object is to be deposited (1010—Deposit) when the delivery vehicle has reached the delivery destination, vehicle controller 105 transmits motion, steering and fork commands 1013 to the automated vehicle 106 to release the object, thereby depositing it. If the object has not yet been deposited (1014—No) additional motion, steering and fork commands 1013 are transmitted to the automated vehicle 106. When the object has been deposited (1014—Yes) the vehicle controller 105 transmits 1015 "Deposit Complete/Task Complete" to the host system. The function of depositing may be done by the automated vehicle by letting down, putting away, dropping off, or releasing, so as to complete the transport task and disengage the object from the automated vehicle.

Simultaneously with the transmission of the "Deposit Complete/Task Complete" message, the vehicle identity, actual position and actual orientation 600 are used to calculate the object's position and orientation 1016. The result is stored in memory 1018 and transmitted to the host system.

Figure 31:
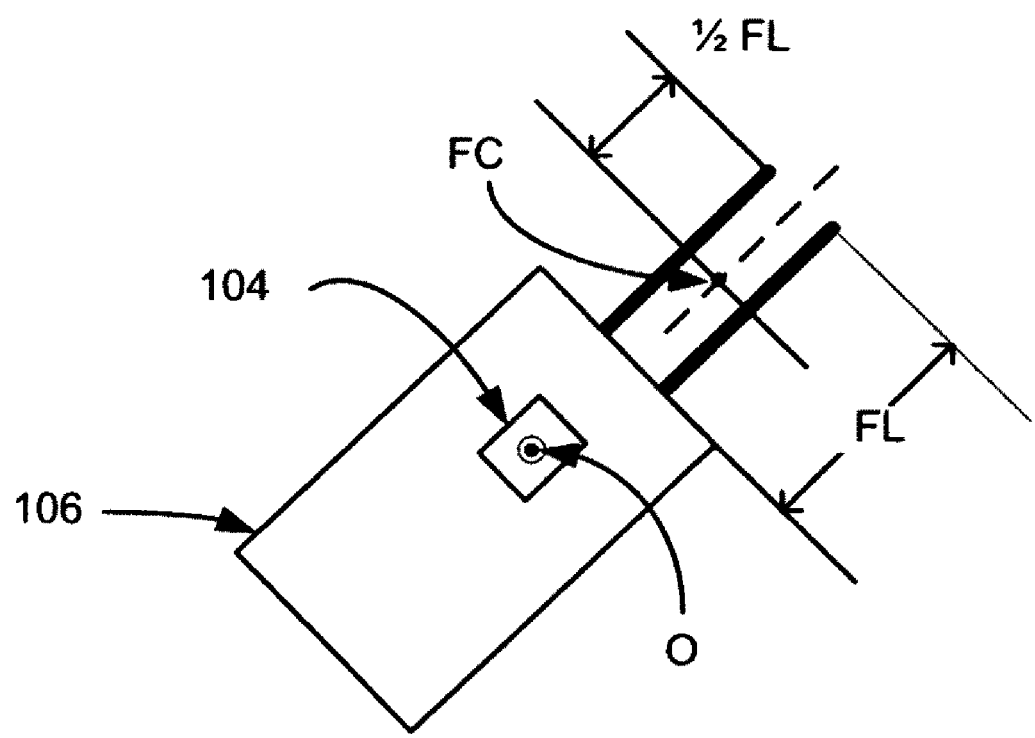
FIG. 31 shows a plan view of an automated vehicle that defines a point CF that is in the center of the forks.
Figure 32:
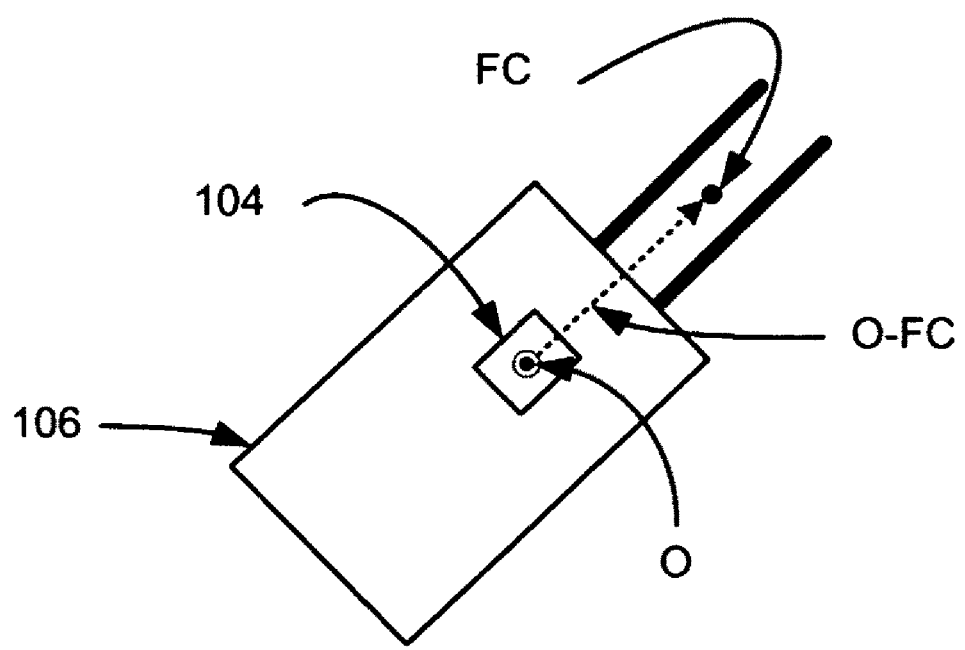
FIG. 32 shows a plan view of an automated vehicle that establishes a vector O-CF between the center of the field of view and the center of the forks.
Figure 33:
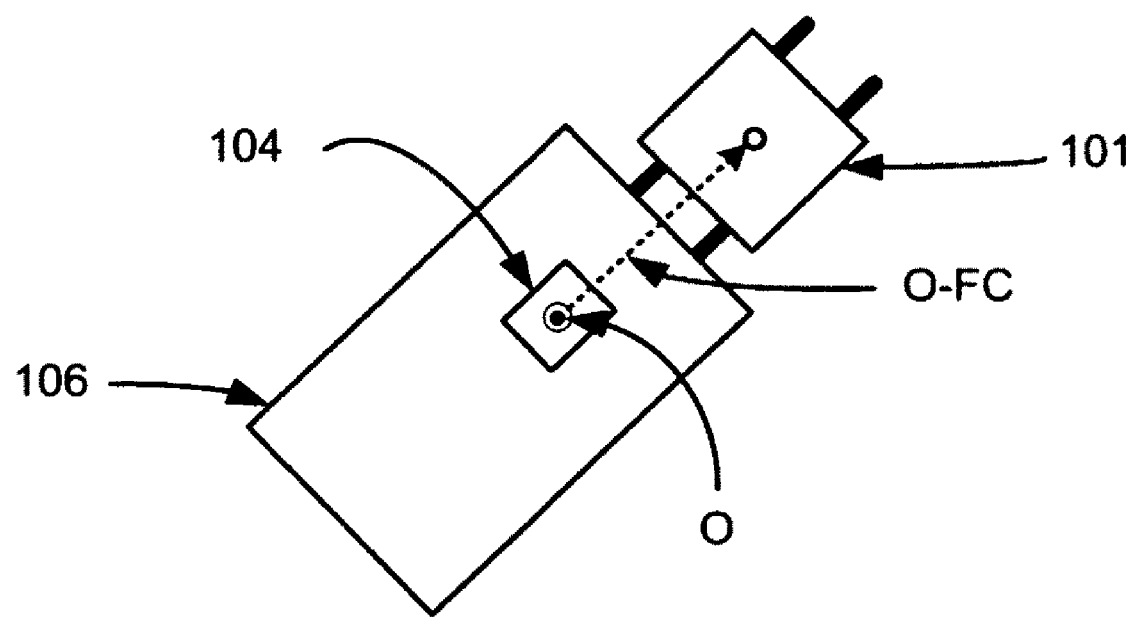
FIG. 33 shows a plan view of an automated vehicle with a load resting on the forks and centered about point FC.

The calculation of object position and orientation at the moment of deposition is shown in FIGS. 31, 32, and 33. FIG. 31 defines a point CF in the center of the forks, midway between the two forks and at a distance from the vehicle of half the overall fork length FL. FIG. 32 establishes a vector, based on a, line between machine vision camera 104 (using center point O of the field of view in FIG. 31) and point FC. Vector O-FC is fixed on each vehicle, but may vary between vehicles, depending on camera placement, fork length, and vehicle design. Vector O-FC may have the identical rotational orientation as the vehicle, where point O of camera 104 lies on the vehicle centerline, or it may be offset at a different angle.

Vector O-FC is used as an adjustment factor to determine the load's (object's) actual location and orientation, once the vehicle's actual position and actual orientation are known. Load 101 is shown in FIG. 33 resting on the forks, and centered about point FC. Load position (location) and orientation are thereby calculated as the vector sum of the vehicle's position and orientation and vector O-FC, at the moment of the load's deposit. Load position and rotational data may be transformed by the host system (host system) into familiar units such as bulk storage locations or rack positions; however, the vehicle controller (and optionally the host system) stores the load's actual position and orientation.

Example 1

Figure 26:
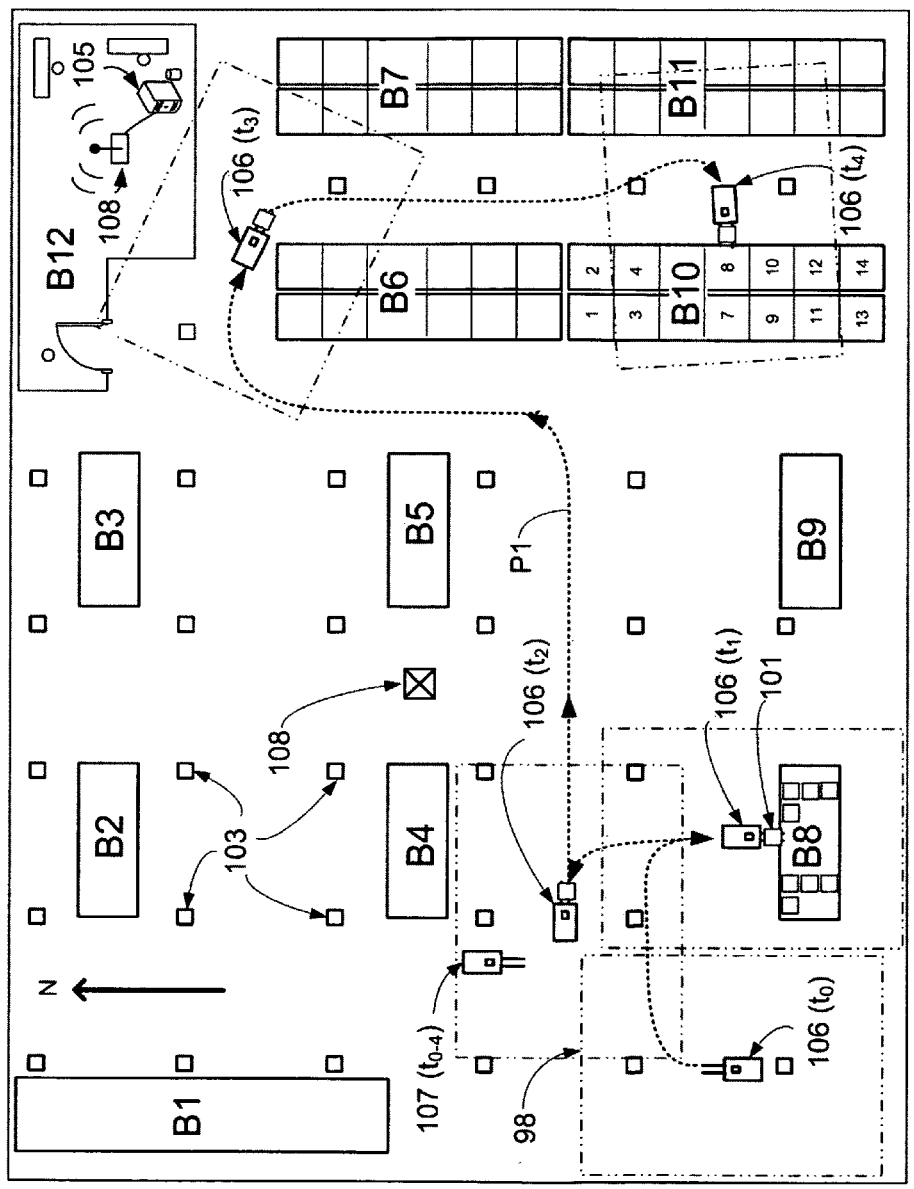
FIG. 26 shows a plan view of a warehouse of a first object delivery example illustrating the pick up of a load by an automated vehicle and snapshot views of the vehicle at a plurality of positions as it delivers the load and deposits the load at a destination.

FIG. 26 illustrates a first example of a warehouse operation. Two vehicles are shown; 106 which is automated and 107 which may be automated or manned. A plurality of obstructions B1 through B11 (which may be storage racks or building structure) and an obstruction 108 representing a roof support column and an office area B12 are shown. An array of position markers 103 is shown.

Preparatory to commencing warehouse operations a map of the coordinate space (i.e., the warehouse) is created to determine allowable travel routes for vehicles and locations of obstacles within the coordinate space, and the map is stored within a memory in a vehicle controller (that is implemented by computer 105).

In this example the system has determined that vehicle 106 is initially at position 106(t0) and that vehicle 107 is at position 107(t0). The vehicle controller 105 receives a request to move a load 101 from bulk storage area B8 to position 8 on Rack B11. The vehicle controller 105 designates vehicle 106 as the vehicle to make the delivery. The vehicle controller 105 issues a motion and steering command and transmits it to vehicle 106, causing it to move. Typically one second (or less) later, the image acquisition system 104 on vehicle 106 determines a new position and rotational orientation of the vehicle and transmits this information to the vehicle controller 105. The vehicle controller 105 issues vehicle 106 a new motion and steering command, causing it to follow the path P1 indicated by the dashed line. The sequence of position and rotational orientation determination and motion and steering commands is repeated until the vehicle 106 arrives at the object to be moved (load 101 on bulk storage area B8 at 180 degrees). Then the vehicle controller 105 transmits motion, steering and fork control instructions to the vehicle 106, causing the vehicle to pick up the object (load 101). Once the load is picked up the sequence of position and rotational orientation determination and motion and steering commands is repeated until the vehicle 106 arrives at the destination (position 8 of rack B11 at 270 degrees). Then the vehicle controller 105 transmits motion, steering and fork control instructions to the vehicle 106, causing the vehicle to deposit the object (load 101).

In this example an object (load 101) to be picked up at a first location (bulk storage area B8), to be transported and to be delivered to a second location (position 8 of rack B10) is identified. The location (bulk storage area B8) and rotational orientation (180 degrees) of that object (load 101) and the destination (position 8 of rack B10) and rotational orientation (270 degrees) of that object within the coordinate space are identified. The identity, the location (bulk storage position B8 at 180 degrees) and the destination (position 8 of rack B10 at 270 degrees) of the object are stored within the memory in the vehicle controller 105. The delivery vehicle (106) is designated. Using an image acquisition system 104 (FIG. 25) mounted on the vehicle 106 a coordinate position (seen at 106(t0) and rotational orientation (zero degrees) of the vehicle 106 within the predefined coordinate space is determined by: i) providing a plurality of unique position markers 103 having identifying indicia, positional reference and angular reference indicia thereupon (see FIG. 12), the markers 103 being arranged at predetermined known positional locations (i.e, position markers 103a, 103b, 103c, 103d, 103e in the array shown in FIG. 25) and known angular orientations within the coordinate space so that at least one position marker 103 is within view (dash-dot-dot outlined box 98 in FIG. 25) of the vehicle 106: ii) using an image acquisition system 104 mounted on the vehicle 106: 1) acquiring an image of the at least one position marker 103 within view; 2) processing the image to determine the identity, the position relative to the vehicle, and the rotational orientation relative to the vehicle 106 of each position marker 103 within view; and 3) calculating the position of the vehicle and the rotational orientation of the vehicle in the coordinate space and storing the position and rotational orientation information in a memory in the image acquisition system 104.

The vehicle identity and the stored coordinate position and rotational orientation of vehicle 106 is transmitted by a wireless link 108 (same as 8 seen in FIGS. 1A and 1B) from the image acquisition system 104 on the vehicle 106 to the vehicle controller (that is implemented by computer 105) and the vehicle identity and coordinate position and rotational orientation is stored within the memory in the vehicle controller.

The vehicle controller uses the predetermined map of the coordinate space, the identity, position location and rotational orientation of the object (load 101) and the position location and the rotational orientation of the identified vehicle 106 stored within the memory in the vehicle controller 105 to determine a desired path for the vehicle 106 to pick up the object (load 101). The vehicle controller transmits motion and steering instructions to the vehicle 106.

The steps of determining the position location and rotational orientation of the vehicle 106 is repeated until the vehicle reaches the location of the object at the rotational orientation of the object and in response the vehicle controller transmits motion, steering and fork control instructions to the vehicle, causing the vehicle to pick up the object (load 101).

Once the load 101 is picked up the steps of determining the position location and rotational orientation of the vehicle 106 is repeated and in response the vehicle controller transmits motion and steering instructions to the vehicle to causing it to follow the desired path. These steps are repeated until the vehicle reaches the destination of the object (position 8 of rack B10) at the rotational orientation of the object (270 degrees). The vehicle controller then transmits motion, steering and fork control instructions to the vehicle 106, causing the vehicle to deposit the object at the destination.

It should be noted that the vehicle controller defines a safety zone 97 (see FIG. 25) that is used to calculate the path of each vehicle, so that the safety zone 97 of that vehicle does not intersect with the locations of any obstacles B in the coordinate space map.

Example 2

Figure 27:
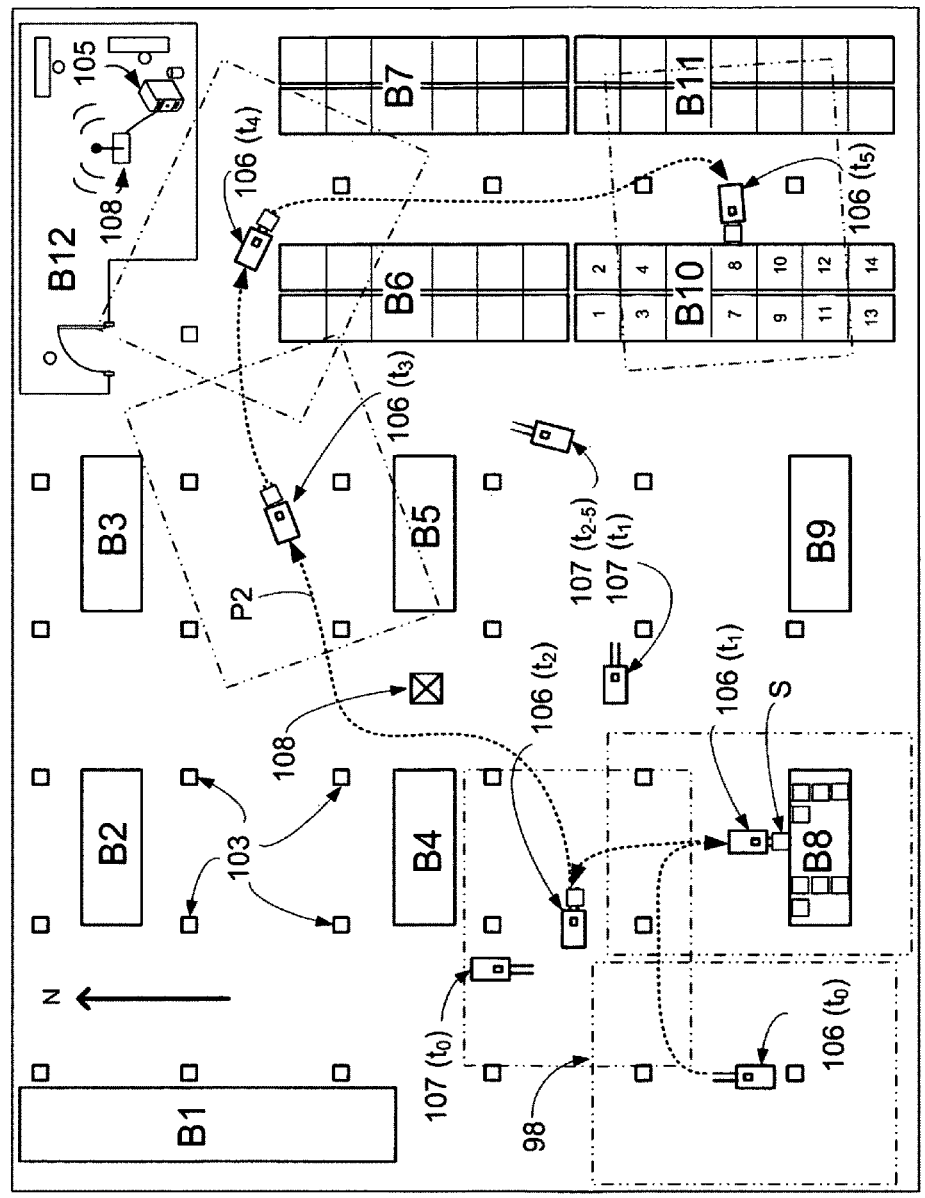
FIG. 27 shows a plan view of a warehouse of a second object delivery example illustrating the pick up of a load by an automated vehicle and snapshot views of the vehicle at a plurality of positions as it delivers the load and deposits the load at a destination.

FIG. 27 illustrates a second example of a warehouse operation. Two vehicles are shown; 106 which is automated and 107 which may be automated or manned. A plurality of obstructions B1 through B11 (which may be storage racks or building structure) and an obstruction 108 representing a roof support column and an office area B12 are shown. An array of position markers 103 is shown. Note that vehicle 107 at time (t2) lies on the path P1 taken by vehicle 106 in Example 1. This necessitates maneuvering vehicle 106 along a different path P2. Since the vehicle controller knows the location of vehicle 107, and that vehicle 107 is stationary, it calculates a different path for vehicle 106. Since the clearance between barrier B4 and support column 108 is somewhat restricted, the improved accuracy method using two position markers, as described above, would be appropriate for determining the location and rotational orientation of the vehicle 106. Note that the position markers are spaced such that at least two markers are always within the field of view 98 (FIG. 25).

Management of Manned and Automated Vehicles

In a fourth aspect the present invention provides a novel method for managing manned and automated utility vehicles in a coordinate space by optically navigating the automated vehicle. The method, as illustrated by the flow charts of FIGS. 22 and 30, comprises the following steps:

1. A map of the coordinate space is created that determines allowable travel routes and locations of obstacles within the coordinate space, and the map is stored within a memory in a vehicle controller.

2. A destination is established for each manned vehicle and for each automated vehicle within the coordinate space and the identity and destination of each vehicle is stored within the memory in the vehicle controller.

3. A coordinate position and the rotational orientation of each vehicle within the predefined coordinate space is determined by:

a) providing a plurality of unique position markers having identifying indicia, positional reference and angular reference indicia thereupon, the markers being arranged at predetermined known positional locations and known angular orientations within the coordinate space so that at least one position marker is within view of the vehicle;

b) an image acquisition system mounted on each vehicle is used to:

1) acquire an image of the at least one position marker within view;

2) process the image to determine the identity, the position relative to the vehicle, and the rotational orientation relative to the vehicle of each position marker within view; and 3) calculate the position of the vehicle and the rotational orientation of the vehicle in the coordinate space and store the position and rotational orientation information in a memory in the image acquisition system.

4. The vehicle identity and the stored coordinate position and rotational orientation of that vehicle from the image acquisition system on each vehicle is transmitted to the vehicle controller and the vehicle identity and coordinate position and rotational orientation is stored in the memory within the controller.

5. Using the coordinate position of the vehicle and the rotational orientation of the vehicle, the predetermined map of the coordinate space and the destination stored within the memory in the vehicle controller, the vehicle controller determines a desired path for each automated vehicle.

6. The vehicle controller then transmits motion and steering instructions to each automated vehicle.

7. A predicted trajectory and a safety zone for each manned vehicle and each automated vehicle is determined by calculating the velocity and direction of travel of each vehicle from coordinate positions at successive time intervals.

8. Any areas of intersection of the safety zone of each manned vehicle and each automated vehicle with the safety zones of other manned and other automated vehicles are determined to predict a potential collision.

9. Control instructions to reduce speed, turn, or stop, are transmitted to any automated vehicle that has a safety zone intersecting any safety zone of any other vehicle to prevent the predicted collision.

10. A warning message is transmitted to any manned vehicle that has a safety zone intersecting any safety zone of any other vehicle to alert the operator of the manned vehicle of a predicted potential collision, so that the operator can take appropriate action to avoid the predicted collision.

11. Steps 3 through 10 are then repeated until each automated vehicle reaches the established destination for that vehicle.

Figure 22:
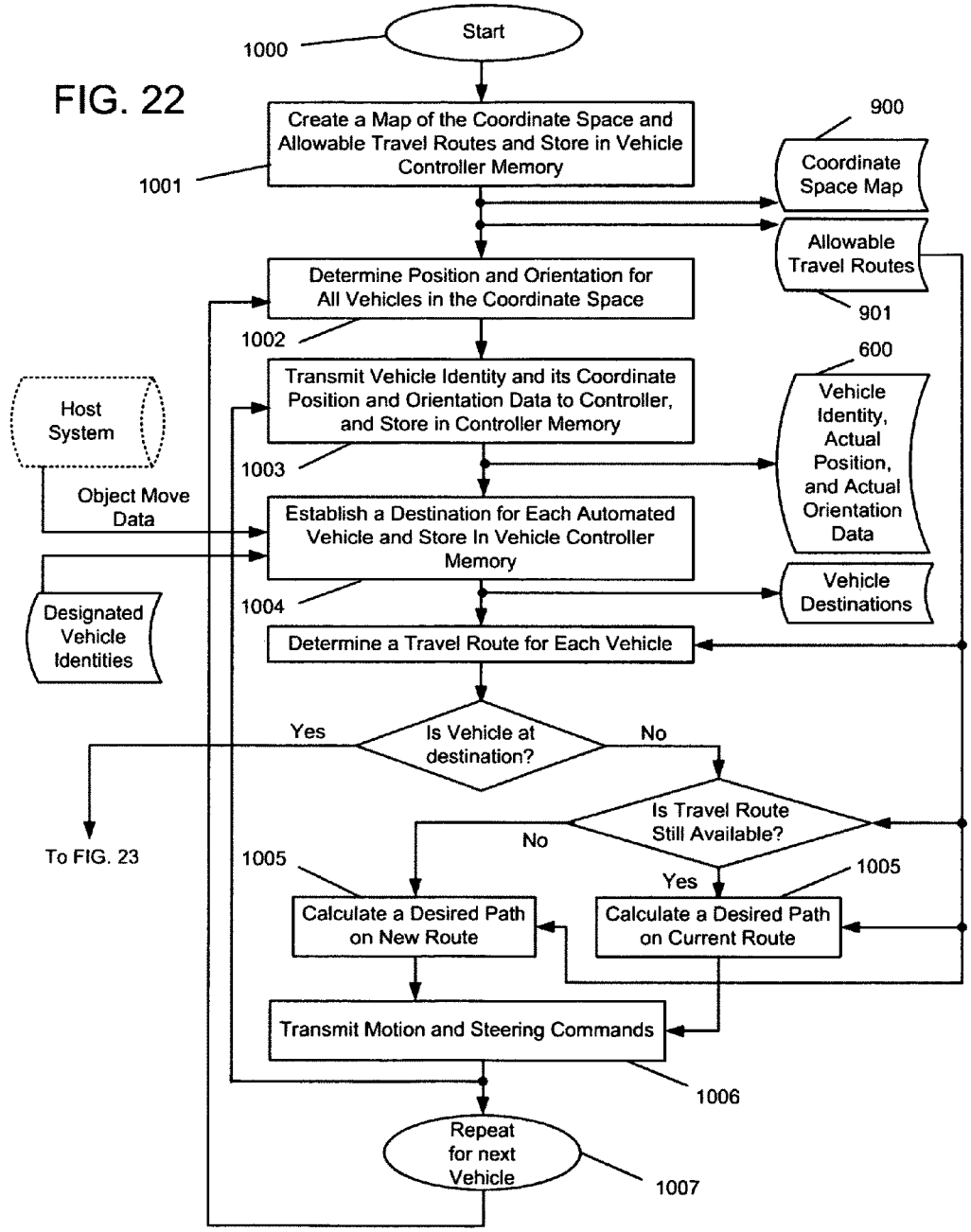
FIG. 22 shows a software flow chart of the overall vehicle management system.

FIG. 22 shows a software flow chart of the overall vehicle management system. At the start 1000 a map of the coordinate space 900 is created 1001 that determines allowable travel routes 901 based on the locations of obstacles within the coordinate space, and the map is stored 1001 within a memory in a vehicle controller 5. The coordinate position and a rotational orientation of each vehicle within the predefined coordinate space is determined 1002. The vehicle identity and the stored coordinate position and rotational orientation of that vehicle is transmitted from the image acquisition system on each vehicle to the vehicle controller and the vehicle identity and coordinate position and rotational orientation is stored 1003 in the memory within the controller. A destination is established for each manned vehicle and for each automated vehicle within the coordinate space and the identity and destination of each vehicle is stored 1004 within the memory in the vehicle controller. Using the coordinate position of the vehicle and the rotational orientation of the vehicle, the predetermined map of the coordinate space and the destination stored within the memory in the vehicle controller, the vehicle controller determines a travel route for each automated vehicle. After checking to determine if the travel route is still available, the vehicle controller calculates a desired path 1005 and then transmits motion and steering instructions 1006 to each automated vehicle. Steps 1002 through 1006 are then repeated 1007 for the next vehicle.

Collision Prediction

Figure 30:
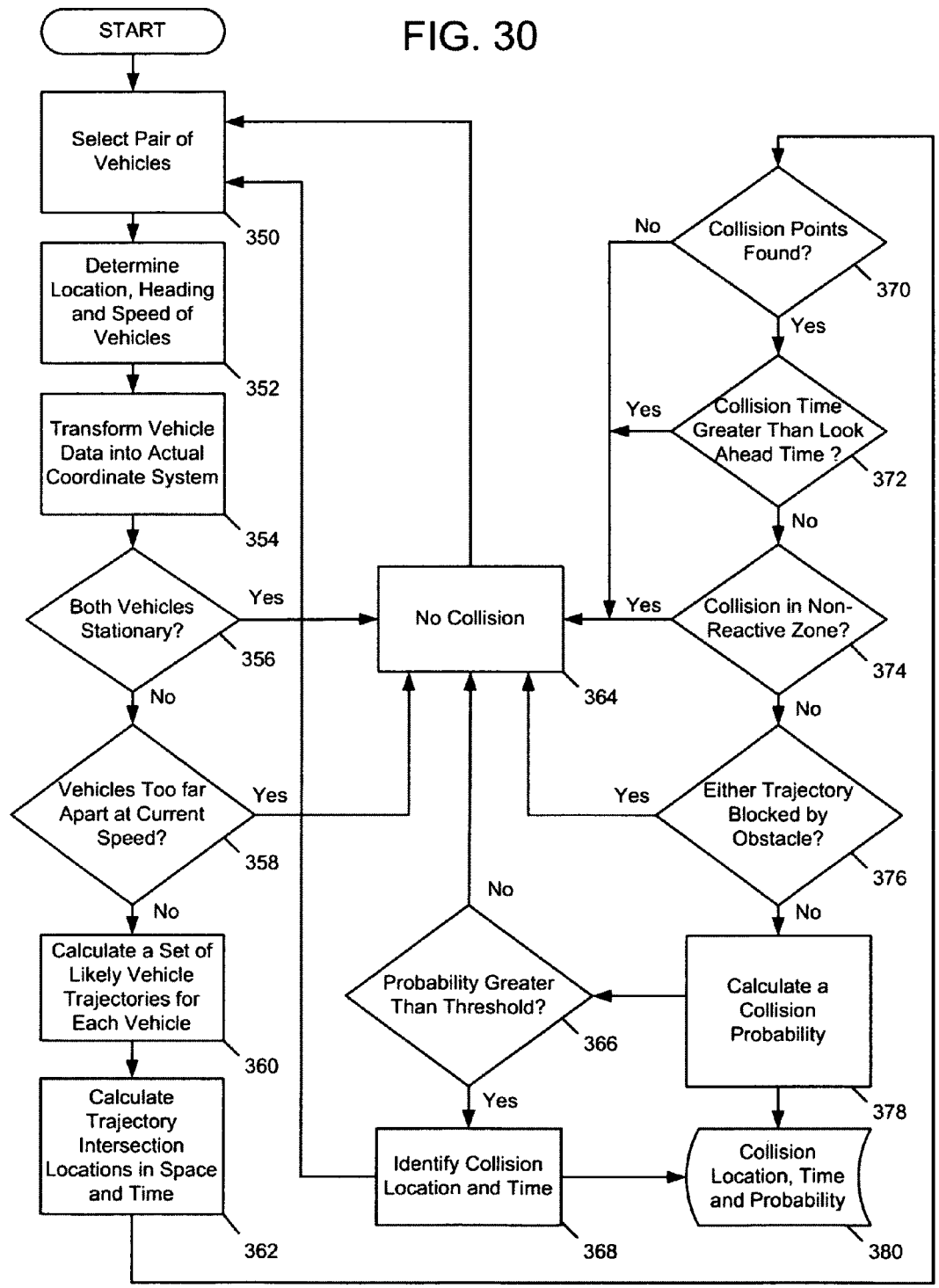
FIG. 30 is a software flow chart of a method of predicting possible collisions between vehicles.

FIG. 30 is a software flow chart of a method of predicting possible collisions between vehicles. The system controller constantly monitors the position and orientation of all vehicles within the coordinate space. Actual position and orientation data 600 is available to the collision prediction process.

A pair of vehicles is selected 350 based upon their proximity to one another, and the location, heading, and speed of each vehicle is calculated 352. Data are transformed 354 into actual values of position (meters, feet), vehicle heading (degrees), and velocity (meters per second, feet per second, miles per hour). If both vehicles are stationary (356, Yes) then no collision is imminent and "No Collision" 364 is reported and the cycle begins anew.

Figure 28:
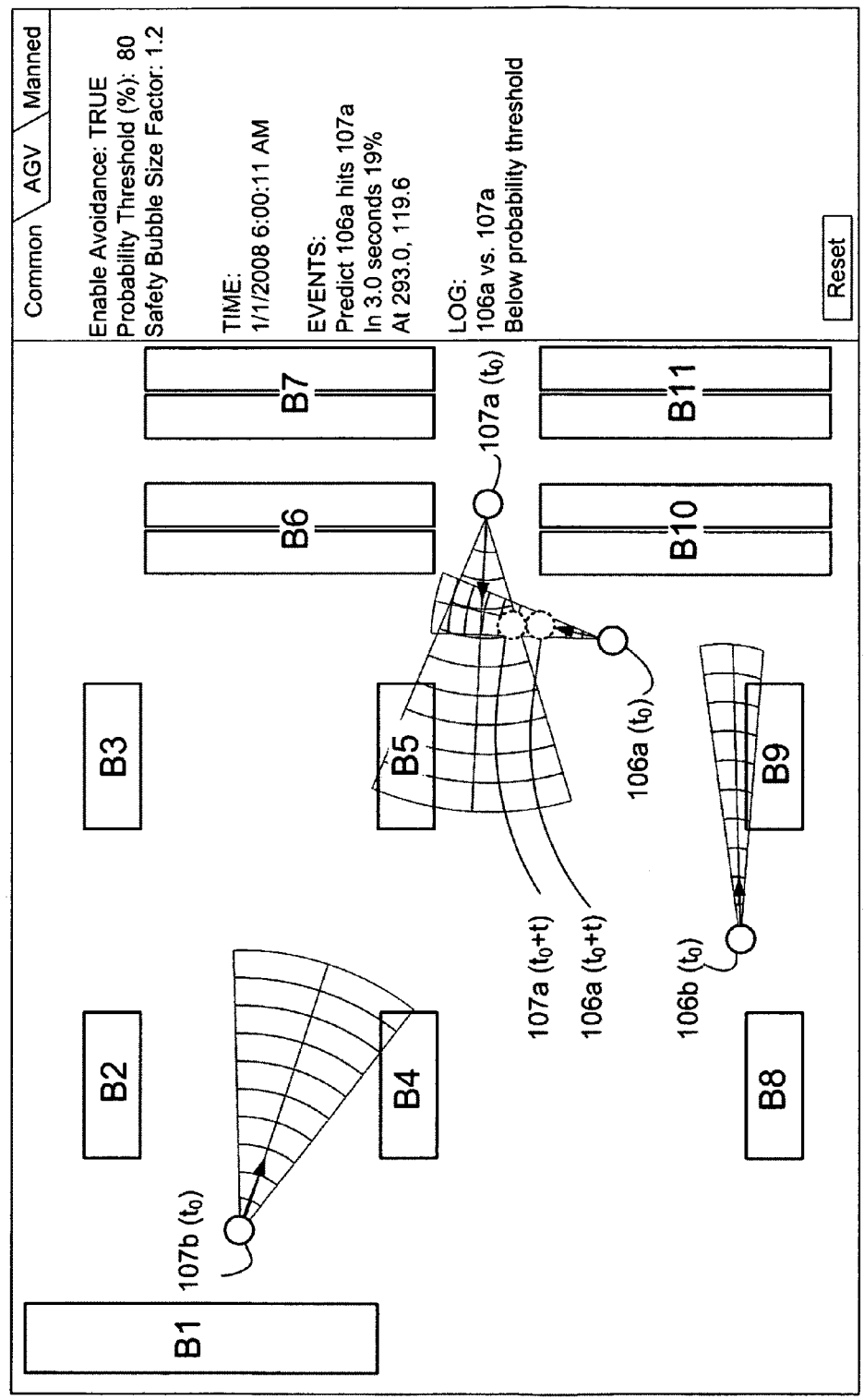
FIG. 28 is a screen shot of a system operator display showing multiple manned and automated vehicles within an operating environment at a time when a predicted collision is first detected but not reported because the probability is not above a predetermined threshold.
Figure 29:
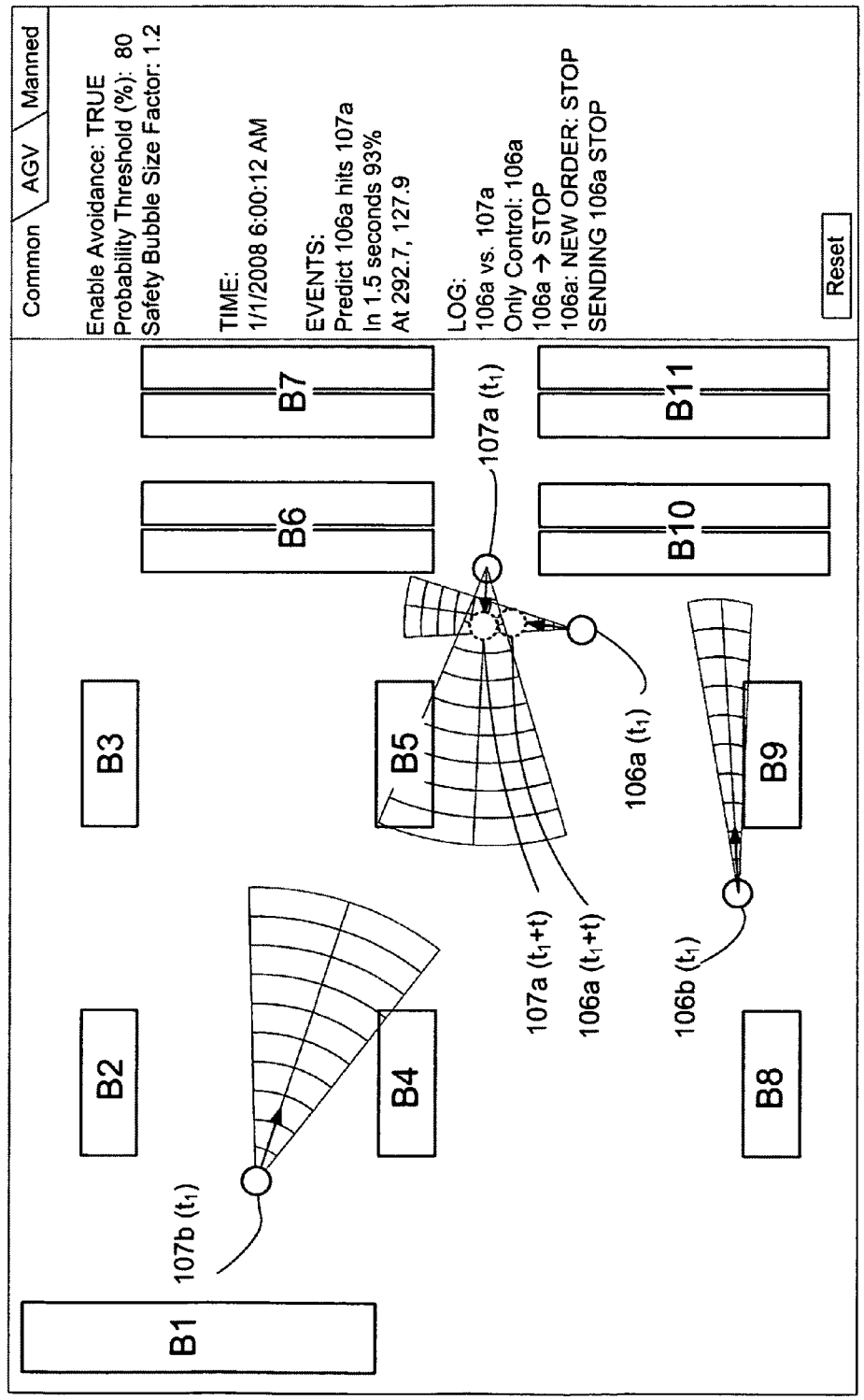
FIG. 29 is a screen shot of a system operator display showing multiple manned and automated vehicles within an operating environment at a time $t_1$ when a predicted collision is detected and reported resulting in a STOP order is issued to an automated vehicle 106*a*.

If the vehicles are not stationary (356, No), then the spacing between the vehicles and their respective velocities are tested 358 against the safety bubble size factor (FIGS. 28, 29, text box at right side). "No Collision" is reported (358, Yes) if the distance between the two vehicles and their velocities cause them to be too far apart. If, however, the vehicles are not too far apart (358, No), then calculation is made 360 of the likely trajectories for each vehicle and a possible trajectory intersection is calculated 362 in terms of location (position) and time ("look-ahead" time).

If no collision points exist (370; No), then "No Collision" 364 is reported and the process repeats. If collision points are found (370, Yes), the collision time is tested 372 against the look-ahead time that has been established by the system operator (FIGS. 28, 29 text box at right side). If collision time exceeds the look-ahead time, "No Collision" is reported. If the collision time is within the look-ahead time (372, No), then the collision location is tested for lying within a non-reactive zone, such as an office area or fixed structure area (examples FIGS. 28, 29 B1-B11). If the predicted collision lies within a non-reactive zone (374, Yes), "No Collision" is reported; otherwise the trajectory of each vehicle is tested for blockage 376. If either trajectory is blocked by an obstacle (376, Yes), "No Collision" is reported; otherwise (376, No) a collision probability is calculated 378, stored in memory 380, and tested 366 against the probability threshold that has been set by the system operator. If the collision probability exceeds the preset threshold, the collision location and time are identified and stored in memory 380, which is available to the system controller and displayed on the operator screen display. If the collision probability is less than the threshold, (366, No) the system reports "No Collision" and the sequence repeats.

FIG. 28 is a screen shot of a system operator display showing multiple automated vehicles 106a, 106b and multiple manned vehicles 107a, 107b within an operating environment having barriers B1-B11 at a time $t_0$ when a predicted collision between an automated vehicle 106a and a manned vehicle 107a at time $t_0+t$ is first predicted but not reported because the probability of collision (19%) is not above a predetermined threshold (80%) (see text box at right side of FIG. 28).

FIG. 29 is a screen shot of a system operator display showing the same multiple-automated vehicles 106a, 106b and multiple manned vehicles 107a; 107b within the same operating environment at a time $t_1$ when the predicted collision between the automated vehicle 106a and the manned vehicle 107a at time $t_1+t$ has a probability (93%), which is above the predetermined threshold (80%) (see text box at right of FIG. 29), resulting in a command from the vehicle controller to stop automated vehicle 106a.

Attention is directed to the adjustable system parameters in the top right corner of the text box at the right side of FIGS. 28 and 29: The Safety Bubble size factor is a scalable perimeter that is put around a vehicle for display purpose. The Probability Threshold is the percentage of the intersection calculations that determine if a predicted collision will be reported or not. In the example of FIG. 28 the probability of collision of 19% is below the threshold of 80% and a collision is predicted but not reported. In the example of FIG. 29 the probability of collision of 93% is above the threshold of 80% and a collision is predicted and reported, causing a STOP order to be transmitted to automated vehicle 106a.

Those skilled in the art, having benefit of the teachings of the present invention as set forth herein, may effect modifications thereto. Such modifications are to be construed as lying within the contemplation of the present invention, as defined by the appended claims.

What is claimed is:

1. A method of determining a coordinate position and rotational orientation of an object within a predefined coordinate space, the method comprising:

a) providing a plurality of unique position markers having identifying indicia and positional reference indicia thereupon, the markers being arranged at predetermined known positional locations within the coordinate space, the known positional locations and known angular orientations being stored in a map, so that at least two position markers are always within view of the object;

b) using an image acquisition system mounted on the object, acquiring an image of the at least two position markers M1, M2 within view:

c) establishing a center point N1, N2 of each respective marker M1, M2 and determining a line segment N1-N2 connecting the respective center points N1, N2;

d) determining a center point O of the field of view of the image acquisition system;

e) determining line segments O-N1, O-N2 respectively connecting point O with the centers N1, N2 of the respective position markers M1, M2;

f) using the lengths and directions of line segments O-N1, O-N2 to calculate the position of the object relative to the known positions of the markers M1, M2, thereby determining the location of the object within the coordinate space; and g) using the direction of line segment N1-N2 to calculate the rotational orientation of the object within the coordinate space.

2. The method of claim 1, wherein the predetermined known positional locations within the coordinate space of the respective position markers M1, M2 are stored in a Position Marker Look-Up Table in a memory and the center points N1, N2 of each respective marker M1, M2 used to determine the direction of line segment N1-N2 are ascertained from the Position Marker Look-Up Table.

3. The method of claim 1, wherein the positional locations within the coordinate space of the center points N1, N2 of each respective marker M1, M2 used to determine the direction of line segment N1-N2 are directly encoded on the respective position markers.

4. A method of determining a coordinate position and rotational orientation of an object within a predefined coordinate space, the method comprising:

a) providing a plurality of unique position markers having identifying indicia and positional reference indicia thereupon, the markers being arranged at predetermined known positional locations within the coordinate space, the known positional locations and known angular orientations being stored in a map, the markers being spaced so that a plurality of position markers M1, M2, ..., Mx are always within view of the object;

b) using an image acquisition system mounted on the object, acquiring an image of the plurality of position markers M1, M2, ..., Mx within a field of view of the image acquisition system;

c) establishing a center point N1, N2, ..., Nx of each respective marker M1, M2, ..., Mx and determining line segments N1-N2, N1-N3, ..., N1-Nx, ..., N(x−1)-Nx connecting the respective pairs of center points;

d) determining a center point O of the field of view of the image acquisition system;

e) determining line segments O-N1, O-N2, ..., O-Nx respectively connecting point O with the centers N1, N2, ..., Nx of the respective position markers M1, M2, ..., Mx;

f) using the lengths and directions of line segments O-N1, O-N2, ..., O-Nx to calculate the position of the object relative to each of the known positions of the markers M1, M2, ..., Mx;

g) calculating a mean value of the position of the object within the coordinate space, thereby determining the location of the object within the coordinate space;

h) using the directions of line segments N1-N2, N1-N3, ..., N1-Nx, ..., N(x−1)-Nx within the field of view to calculate the rotational orientation of the object relative to the respective pairs M1, M2; M1, M3; ...; M1, Mx; ...; M(x−1), Mx of position markers M1, M2, ..., Mx; and i) calculating a mean value of the rotational orientation of the object relative to the respective pairs of position markers M1, M2, ..., Mx; thereby determining the rotational orientation of the object within the coordinate space.

5. The method of claim 4, wherein the mean value of the position of the object within the coordinate space calculated in step g) is a weighted mean value.

6. The method of claim 4, wherein each calculated position of the object relative to the known positions of the markers M1, M2, ..., Mx of step g) is weighted according to the proximity of each position marker to the center of the field of view, the calculated positions relative to markers nearest to the center of the field of view being accorded the highest weight, thereby minimizing any effect of optical distortion in the imaging system.

7. The method of claim 4, wherein the mean value of the rotational orientation of the object relative to the respective pairs of position markers calculated in step i) is a weighted mean value.

8. The method of claim 4, wherein each calculated rotational orientation of the object relative to the directions of line segments N1-N2, N1-N3, ..., N1-Nx, ..., N(x−1)-Nx between respective pairs of position markers M1, M2, ..., Mx of step i) is weighted according to the proximity of each line segment to the center of the field of view, the calculated positions relative to the line segment nearest to the center of the field of view being accorded the highest weight, thereby minimizing any effect of optical distortion in the imaging system.

9. An apparatus useful for determining a coordinate position and rotational orientation of an object within a predefined coordinate space, the apparatus comprising:

a) a plurality of unique position markers, each comprising a machine-readable code, arranged in predetermined positional locations within the coordinate space such that at least two position markers are always within view of the object;

b) an image acquisition system, comprised of a machine vision system, the machine vision system comprising a camera, an optional light source, and image capture electronics, mounted on the object, for acquiring an image of the position markers within view;

c) an image processing system for processing pixels in the acquired image to determine the identity of each position marker, the position of each position marker relative to the object, and the rotational orientation of each position marker relative to the object;

d) a computer unit for calculating the position of the object using the positions of at least two position markers and the rotational orientation of the object in the coordinate space using the positions of at least one pair of position markers; and e) a system controller for receiving the object position and the rotational orientation of the object from the computer unit, and for transmitting object position and the rotational orientation to a host system, the controller having a memory for storing:

i) a predetermined map of the coordinate space, and
ii) the object position and rotational orientation.

10. The apparatus of claim 9, further comprising:
f) a wireless data communication network for transmitting data between the computer unit and the system controller; and
g) the system controller having an input device for receiving a weighting criteria, wherein the system controller transmits the weighting criteria to the computer unit, wherein
the computer unit calculates a weighted mean value of the position of the object using the positions of at least two position markers and a weighted mean value of the rotational orientation of the object in the coordinate space using the positions of at least two pairs of position markers.

11. A method for optically navigating an automated vehicle within a predefined coordinate space, the method comprising:
a) creating a map of the coordinate space, the map determining allowable travel routes and locations of obstacles within the coordinate space, and storing the map within a memory in a vehicle controller;
b) establishing a destination for each automated vehicle within the coordinate space and storing the identity and destination of each vehicle within the memory in the vehicle controller;
c) determining the coordinate position and the rotational orientation of each vehicle within the predefined coordinate space by:
  i) providing a plurality of unique position markers having identifying indicia, positional reference and angular reference indicia thereupon, the markers being arranged at predetermined known positional locations and known angular orientations within the coordinate space, the known positional locations and known angular orientations being stored in the map, so that at least one position marker is within view of the vehicle;
  ii) using an image acquisition system mounted on each vehicle:
    1) acquiring an image of the at least one position marker within view;
    2) processing the image to determine the identity, the position relative to the vehicle, and the rotational orientation relative to the vehicle of each position marker within view; and
    3) calculating the position of the vehicle and the rotational orientation of the vehicle in the coordinate space and storing the position and rotational orientation information in a memory in the image acquisition system;
d) transmitting the vehicle identity and the stored coordinate position and rotational orientation of that vehicle from the image acquisition system on each vehicle to the vehicle controller and storing the vehicle identity and coordinate position and rotational orientation in the memory within the vehicle controller;
e) using the coordinate position and rotational orientation, the predetermined map of the coordinate space, and the destination stored within the memory in the vehicle controller, determining a desired path for each automated vehicle;
f) transmitting motion and steering instructions to each automated vehicle; and
g) repeating steps c) through f) until each automated vehicle reaches the established destination for that vehicle.

12. The method of claim 11, wherein, in step e) one or more alternate paths are determined for each automated vehicle.

13. The method of claim 11, wherein the plurality of unique position markers of step c) i) are spaced so that at least two position markers are always within view of the image acquisition system on each vehicle, wherein the coordinate position and rotational orientation of each vehicle is determined by:
a) acquiring an image of the at least two position markers M1, M2 within view;
b) establishing a center point N1, N2 of each respective marker M1, M2 and determining a line segment N1-N2 connecting the respective center points N1, N2;
c) determining a center point O of the field of view of the image acquisition system;
d) determining line segments O-N1, O-N2 respectively connecting point O with the centers N1, N2 of the respective position markers M1, M2;
e) using the lengths and directions of line segments O-N1, O-N2 to calculate the position of the vehicle relative to the known positions of the markers M1, M2, thereby determining the location of the vehicle within the coordinate space; and
f) using the direction of line segment N1-N2 to calculate the rotational orientation of the vehicle within the coordinate space.

14. The method of claim 13, wherein the predetermined known positional locations within the coordinate space of the respective position markers M1, M2 are stored in a Position Marker Look-Up Table in the memory in the vehicle controller and the center points N1, N2 of each respective marker M1, M2 used to determine the direction of line segment N1-N2 are ascertained from the Position Marker Look-Up Table.

15. The method of claim 13, wherein the positional locations within the coordinate space of the center points N1, N2 of each respective marker M1, M2 are directly encoded on the respective position markers and are used to determine the direction of line segment N1-N2.

16. The method of claim 11, wherein the plurality of unique position markers of step c) i) are spaced so that a plurality of position markers M1, M2, . . . , Mx are always within view of the image acquisition system on each vehicle, wherein the coordinate position and rotational orientation of each vehicle is determined by:
a) acquiring an image of the plurality of position markers M1, M2, . . . , Mx within view;
b) establishing a center point N1, N2, Nx of each respective marker M1, M2, . . . , Mx and determining line segments N1-N2, N1-N3, . . . , N1-Nx, . . . , Nx-1-Nx connecting the respective center points;
c) determining a center point O of the field of view of the image acquisition system;
d) determining line segments O-N1, O-N2, . . . O-Nx respectively connecting point O with the centers N1, N2, . . . , Nx of the respective position markers M1, M2, . . . , Mx;
e) using the lengths and directions of line segments O-N1, O-N2, . . . O-Nx to calculate the position of the vehicle relative to each of the known positions of the markers M1, M2, . . . , Mx;
f) calculating a mean value of the position of the vehicle within the coordinate space, thereby determining the location of the vehicle within the coordinate space; and
g) using the directions of line segments N1-N2, N1-N3, . . . , N1-Nx, . . . , N(x−1)-Nx within the field of view to calculate the rotational orientation of the vehicle relative to the respective pairs of position markers M1, M2, . . . , Mx; and h) calculating a mean value of the rotational orientation of the vehicle relative to the respective pairs of position markers M1, M2, ..., Mx, thereby determining the rotational orientation of the vehicle within the coordinate space.

17. The method of claim 16, wherein the mean value of the position of the vehicle within the coordinate space calculated in step f) is a weighted mean value.

18. The method of claim 17, wherein each calculated position of the vehicle relative to the known positions of the markers M1, M2, ..., Mx of step f) is weighted according to the proximity of each position marker to the center of the field of view, the calculated positions relative to markers nearest to the center of the field of view being accorded the highest weight, thereby minimizing any effect of optical distortion in the imaging system.

19. The method of claim 17, wherein each calculated position of the vehicle relative to the known positions of the markers M1, M2, ..., Mx of step f) is weighted according to the confidence level of the accuracy of positioning of each position marker in the field of view, the calculated positions relative to markers having the highest confidence level being accorded the highest weight.

20. The method of claim 16, wherein the mean value of the rotational orientation of the vehicle relative to the respective pairs of position markers calculated in step h) is a weighted mean value.

21. The method of claim 20, wherein each calculated rotational orientation of the vehicle relative to the directions of line segments N1-N2, N1-N3, ..., N1-Nx, N(x−1)-Nx between respective position markers M1, M2, ..., Mx of step h) is weighted according to the proximity of each line segment to the center of the field of view, the calculated positions relative to the line segment nearest to the center of the field of view being accorded the highest weight, thereby minimizing any effect of optical distortion in the imaging system.

22. The method of claim 20, wherein each calculated rotational orientation of the vehicle relative to the directions of line segments N1-N2, N1-N3, ..., N1-Nx, ..., N(x−1)-Nx between respective position markers M1, M2, ..., Mx of step h) is weighted according to the confidence level of the accuracy of positioning of each position marker in the field of view, the calculated positions relative to the line segment having the highest confidence level being accorded the highest weight.

23. The method of claim 11, wherein a safety zone is established around each vehicle, the size and shape of the safety zone being determined dynamically based upon the size of that vehicle, its capabilities for direction of travel, speed of travel, ability to accelerate and decelerate, and ability to turn.

24. The method of claim 23, wherein the safety zone is used to calculate the path of each vehicle, so that the safety zone of that vehicle does not intersect with the locations of any obstacles in the coordinate space map.

25. An apparatus useful for optically navigating an automated vehicle within a predefined coordinate space, the apparatus comprising:
　a) a plurality of unique position markers, each comprising a machine-readable code, arranged in predetermined positional locations within the coordinate space such that at least one position marker is within view of the automated vehicle;
　b) an image acquisition system, comprised of a machine vision system, the machine vision system comprising a camera, an optional light source, and image capture electronics, mounted on the vehicle, for acquiring an image of the position markers within view;
　c) an image processing system for processing pixels in the acquired image to determine the identity of each position marker, the position of each position marker relative to the vehicle, and the rotational orientation of each position marker relative to the vehicle;
　d) a computer unit for calculating the position of the vehicle and the rotational orientation of the vehicle in the coordinate space; and
　e) a vehicle controller for receiving destinations for the vehicle from an input, for receiving the vehicle position and the rotational orientation of the vehicle from the computer unit, and for transmitting motion and steering instructions to the automated vehicle, the controller having a memory for storing:
　　i) a predetermined map of the coordinate space,
　　ii) the vehicle position and rotational orientation, and
　　iii) the destination of the vehicle,
the vehicle controller determining a desired path for the automated vehicle and for transmitting motion and steering instructions to the automated vehicle.

26. A method for picking up an object from a first, present, location and rotational orientation, transporting the object and delivering that object to a second, destination, location and rotational orientation within a predefined coordinate space by an optically navigated automated vehicle, the method comprising:
　a) creating a map of the coordinate space, the map determining allowable travel routes and locations of obstacles within the coordinate space, and storing the map within a memory in a vehicle controller;
　b) identifying the object to be transported, the present location and rotational orientation of that object and a destination location and rotational orientation of that object within the coordinate space and storing the identity, the present location and rotational orientation and the destination location and rotational orientation of the object within the memory in the vehicle controller;
　c) designating an automated vehicle as the delivery vehicle for the transport and delivery;
　d) determining a coordinate position and a rotational orientation of the delivery vehicle and all other vehicles within the predefined coordinate space by:
　　i) providing a plurality of unique position markers having identifying indicia, positional reference and angular reference indicia thereupon, the markers being arranged at predetermined known positional locations and known angular orientations within the coordinate space, the known positional locations and known angular orientations being stored in the map, so that at least one position marker is within view of the vehicle;
　　ii) using an image acquisition system mounted on the delivery vehicle:
　　　1) acquiring an image of the at least one position marker within view;
　　　2) processing the image to determine the identity, the position relative to the delivery vehicle, and the rotational orientation relative to the delivery vehicle of each position marker within view; and
　　　3) calculating the position of the delivery vehicle, the rotational orientation of the delivery vehicle, the positions of all other vehicles and the rotational orientation of all other vehicles in the coordinate space and storing the position and rotational orientation information in a memory in the image acquisition system;

e) transmitting the delivery vehicle identity and the stored coordinate position and rotational orientation of that vehicle from the image acquisition system on the delivery vehicle to the vehicle controller and storing the delivery vehicle identity and coordinate position and rotational orientation in the memory within the controller, and transmitting the manned vehicle identities and the stored coordinate position and rotational orientation of the manned vehicles from the image acquisition system on each respective vehicle to the vehicle controller and storing the respective vehicle identities and coordinate positions and rotational orientations in the memory within the controller;

f) using the predetermined map of the coordinate space, the identity, position location and rotational orientation of the object and the present position location and rotational orientation of the designated delivery vehicle stored within the memory in the vehicle controller, determining a desired path for the delivery vehicle to pick up the object;

g) transmitting motion and steering instructions to the delivery vehicle;

h) repeating steps d) through g) until the delivery vehicle reaches the location of the object at the rotational orientation of the object;

i) transmitting motion, steering and fork control instructions to the delivery vehicle, causing the vehicle to pick up the object;

j) using the predetermined map of the coordinate space, the present position location and rotational orientation of the designated delivery vehicle and the destination location and rotational orientation for that object stored within the memory in the vehicle controller, determining a desired path for the delivery vehicle to deliver the object;

k) transmitting motion and steering instructions to the delivery vehicle to causing it to follow the desired path;

l) repeating steps d), j) and k) until the delivery vehicle reaches the destination location and the destination rotational orientation of the object;

m) transmitting motion, steering and fork control instructions to the delivery vehicle, causing the vehicle to deposit the object at the destination location;

n) calculating the actual position and rotational orientation of the object when it has been deposited; and o) transmitting the actual position and rotational orientation of the delivered object to a host system.

27. The method of claim 26, further comprising, after step f):

f1) using the predetermined map of the coordinate space, the identity, position location and rotational orientation of other automated vehicles and manned vehicles determining if the desired path is blocked;

f2) if the desired path is blocked, selecting an alternate path.

28. The method of claim 26, further comprising, after step g):

g1) determining a predicted trajectory and a safety zone for each manned vehicle and each automated vehicle by calculating the velocity and direction of travel of each vehicle from coordinate positions at successive time intervals;

g2) determining any areas of intersection of the safety zone of each manned vehicle and each automated vehicle with the safety zones of other manned and other automated vehicles to predict a potential collision;

g3) transmitting instructions to reduce speed, turn, or stop, to any automated vehicle that has a safety zone intersecting any safety zone of any other vehicle to prevent the predicted collision; and g4) transmitting a warning to any manned vehicle that has a safety zone intersecting any safety zone of any other vehicle to alert the operator of the manned vehicle of a predicted potential collision, so that the operator can take appropriate action to avoid the predicted collision.

29. The method of claim 28, wherein the steps d) through g1) are repeated and if no areas of intersection between the safety zones of an automated vehicle previously slowed, turned or stopped and either a manned and or another automated vehicle are subsequently determined, further comprising, after step g1):

g2) transmitting instructions to the automated vehicle previously slowed, turned or stopped by repeating steps d) through g); or if no areas of intersection between the safety zones of a manned and another manned vehicle or an automated vehicle are subsequently determined, further comprising, after step g1):

g2) transmitting a signal canceling the warning to the manned vehicle to alert the operator that no potential collision is predicted.

30. The method of claim 26, further comprising, after step k):

k1) determining a predicted trajectory and a safety zone for each manned vehicle and each automated vehicle by calculating the velocity and direction of travel of each vehicle from coordinate positions at successive time intervals;

k2) determining any areas of intersection of the safety zone of each manned vehicle and each automated vehicle with the safety zones of other manned and other automated vehicles to predict a potential collision;

k3) transmitting instructions to reduce speed, turn, or stop, to any automated vehicle that has a safety zone intersecting any safety zone of any other vehicle to prevent the predicted collision;

k4) transmitting a warning to any manned vehicle that has a safety zone intersecting any safety zone of any other vehicle to alert the operator of the manned vehicle of a predicted potential collision, so that the operator can take appropriate action to avoid the predicted collision.

31. The method of claim 30, wherein the steps d), j), k) and k1) are repeated and if no areas of intersection between the safety zones of an automated vehicle previously slowed, turned or stopped and the safety zones of either a manned and or another automated vehicle are subsequently determined, further comprising, after step k1):

k2) transmitting instructions to the automated vehicle previously slowed, turned or stopped, by repeating steps d), j) and k); or if no areas of intersection between safety zones of a manned and another manned vehicle or an automated vehicle are subsequently determined, after step k1):

k2) transmitting a signal canceling the warning to the manned vehicle to alert the operator that no potential collision is predicted.

32. An apparatus useful for controlling an optically navigated automated vehicle within a predefined coordinate space for picking up an object from a first location and rotational orientation, transporting the object and delivering that object to a second, destination, location and rotational orientation, the apparatus comprising:

a) a plurality of unique position markers, each comprising a machine-readable code, arranged in predetermined positional locations within the coordinate space such that at least one position marker is within view of the automated vehicle;
b) an image acquisition system, comprised of a machine vision system, the machine vision system comprising a camera, an optional light source, and image capture electronics, mounted on the vehicle, for acquiring an image of the position markers within view;
c) an image processing system for processing pixels in the acquired image to determine the identity of each position marker, the position of each position marker relative to the vehicle, and the rotational orientation of each position marker relative to the vehicle;
d) a computer unit for calculating the position of the vehicle and the rotational orientation of the vehicle in the coordinate space; and
e) a vehicle controller for receiving destinations for the vehicle from an input, for receiving the vehicle position and the rotational orientation of the vehicle from the computer unit, and for transmitting motion and steering instructions to the automated vehicle, the controller having a memory for storing:
  i) a predetermined map of the coordinate space,
  ii) the vehicle position and rotational orientation,
  iii) the destination of the vehicle,
f) a wireless data communication network for transmitting data between the computer unit and the vehicle controller;
the vehicle controller: determining a desired path for the automated vehicle to acquire the object at the first location and rotational orientation; transmitting motion and steering instructions to the automated vehicle until the automated vehicle reaches the location and rotational orientation of the object; transmitting fork control instructions to the automated vehicle, causing the automated vehicle to acquire the object; determining a desired path for the automated vehicle to the destination of the object; transmitting motion and steering instructions to the automated vehicle until the automated vehicle reaches the destination location and rotational orientation for the object; transmitting fork control instructions to the automated vehicle, causing the automated vehicle to deposit the object at the destination location and rotational orientation.

33. A method of managing utility vehicles within a predefined coordinate space, where the vehicles may be manned (i.e., human operated) or automated, i.e., guided by machines by determining a coordinate position and rotational orientation of the vehicles and by navigating the automated vehicles, the method comprising:
a) creating a map of the coordinate space, the map determining allowable travel routes and locations of obstacles within the coordinate space, and storing the map within a memory in a vehicle controller;
b) establishing a destination for each manned vehicle and each automated vehicle within the coordinate space and storing the identity and destination of each vehicle within the memory in the vehicle controller;
c) determining the coordinate position and the rotational orientation of each vehicle within the predefined coordinate space by:
  i) providing a plurality of unique position markers having identifying indicia, positional reference and angular reference indicia thereupon, the markers being arranged at predetermined known positional locations and known angular orientations within the coordinate space, the known positional locations and known angular orientations being stored in the map, so that at least one position marker is within view of the vehicle;
  ii) using an image acquisition system mounted on each (manned and automated) vehicle:
    1) acquiring an image of the at least one position marker within view;
    2) processing the image to determine the identity, the position relative to the vehicle, and the rotational orientation relative to the vehicle of each position marker within view; and
    3) calculating the coordinate position of the vehicle and the rotational orientation of the vehicle in the coordinate space and storing the coordinate position and rotational orientation information in a memory in the image acquisition system;
d) transmitting the vehicle identity and the stored coordinate position and rotational orientation of that vehicle from the image acquisition system on each vehicle to the vehicle controller and storing the vehicle identity and coordinate position and rotational orientation in the memory within the vehicle controller;
e) using the coordinate position of the vehicle and the rotational orientation of the vehicle, the predetermined map of the coordinate space and the destination for each vehicle stored within the memory in the vehicle controller, determining a desired path for each automated vehicle;
f) transmitting motion and steering instructions to each automated vehicle;
g) determining a predicted trajectory and a safety zone for each manned vehicle and each automated vehicle by calculating the velocity and direction of travel of each vehicle from coordinate positions at successive time intervals;
h) determining any areas of intersection of the safety zone of each manned vehicle and each automated vehicle with the safety zones of other manned and OF other automated vehicles to predict a potential collision;
i) transmitting instructions to reduce speed, turn, or stop, to any automated vehicle that has a safety zone intersecting any safety zone of any other vehicle to prevent the predicted collision;
j) transmitting a warning to any manned vehicle that has a safety zone intersecting any safety zone of any other vehicle to alert the operator of such manned vehicle of a predicted potential collision, so that the operator can take appropriate action to avoid the predicted collision; and
k) repeating steps c) through j) until each automated vehicle reaches the established destination for that vehicle.

34. The method of claim 33, wherein the steps c) through h) are repeated and
if no areas of intersection between the safety zones of an automated vehicle previously slowed, turned or stopped and either a manned and or another automated vehicle are subsequently determined:
  i) transmitting instructions to the automated vehicle previously slowed, turned or stopped, to resume its previous velocity and direction of travel;
or, if no areas of intersection between a manned and another manned vehicle or an automated vehicle are subsequently determined:

j) transmitting a signal canceling the warning to the manned vehicle to alert the operator that no potential collision is predicted.

35. The method of claim 33, further comprising a method of rerouting an automated vehicle within the coordinate space, the method comprising:
after determining a desired path for each automated vehicle, for each iteration of step c):
c1) checking the position and the rotational orientation of other vehicles to determine if the desired path is blocked;
c2) if the desired path is blocked, selecting an alternate path; and
c3) issuing new motion and steering instructions to each automated vehicle to follow the alternate path.

36. The method of claim 33, further comprising a method of rerouting an automated vehicle within the coordinate space, the method comprising:
after determining a desired path for each automated vehicle, for each iteration of step c):
c1) checking the position and the rotational orientation of other vehicles and calculating the speed and direction of travel of the other vehicles to determine if the desired path will be blocked;
c2) if the desired path will be blocked, selecting an alternate path; and
c3) issuing new motion and steering instructions to each automated vehicle to follow the alternate path.

37. A method of managing a mixed environment of manned vehicles and automated vehicles within a predefined coordinate space by determining a coordinate position and rotational orientation of manned vehicles and by optically navigating automated vehicles within the predefined coordinate space, the method comprising:
a) creating a map of the coordinate space, the map determining allowable travel routes and locations of obstacles within the coordinate space, and storing the map within a memory in a vehicle controller;
b) establishing a destination for each manned vehicle and each automated vehicle within the coordinate space and storing the identity and destination of each vehicle within the memory in the vehicle controller;
c) determining the coordinate position and the rotational orientation of each vehicle within the predefined coordinate space by:
i) providing a plurality of unique position markers having identifying indicia, positional reference and angular reference indicia thereupon, the markers being arranged at predetermined known positional locations and known angular orientations within the coordinate space, the known positional locations and known angular orientations being stored in the map, so that at least two position markers are within view of the vehicle;
ii) using an image acquisition system mounted on each manned and automated vehicle:
1) acquiring an image of the at least two position markers within view;
2) processing the image to determine the identity, the position relative to the vehicle, and the rotational orientation relative to the vehicle of each position marker within view; and
3) calculating the coordinate position of the vehicle and the rotational orientation of the vehicle in the coordinate space;
wherein the coordinate position and rotational orientation of each vehicle is determined by:

A) acquiring an image of at least two position markers M1, M2 within view;
B) establishing a center point N1, N2 of each respective marker M1, M2 and determining a line segment N1-N2 connecting the respective center points N1, N2;
C) determining a center point O of the field of view of the image acquisition system;
D) determining line segments O-N1, O-N2 respectively connecting point O with the centers N1, N2 of the respective position markers M1, M2;
E) using the lengths and directions of line segments O-N1, O-N2 to calculate the position of the vehicle relative to the known positions of the markers M1, M2, thereby determining the location of the vehicle within the coordinate space; and
F) using the direction of line segment N1-N2 to calculate the rotational orientation of the vehicle within the coordinate space; and storing the coordinate location and the rotational orientation of the vehicle in a memory in the image acquisition system;
d) transmitting the vehicle identity and the stored coordinate position and rotational orientation of that vehicle from the image acquisition system on each vehicle to the vehicle controller and storing the vehicle identity and coordinate position and rotational orientation in the memory within the vehicle controller;
e) using the coordinate position and rotational orientation of each vehicle, the predetermined map of the coordinate space and the destination for each vehicle stored within the memory in the vehicle controller, determining a desired path for each automated vehicle;
f) transmitting motion and steering instructions to each automated vehicle;
g) determining a predicted trajectory and a safety zone for each manned vehicle and each automated vehicle by calculating the velocity and direction of travel of each vehicle from coordinate positions at successive time intervals;
h) determining any areas of intersection of the safety zone of each manned vehicle and each automated vehicle with the safety zones of other manned or automated vehicles to predict a potential collision;
i) transmitting instructions to reduce speed, turn, or stop to any automated vehicle that has a safety zone intersecting any safety zone of any other vehicle to prevent the predicted collision;
j) transmitting a warning to any manned vehicles that has a safety zone intersecting any safety zone of any other vehicle to alert the operators of such manned vehicles of a predicted potential collision, so that the operators can take appropriate action to avoid the predicted collision; and
k) repeating steps c) through j) until each automated vehicle reaches the established destination for that vehicle.

38. The method of claim 37, wherein the steps c) through h) are repeated and
if no areas of intersection between the safety zones of a manned and an automated vehicle are subsequently determined:
i) transmitting instructions to an automatically vehicle previously slowed or stopped to resume its previous velocity and direction of travel;
or if no areas of intersection between a manned and another manned vehicle are subsequently determined:

j) transmitting a signal canceling the warning to the manned vehicles to alert the operators that no potential collision is predicted.

39. The method of claim 37, further comprising a method of rerouting an automated vehicle within a coordinate space, the method comprising:

after determining a desired path for each automated vehicle, for each iteration of step c):

c1) checking to determine if the desired path is blocked by a stationary vehicle;

c2) if the desired path is blocked, selecting an alternate path; and c3) issuing new motion and steering instructions to each automated vehicle to follow the alternate path.

40. An apparatus useful for managing a mixed environment of manned vehicles and automated vehicles within a predefined coordinate space by determining a coordinate position and rotational orientation of each manned vehicle and by optically navigating each automated vehicle within the predefined coordinate space, the apparatus comprising:

a) a plurality of unique position markers, each comprising a machine-readable code, arranged in predetermined positional locations within the coordinate space such that at least one position marker is within view of the automated vehicle;

b) an image acquisition system, comprised of a machine vision system, the machine vision system comprising a camera, an optional light source, and image capture electronics, mounted on each vehicle, for acquiring an image of the position markers within view;

c) an image processing system for processing pixels in the acquired image to determine the identity of each position marker, the position of each position marker relative to the vehicle, and the rotational orientation of each position marker relative to each vehicle;

d) a computer unit on each vehicle for calculating the position of that vehicle and the rotational orientation of that vehicle in the coordinate space; and e) a vehicle controller for receiving destinations for each automated vehicle from an input, for receiving the vehicle position and the rotational orientation of each vehicle from the computer unit on that vehicle, and for transmitting motion and steering instructions to each automated vehicle, the controller having a memory for storing:

i) a predetermined map of the coordinate space, ii) the vehicle position and rotational orientation of each vehicle, iii) the destination of each automated vehicle, and f) a wireless data communication network for transmitting data between the computer unit and the vehicle controller;

the vehicle controller: determining allowable travel routes and locations of obstacles within the coordinate space from the predetermined map; determining a desired path for each automated vehicle using the allowable travel routes; transmitting motion and steering instructions to the automated vehicle until each automated vehicle reaches its destination; determining a predicted trajectory and a safety zone for each manned vehicle and each automated vehicle by calculating the velocity and direction of travel of each vehicle from coordinate positions at successive time intervals; determining any areas of intersection of the safety zone of each manned vehicle and each automated vehicle with the safety zones of other manned or automated vehicles to predict a potential collision; transmitting instructions to reduce speed, turn, or stop to any automated vehicle that has a safety zone intersecting any safety zone of any other vehicle to prevent the predicted collision; and transmitting a warning to any manned vehicles that has a safety zone intersecting any safety zone of any other vehicle to alert the operators of such manned vehicles of a predicted potential collision, so that the operators can take appropriate action to avoid the predicted collision.

41. The apparatus of claim 9, further comprising:

the computer unit calculating a mean value of the position of the vehicle using the positions of at least two position markers and a mean value of the rotational orientation of the vehicle in the coordinate space using the positions of at least two pairs of position markers.

* * * * *